(12) United States Patent  
Jenuwine et al.

(10) Patent No.: US 12,541,505 B2  
(45) Date of Patent: Feb. 3, 2026

(54) RECORD PROCESS STORAGE SYSTEM AND METHOD WITH AUTOMATIC BUFFER INTERVAL UPDATES

(71) Applicant: Ocient Holdings LLC, Chicago, IL (US)

(72) Inventors: Natalia Marie Jenuwine, Chicago, IL (US); George Kondiles, Chicago, IL (US); Anna Veselova, Chicago, IL (US); Ravi V. Khadiwala, Bartlett, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/630,045

(22) Filed: Apr. 9, 2024

(65) Prior Publication Data

US 2024/0273089 A1  Aug. 15, 2024

Related U.S. Application Data

(63) Continuation of application No. 17/643,048, filed on Dec. 7, 2021, now Pat. No. 11,983,172.

(51) Int. Cl.  
*G06F 16/23* (2019.01)  
*G06F 16/2453* (2019.01)  
(Continued)

(52) U.S. Cl.  
CPC .... *G06F 16/2386* (2019.01); *G06F 16/24542* (2019.01); *G06F 16/24552* (2019.01); *G06F 16/258* (2019.01)

(58) Field of Classification Search  
CPC ........... G06F 16/2386; G06F 16/24542; G06F 16/24552  
(Continued)

(56) References Cited

U.S. PATENT DOCUMENTS

| 5,548,770 A | 8/1996 | Bridges |
|---|---|---|
| 6,230,200 B1 | 5/2001 | Forecast |

(Continued)

OTHER PUBLICATIONS

A new high performance fabric for HPC, Michael Feldman, May 2016, Intersect360 Research.

(Continued)

*Primary Examiner* — Giovanna B Colan  
(74) *Attorney, Agent, or Firm* — Garlick & Markison; Patricia M. Healy

(57) ABSTRACT

A record processing and storage system operates by: automatically determining a buffer interval for a mapping function of batch size to estimated memory utilization; automatically selecting a first batch size for performance of a first data format conversion based a first intersection between an upper bound of the buffer interval and a current memory availability; performing the first data format conversion upon a first batch of data having the first batch size; automatically updating the buffer interval based on a difference between an actual amount of memory utilized in performing the first data format conversion and an estimated memory utilization mapped to the first batch size via the mapping function; automatically selecting a second batch size for performance of a second data format conversion based a second intersection between an upper bound of the updated buffer interval and the current memory availability; and performing the second data format conversion upon a second batch of data having the second batch size.

20 Claims, 62 Drawing Sheets

(51) Int. Cl.
*G06F 16/2455* (2019.01)
*G06F 16/25* (2019.01)

(58) Field of Classification Search
USPC .......................................................... 707/609
See application file for complete search history.

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 10,510,022 | B1* | 12/2019 | Tharrington, Jr. ...... G06N 5/045 |
| 10,963,434 | B1 | 3/2021 | Rodriguez |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0084583 | A1* | 4/2012 | Chen ..................... G06F 1/3203 713/320 |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2018/0293463 | A1 | 10/2018 | Brown |
| 2020/0310963 | A1* | 10/2020 | Nilsen ................... G06F 9/5005 |
| 2021/0158147 | A1 | 5/2021 | Vinod |
| 2021/0365477 | A1* | 11/2021 | Pippin ..................... G06F 9/542 |
| 2022/0101438 | A1* | 3/2022 | Gao .................. G06Q 30/0202 |
| 2024/0126607 | A1* | 4/2024 | Royal .................. G06F 16/217 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.
Amazon DynamoDB: ten things you really should know, Nov. 13, 2015, Chandan Patra, http://cloudacademy. .com/blog/amazon-dynamodb-ten-thing.
An Inside Look at Google BigQuery, by Kazunori Sato, Solutions Architect, Cloud Solutions team, Google Inc., 2012.
Big Table, a NoSQL massively parallel table, Paul Krzyzanowski, Nov. 2011, https://www.cs.rutgers.edu/pxk/417/notes/contentlbigtable.html.
Distributed Systems, Fall2012, Mohsen Taheriyan, http://www-scf.usc.edu/-csci57212011Spring/presentations/Taheriyan. pptx.
International Searching Authority; International Search Report and Written Opinion; International Application No. PCT/US2017/054773; Feb. 13, 2018; 17 pgs.
International Searching Authority; International Search Report and Written Opinion; International Application No. PCT/US2017/054784; Dec. 28, 2017; 10 pgs.
International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends in Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 data set

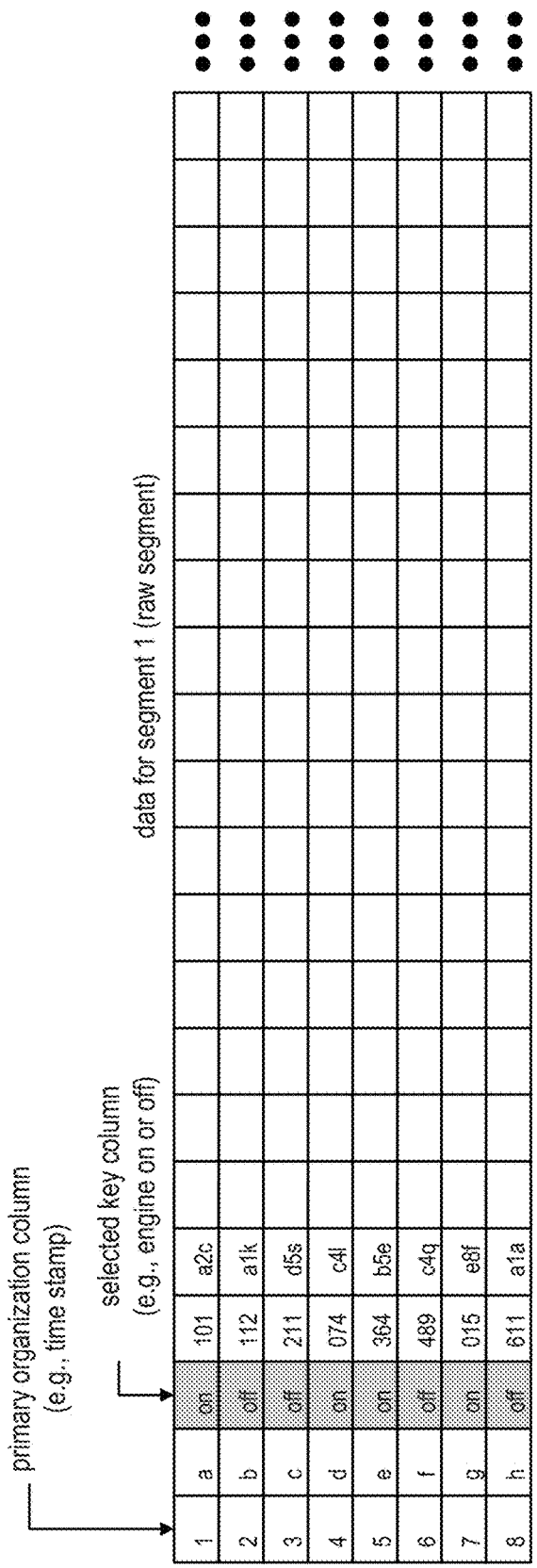

database system 10

2505 record processing and storage system 2505

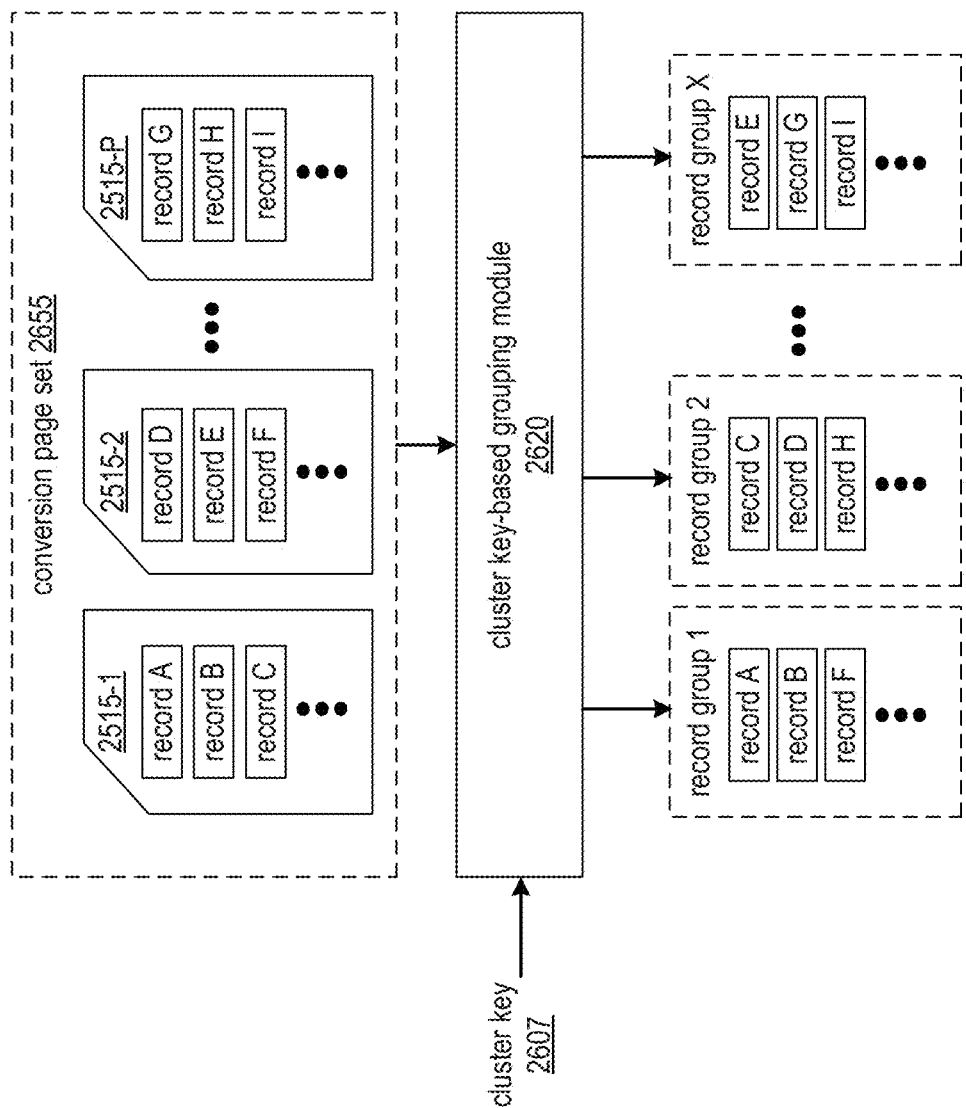

database system 10

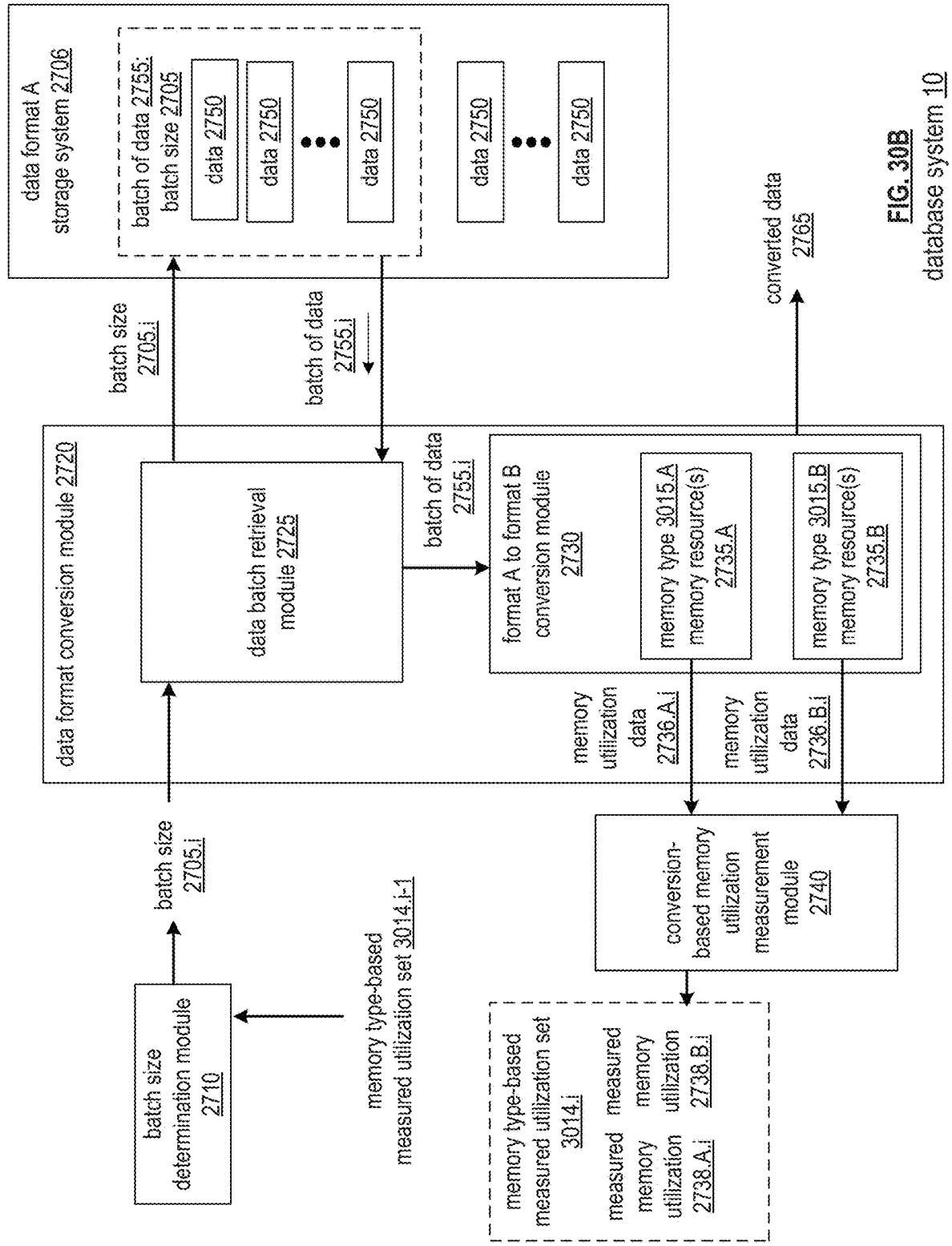

RECORD PROCESS STORAGE SYSTEM AND METHOD WITH AUTOMATIC BUFFER INTERVAL UPDATES

CROSS-REFERENCE TO RELATED APPLICATIONS

The present U.S. Utility Patent Application claims priority pursuant to 35 U.S.C. § 120 as a continuation of U.S. Utility application Ser. No. 17/643,048, entitled "GENERATION OF A PREDICTIVE MODEL FOR SELECTION OF BATCH SIZES IN PERFORMING DATA FORMAT CONVERSION", filed Dec. 7, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 26C is a schematic block diagram of a cluster key-based grouping module of a segment generator in accordance with various embodiments;

Figure 27A:
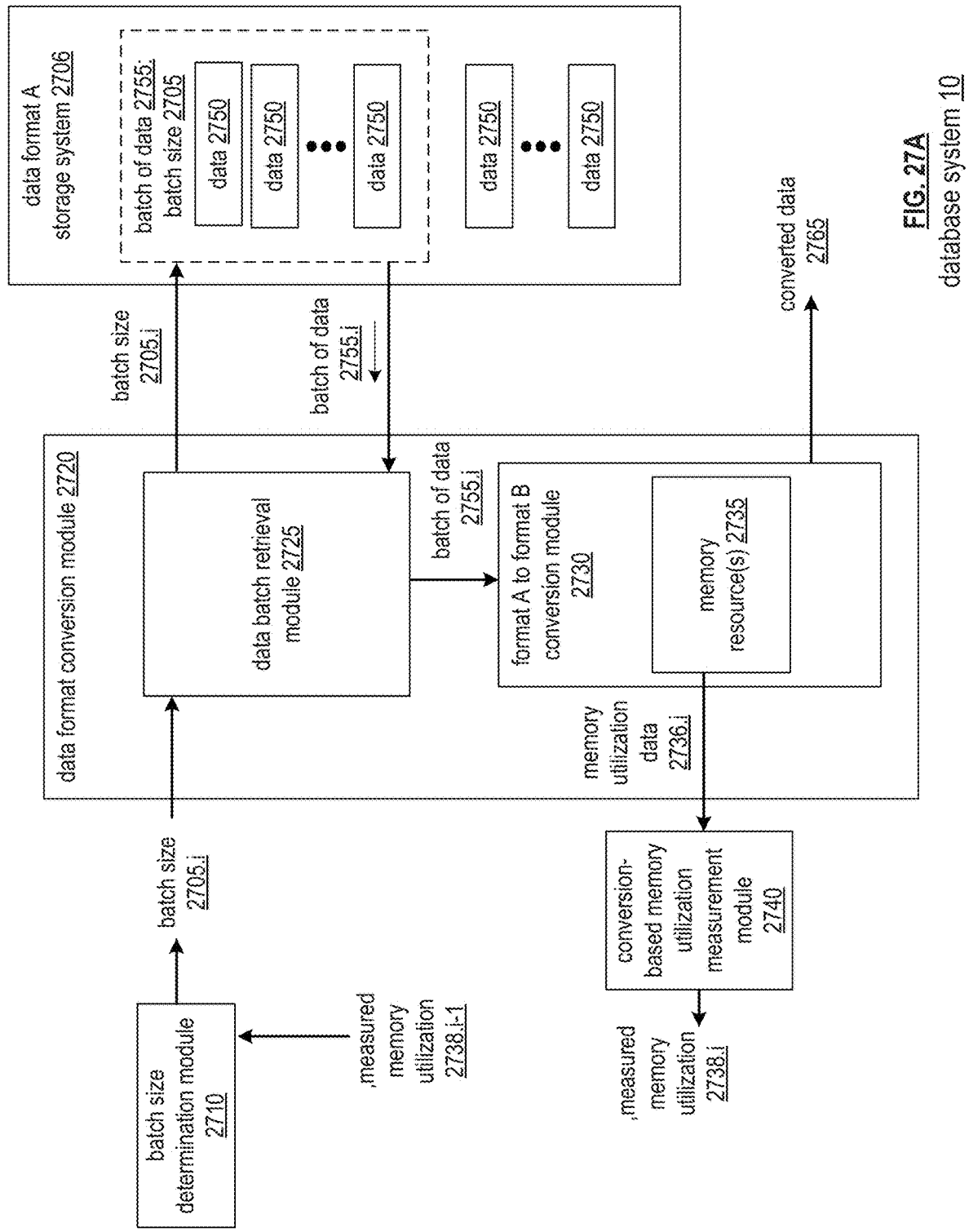
FIG. 27A is a schematic block diagram of a database system that includes a data format conversion module, a batch size determination module, and a conversion-based memory utilization measurement module in accordance with various embodiments.
Figure 27B:
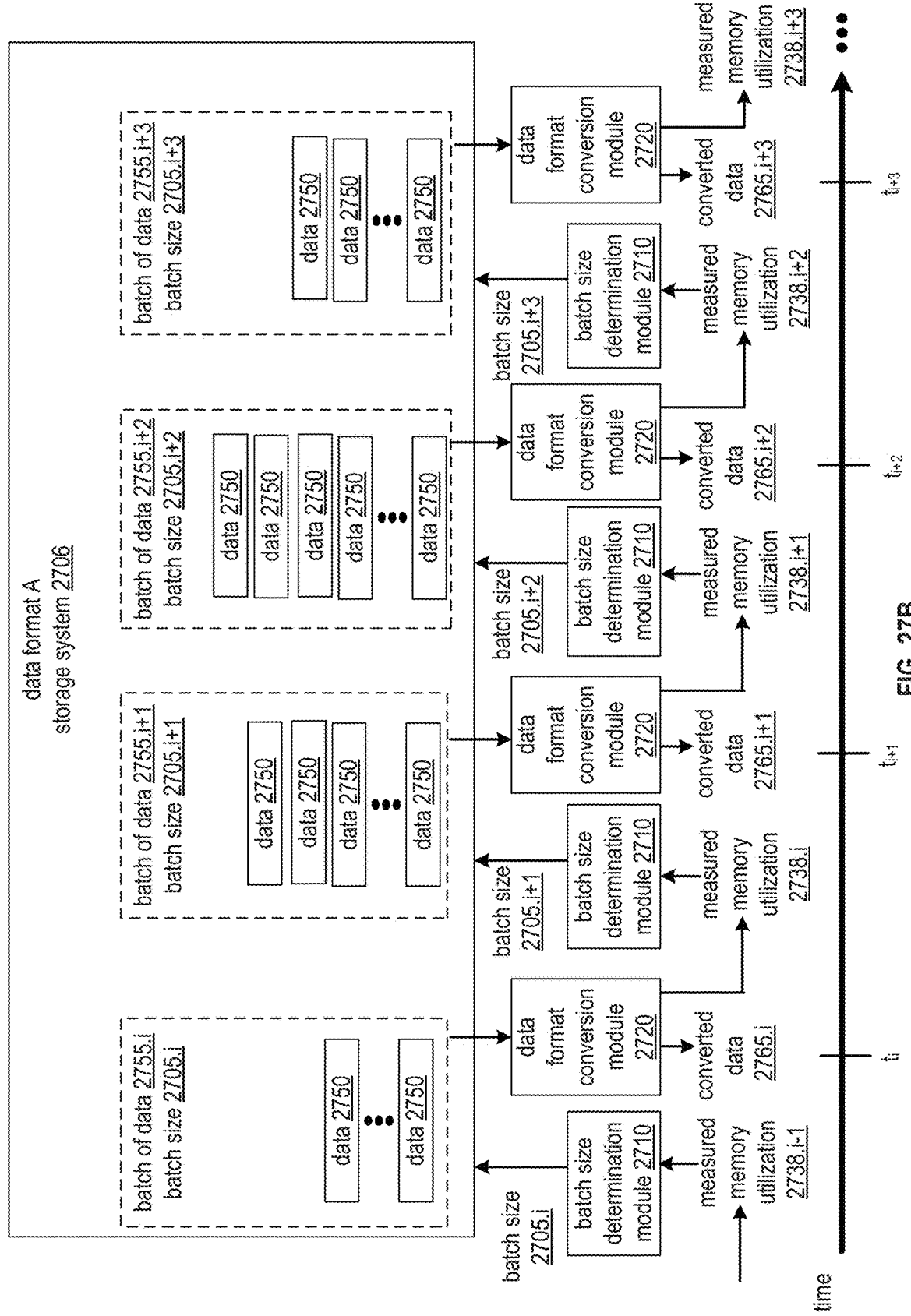
Figure 27C:
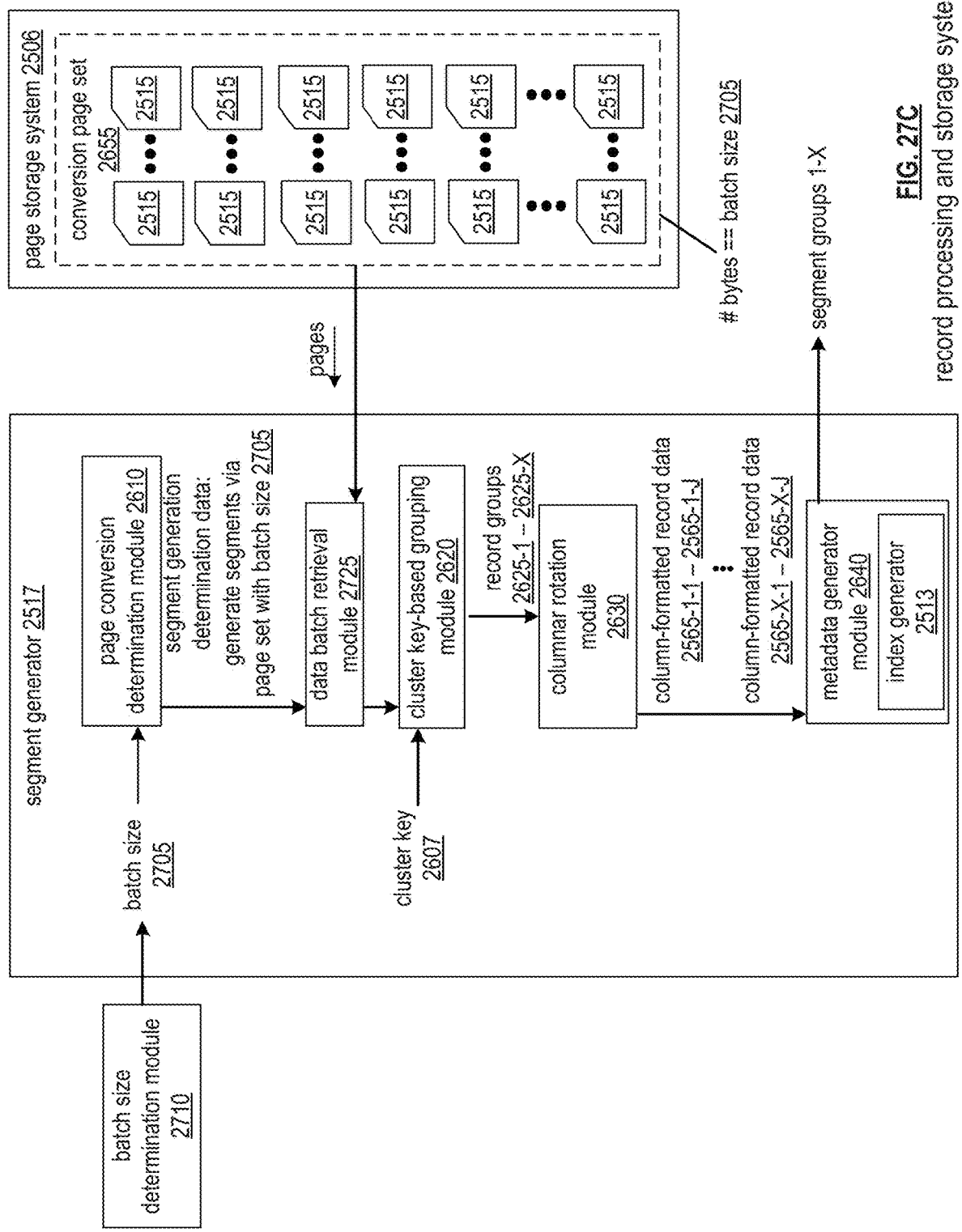
Figure 27D:
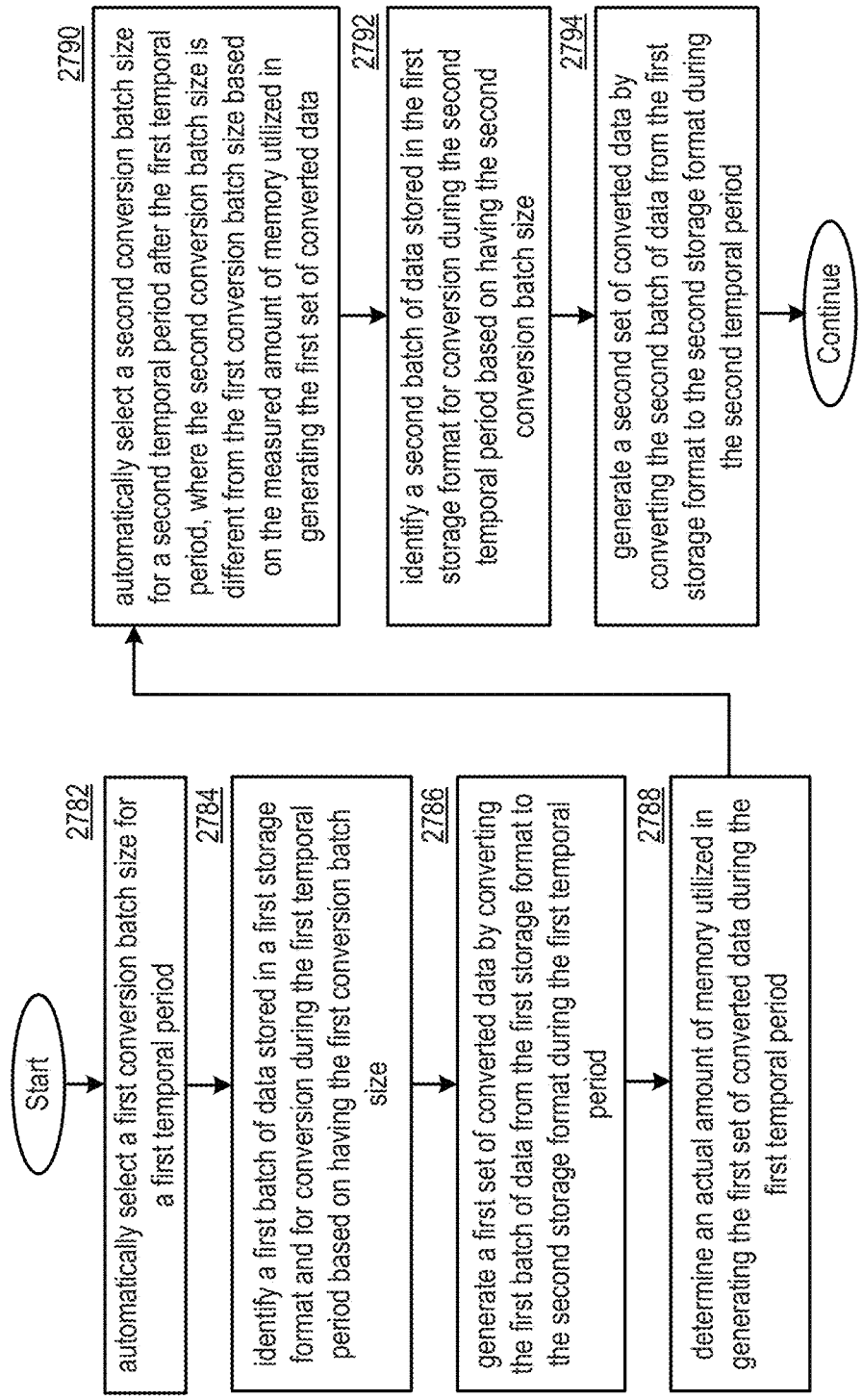
Figure 28A:
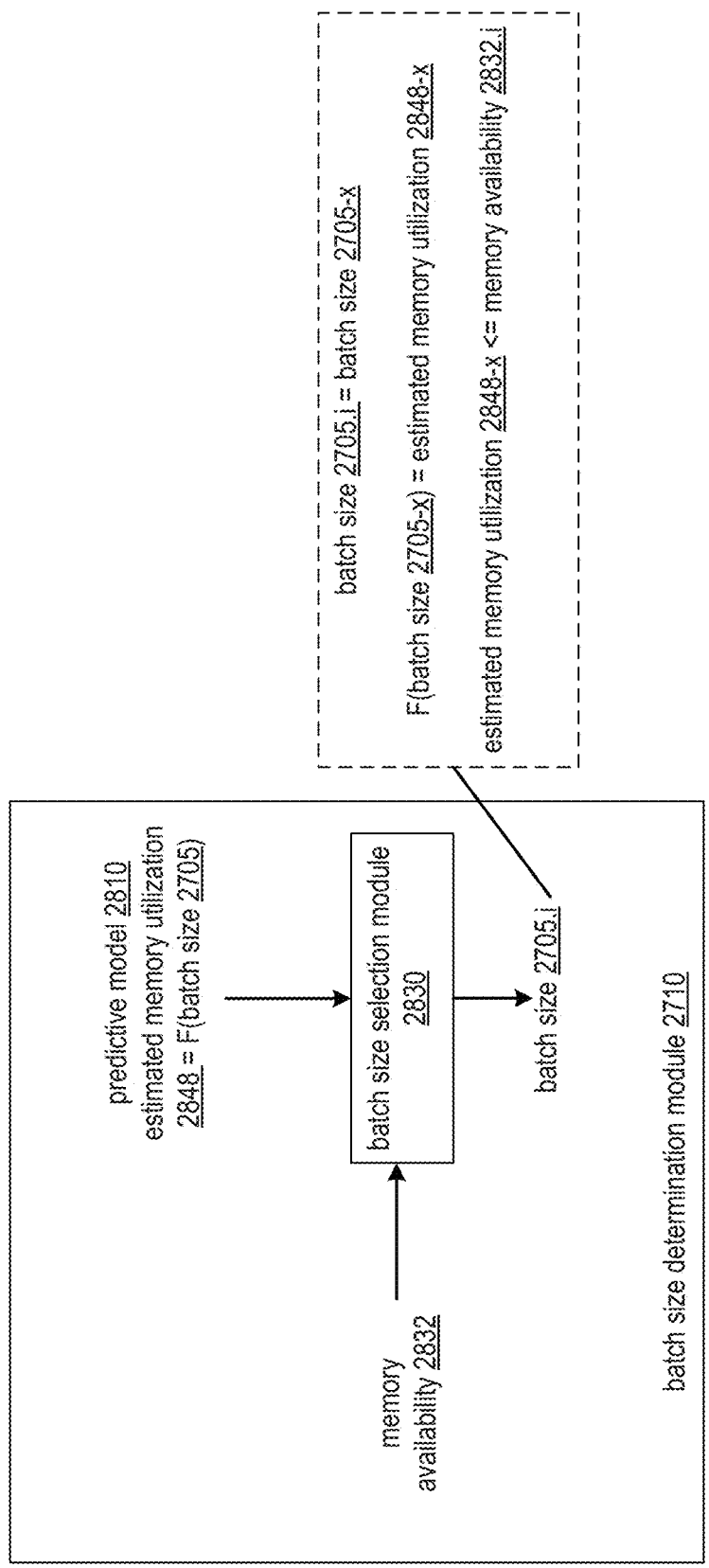
Figure 28B:
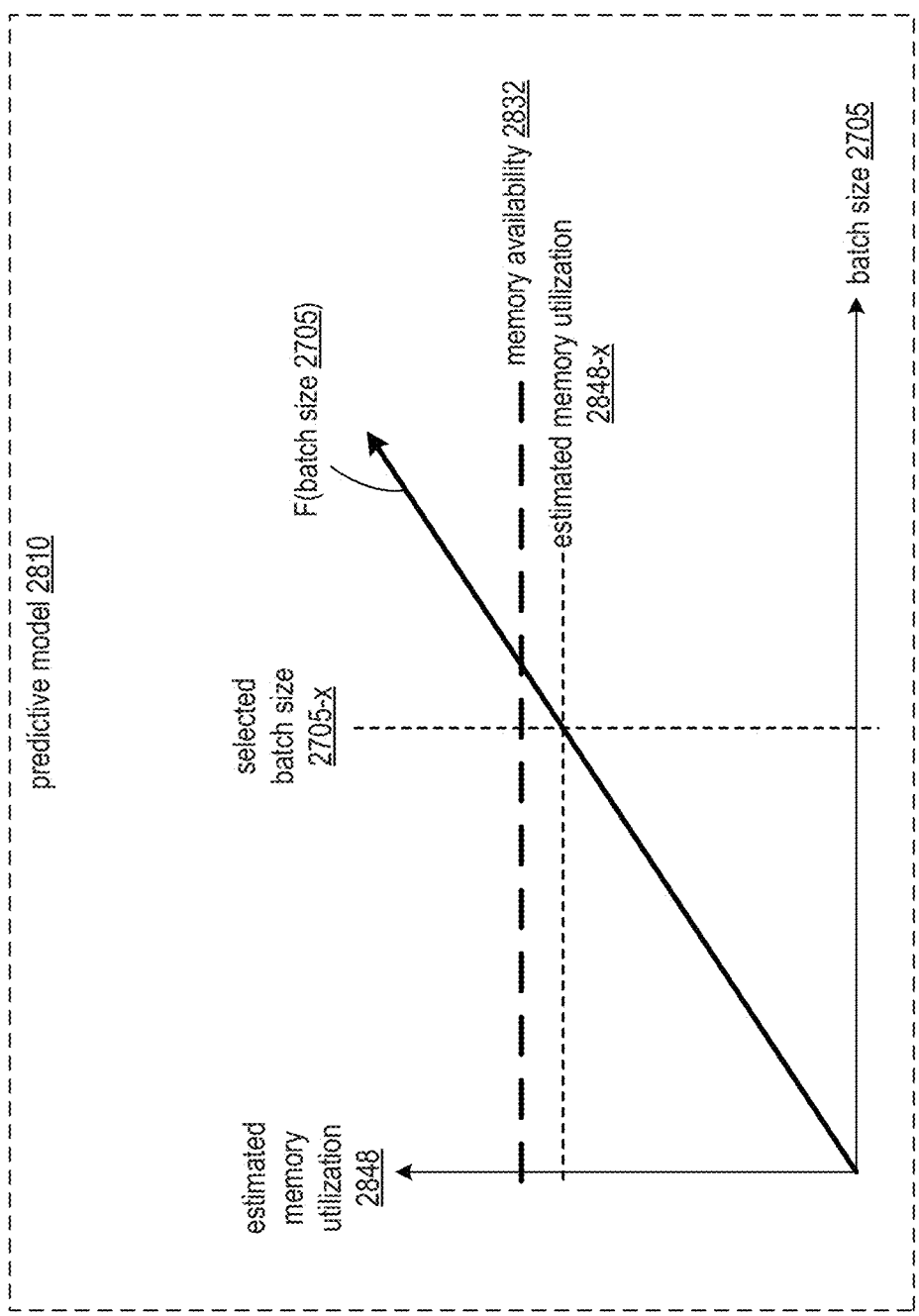
Figure 28C:
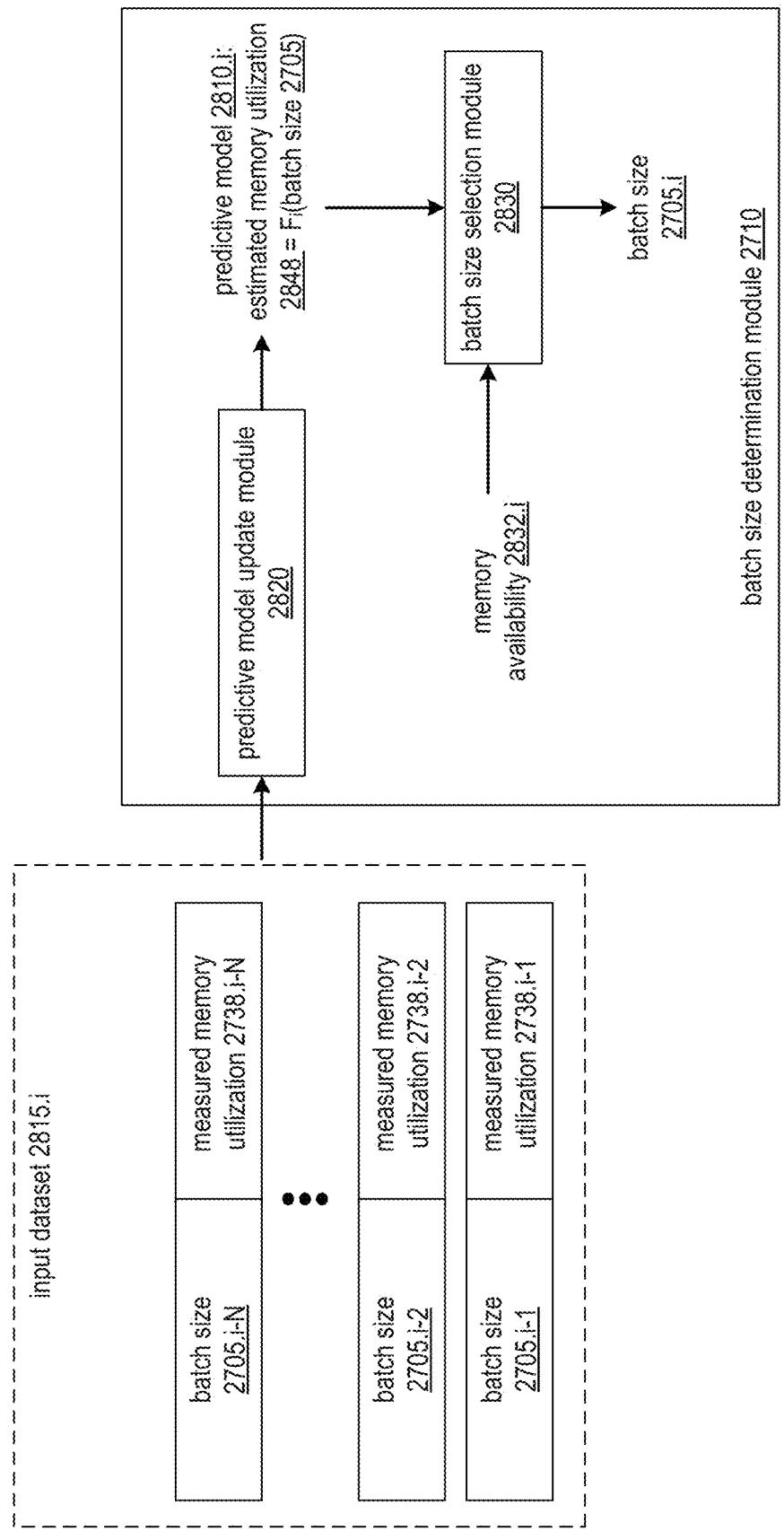
Figure 28D:
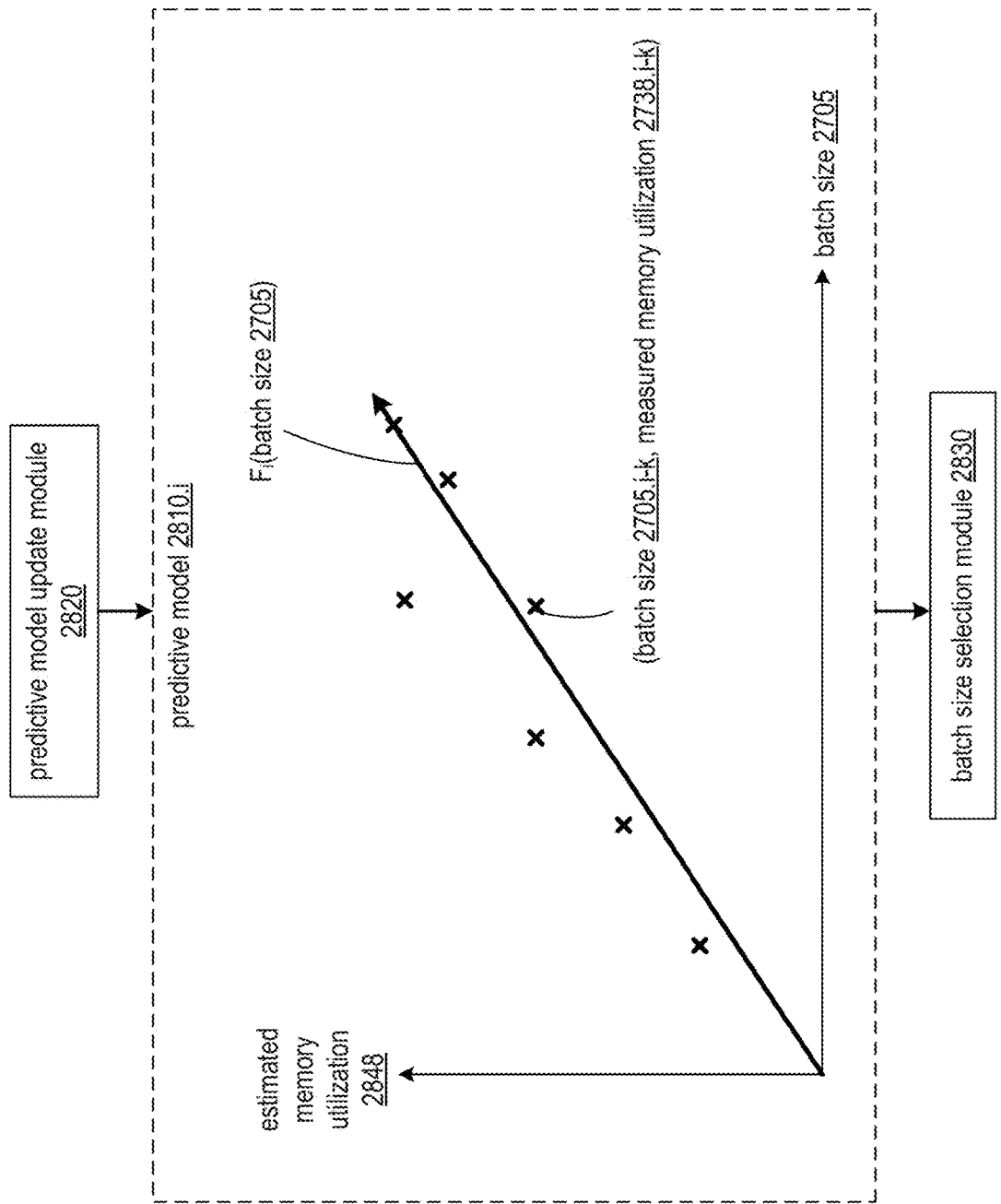
Figure 28E:
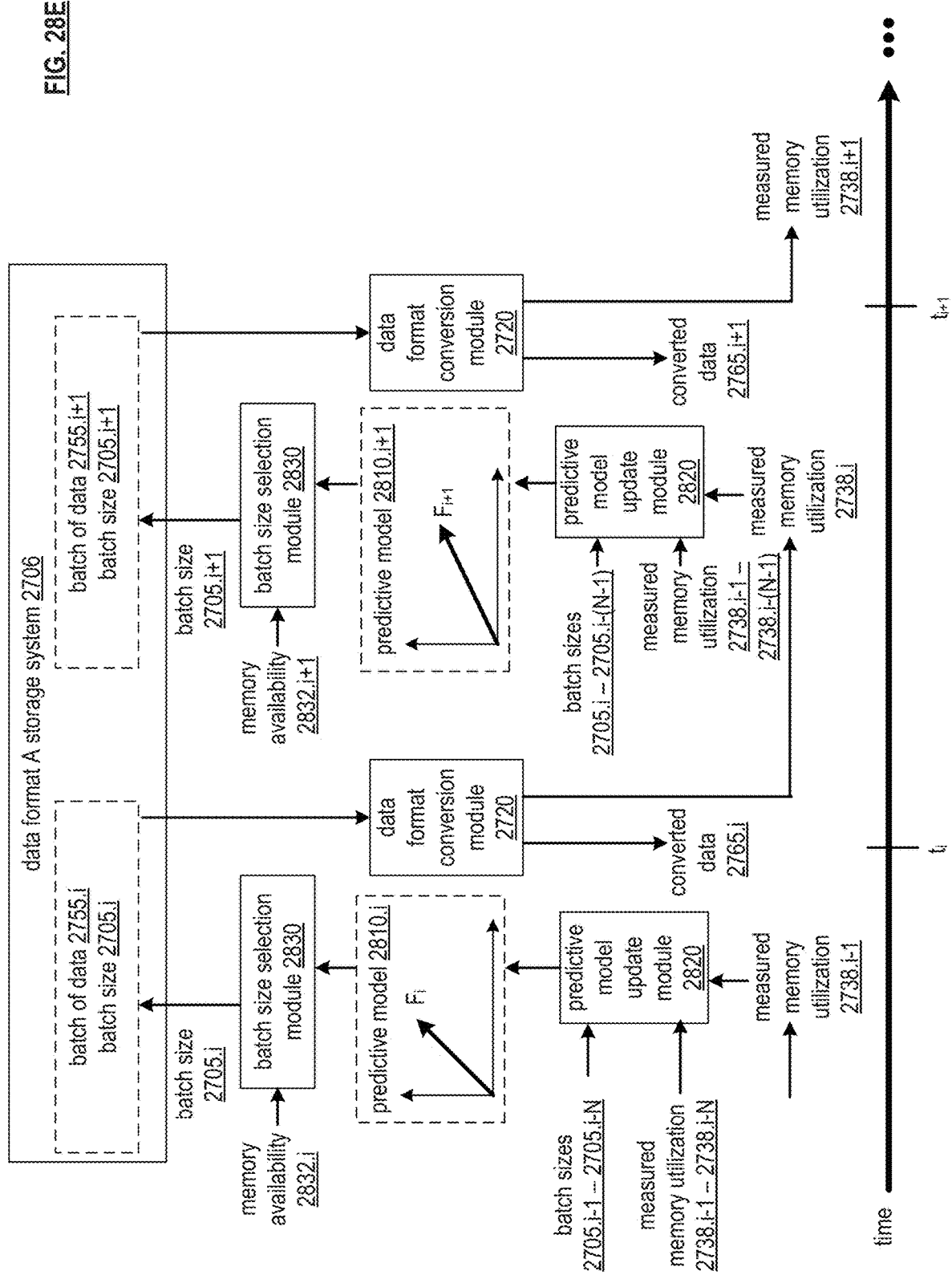
Figure 28F:
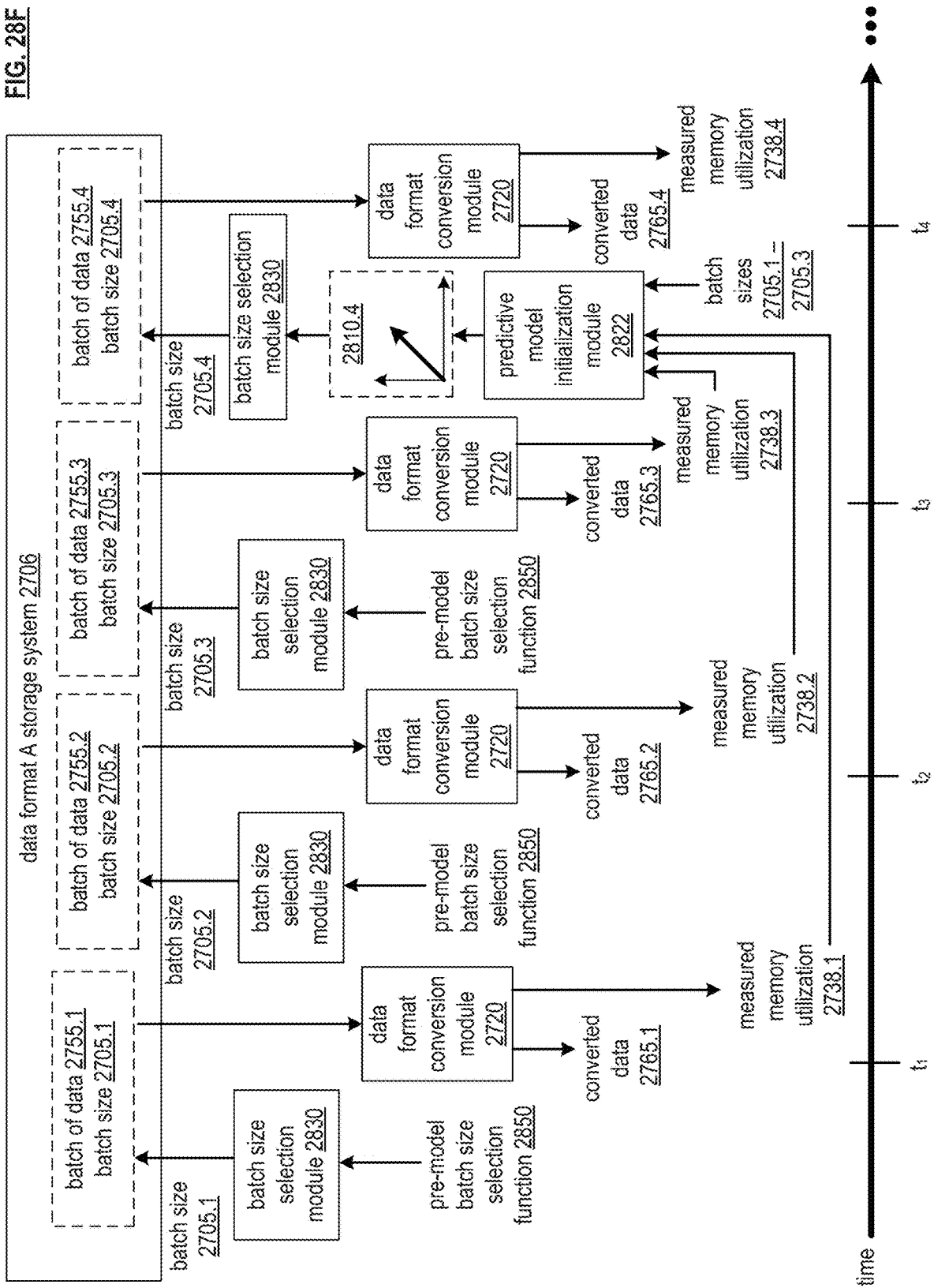
Figure 28G:
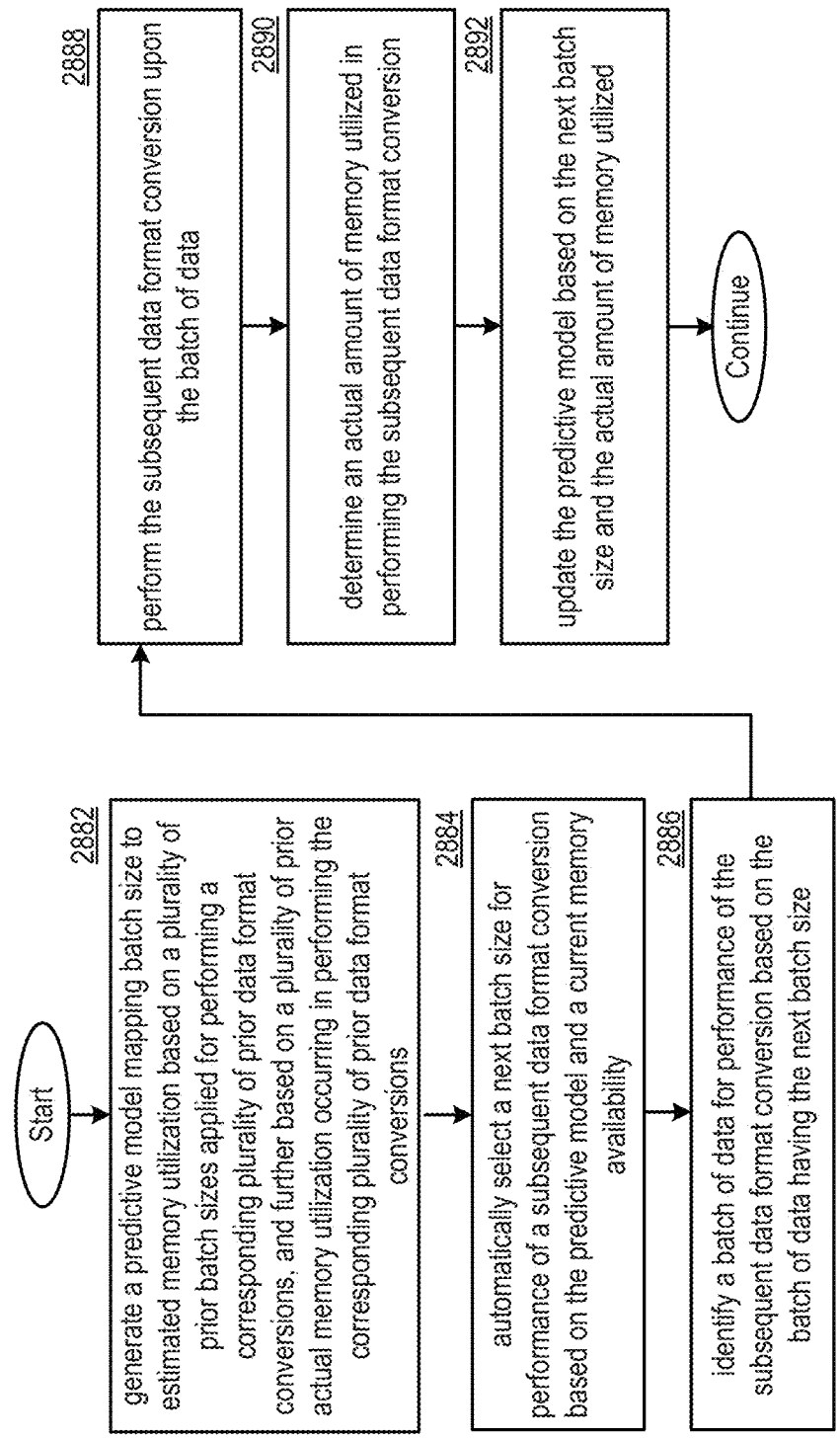
Figure 29A:
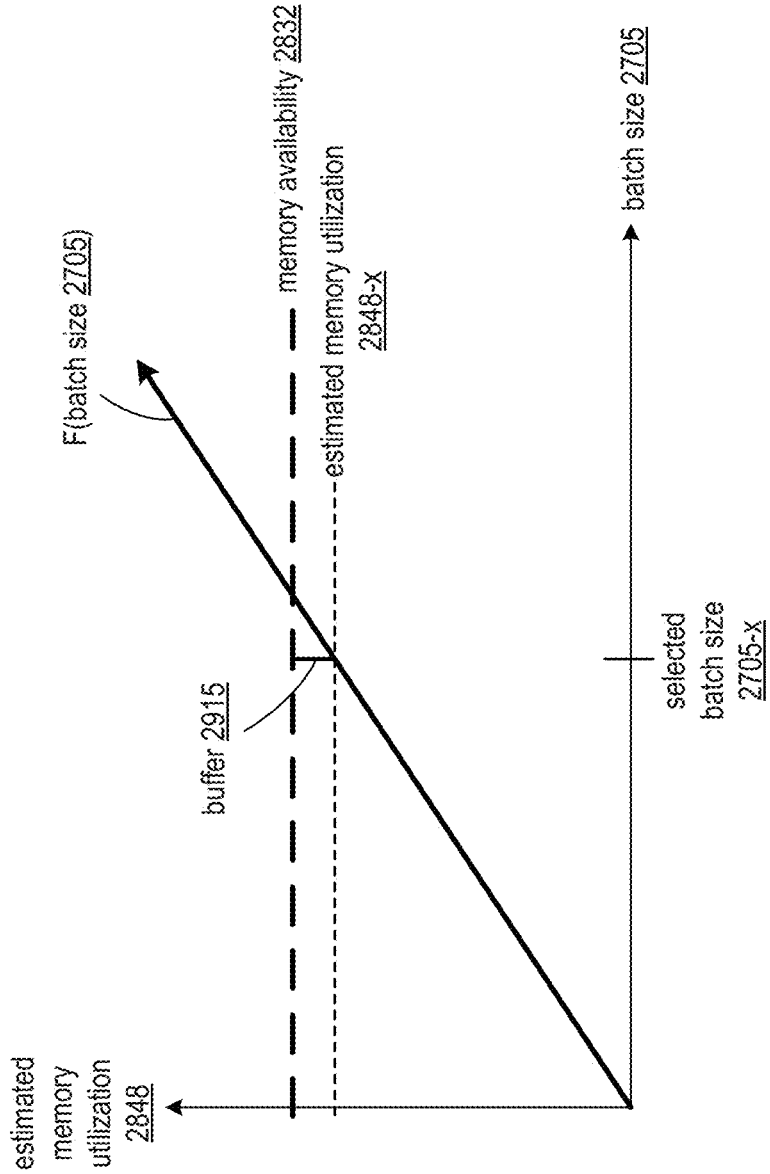
Figure 29B:
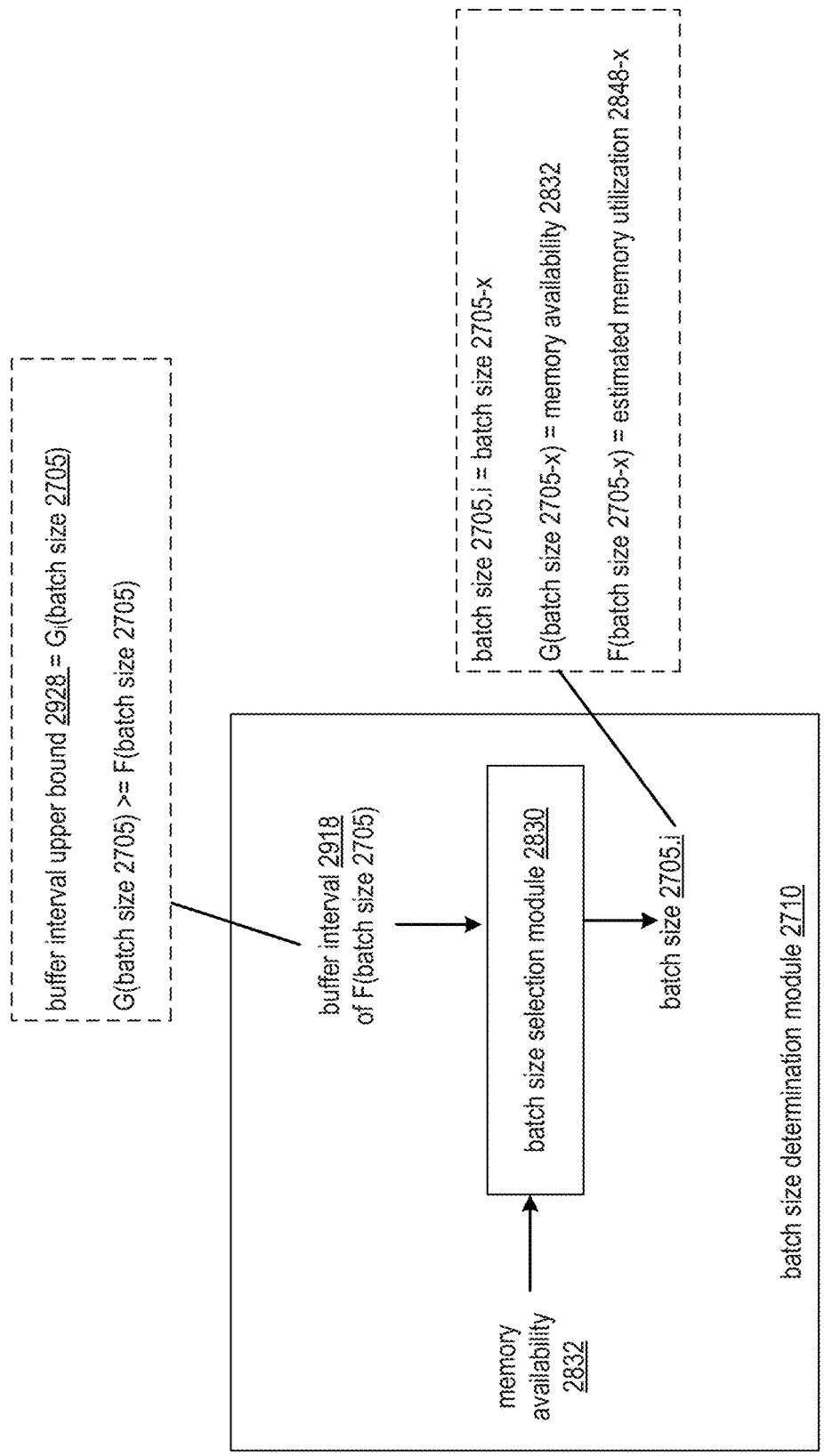
Figure 29C:
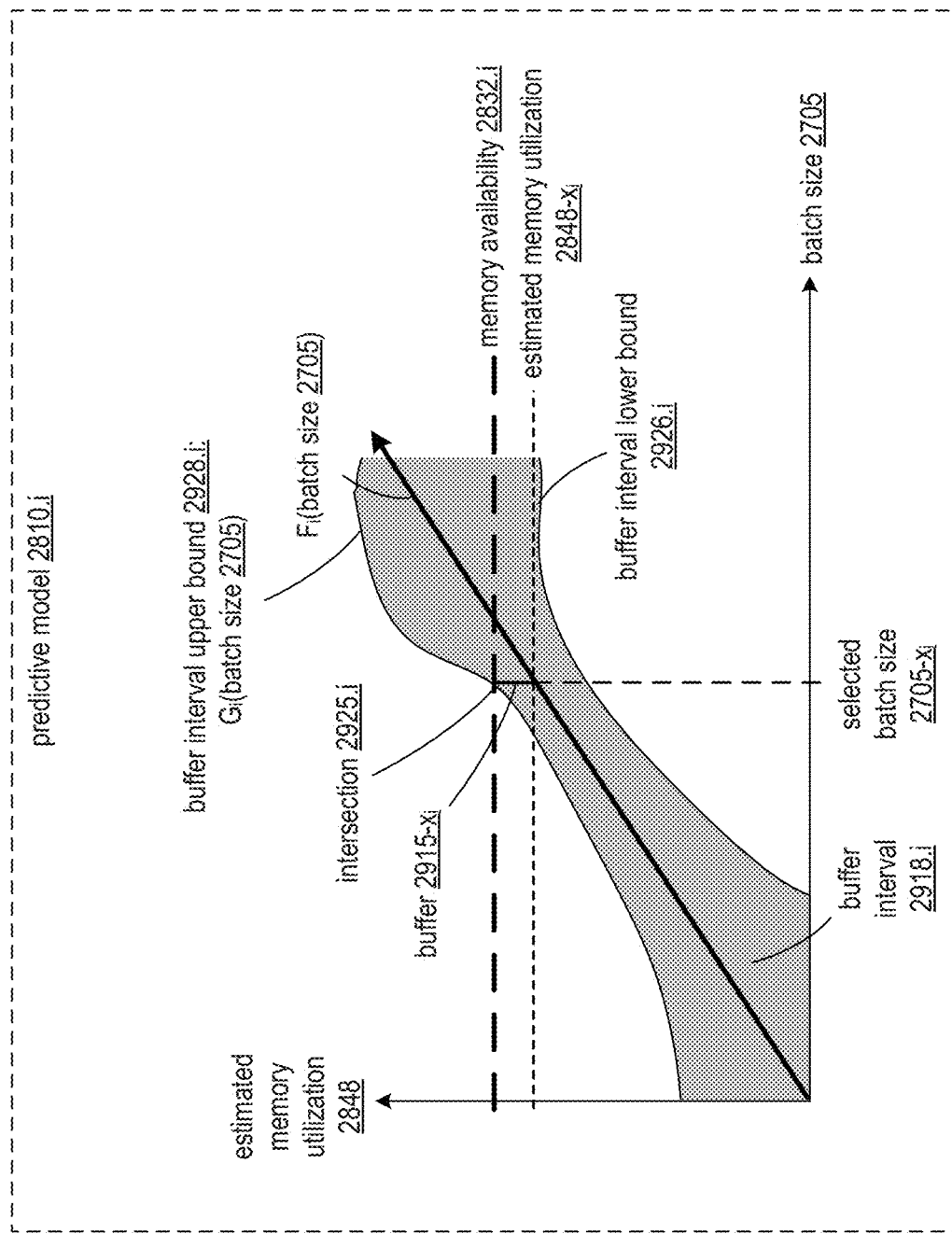
Figure 29D:
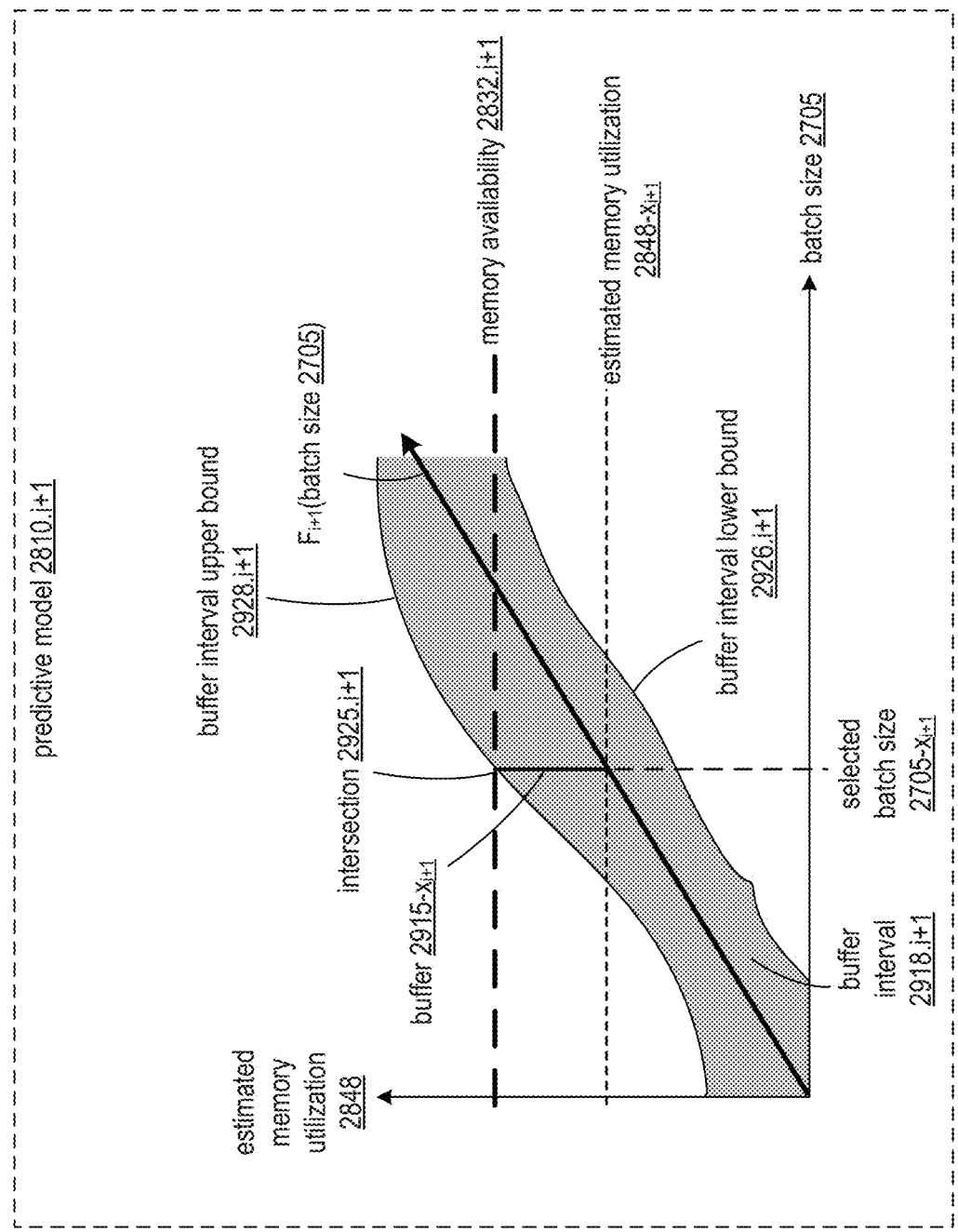
Figure 29E:
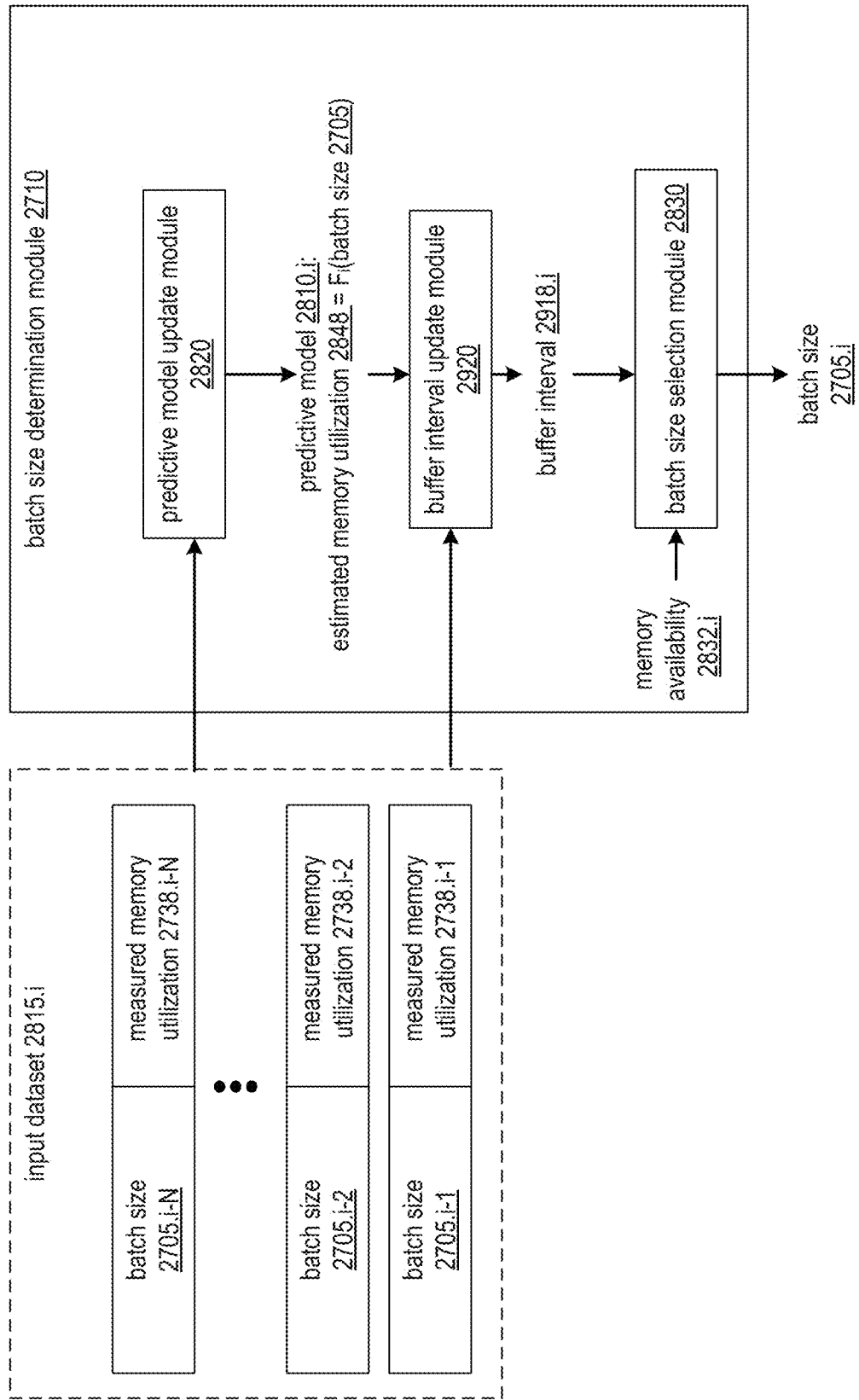
Figure 29F:
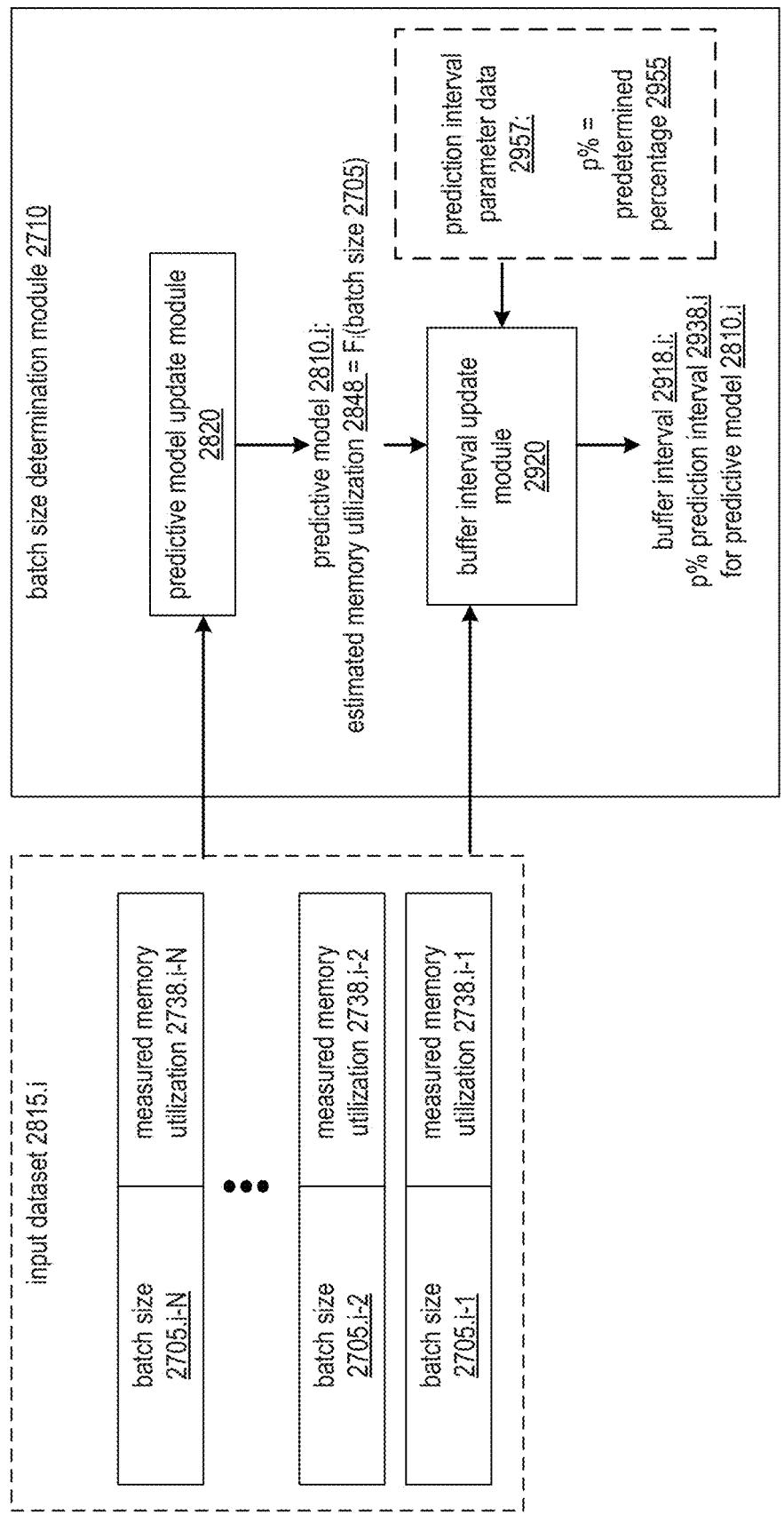
Figure 29G:
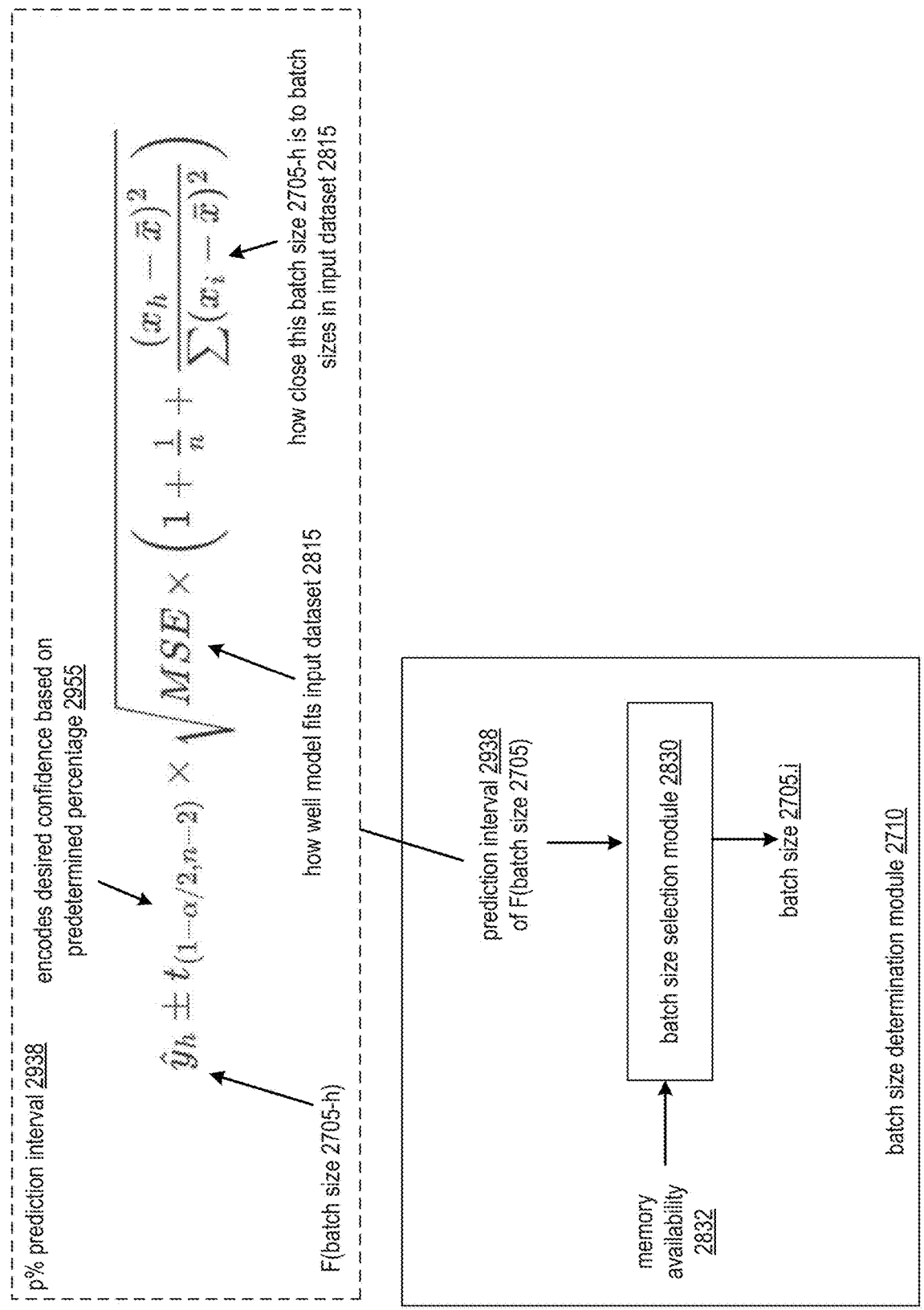
Figure 29H:
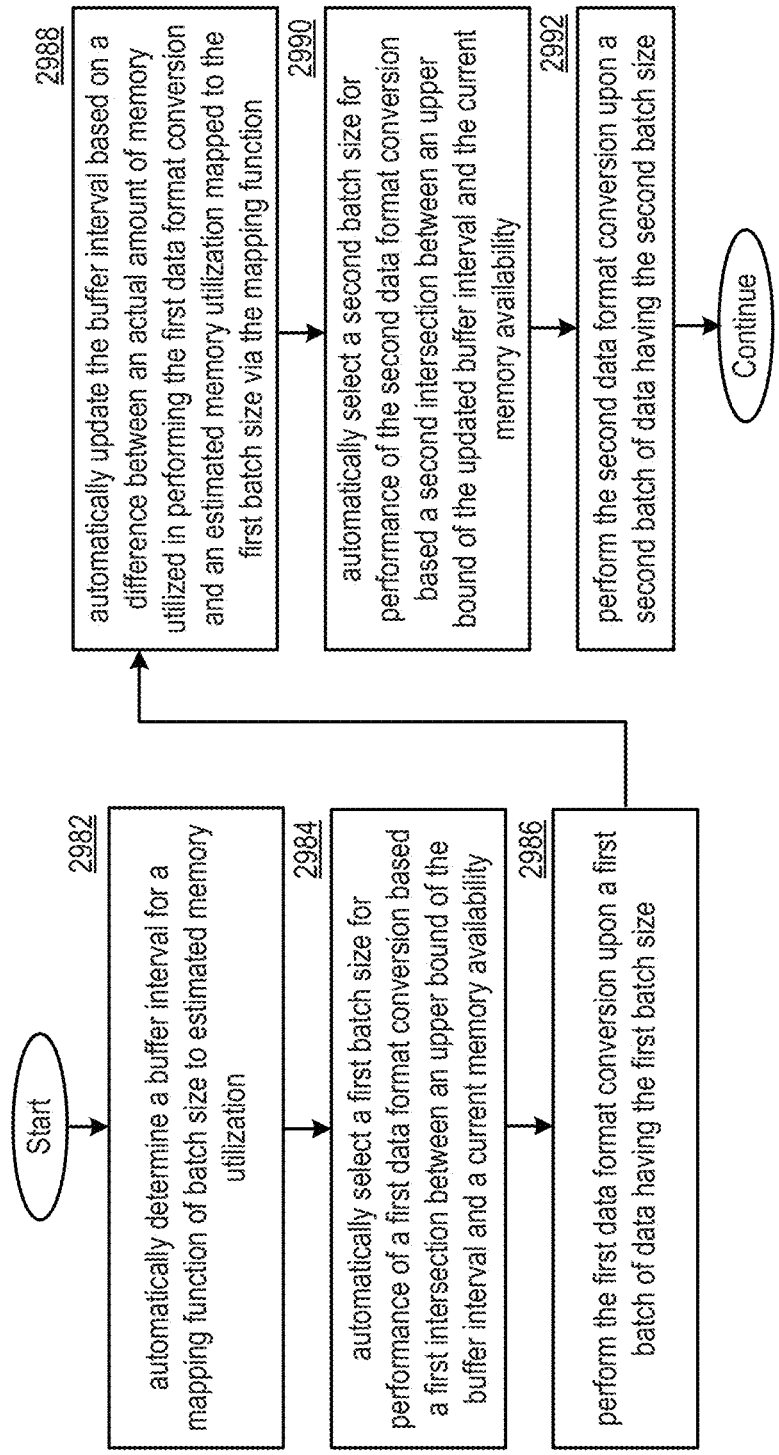
Figure 30A:
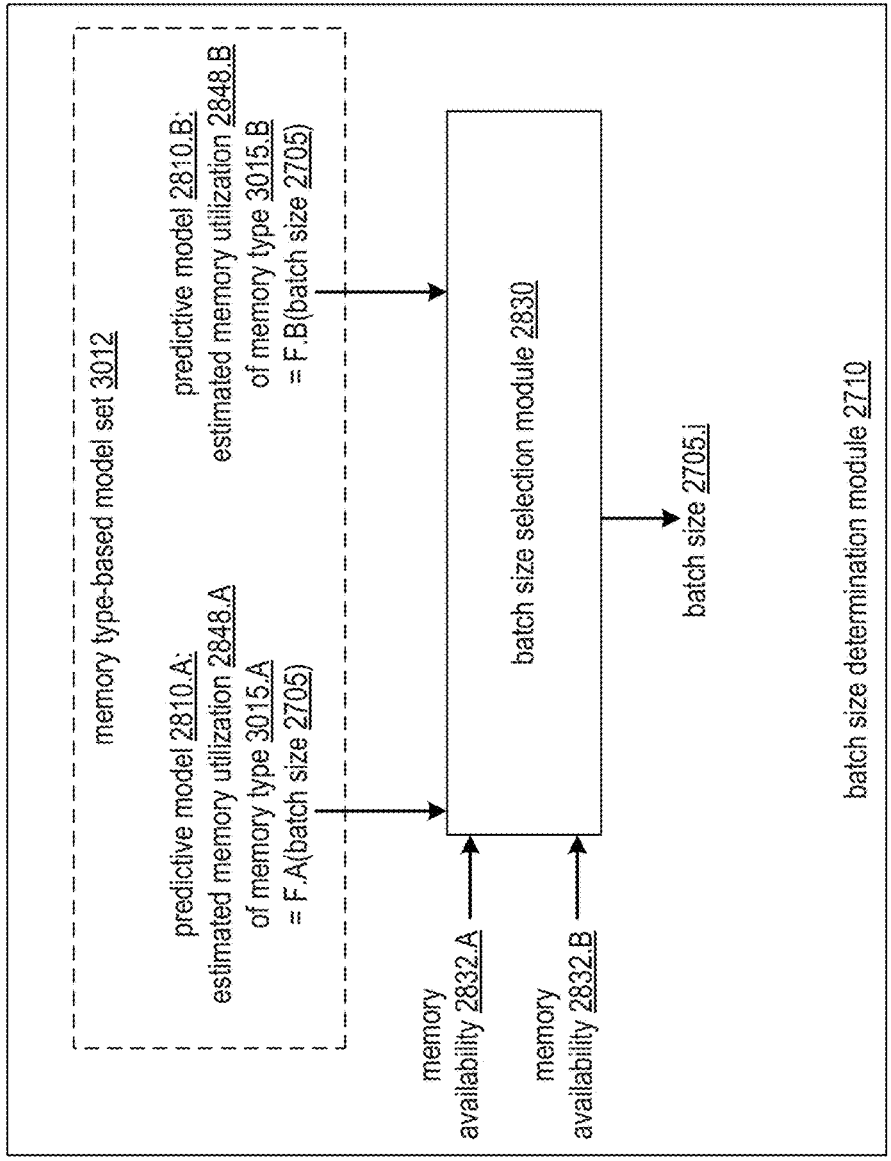
Figure 30C:
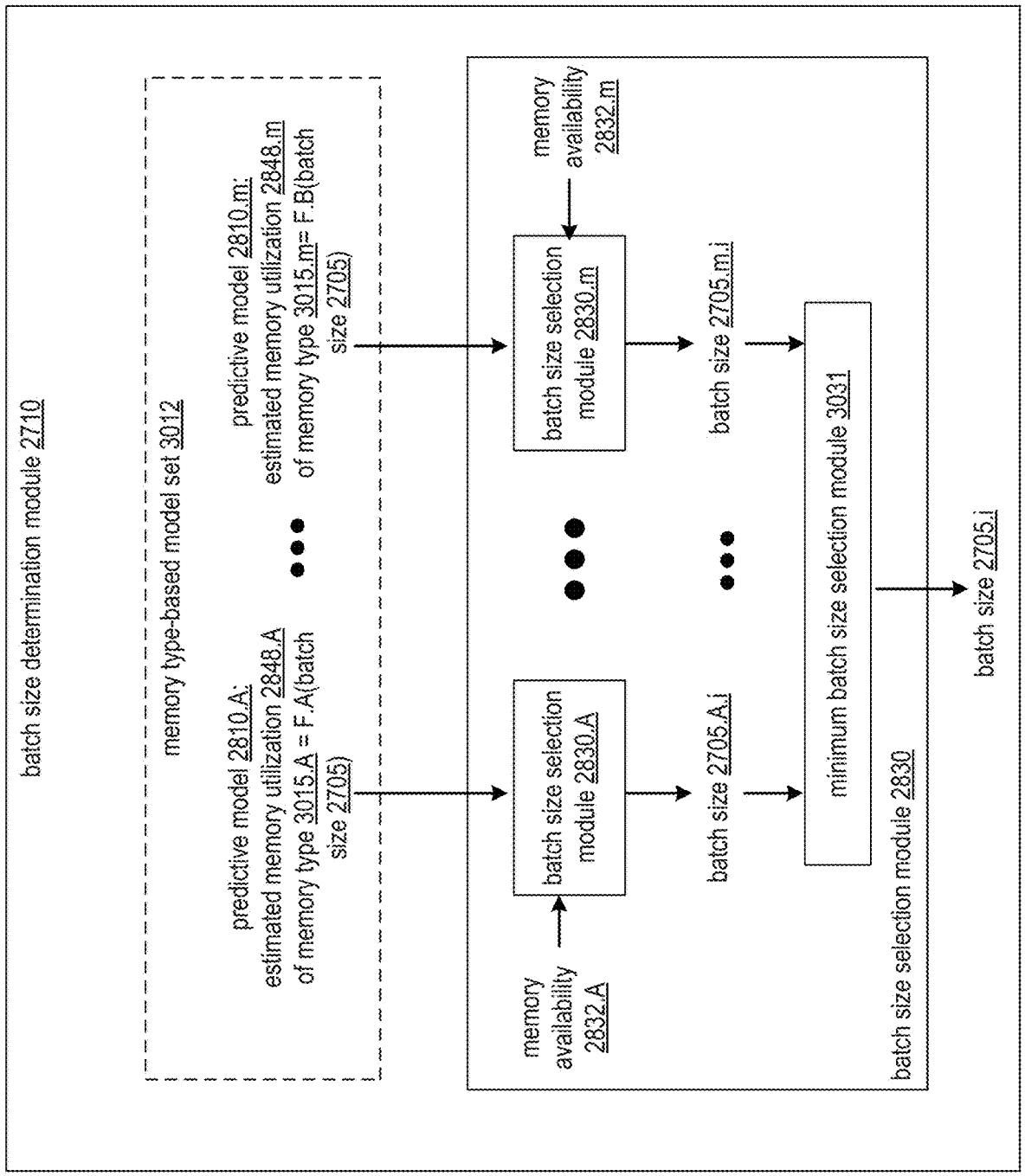
Figure 30D:
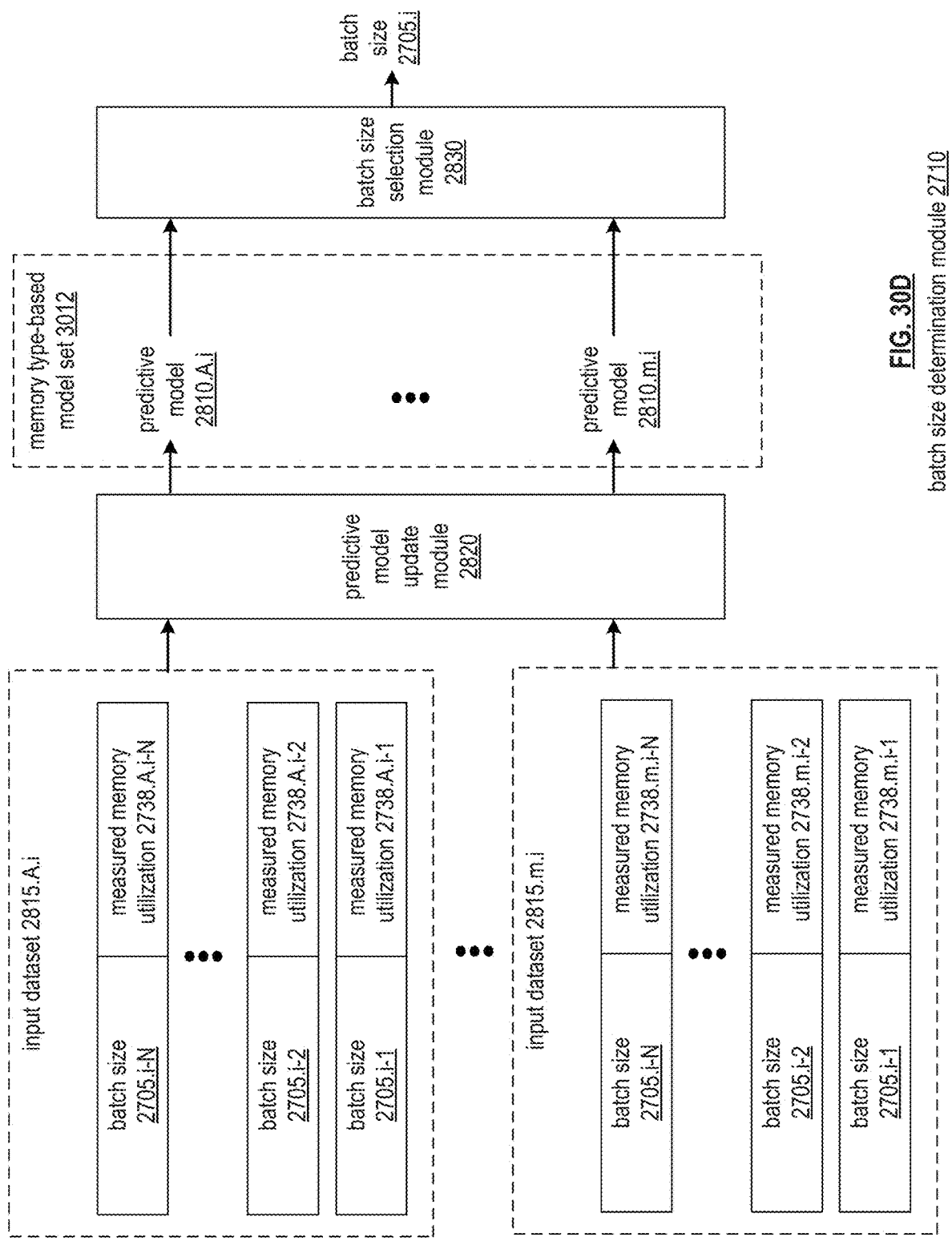
Figure 30E:
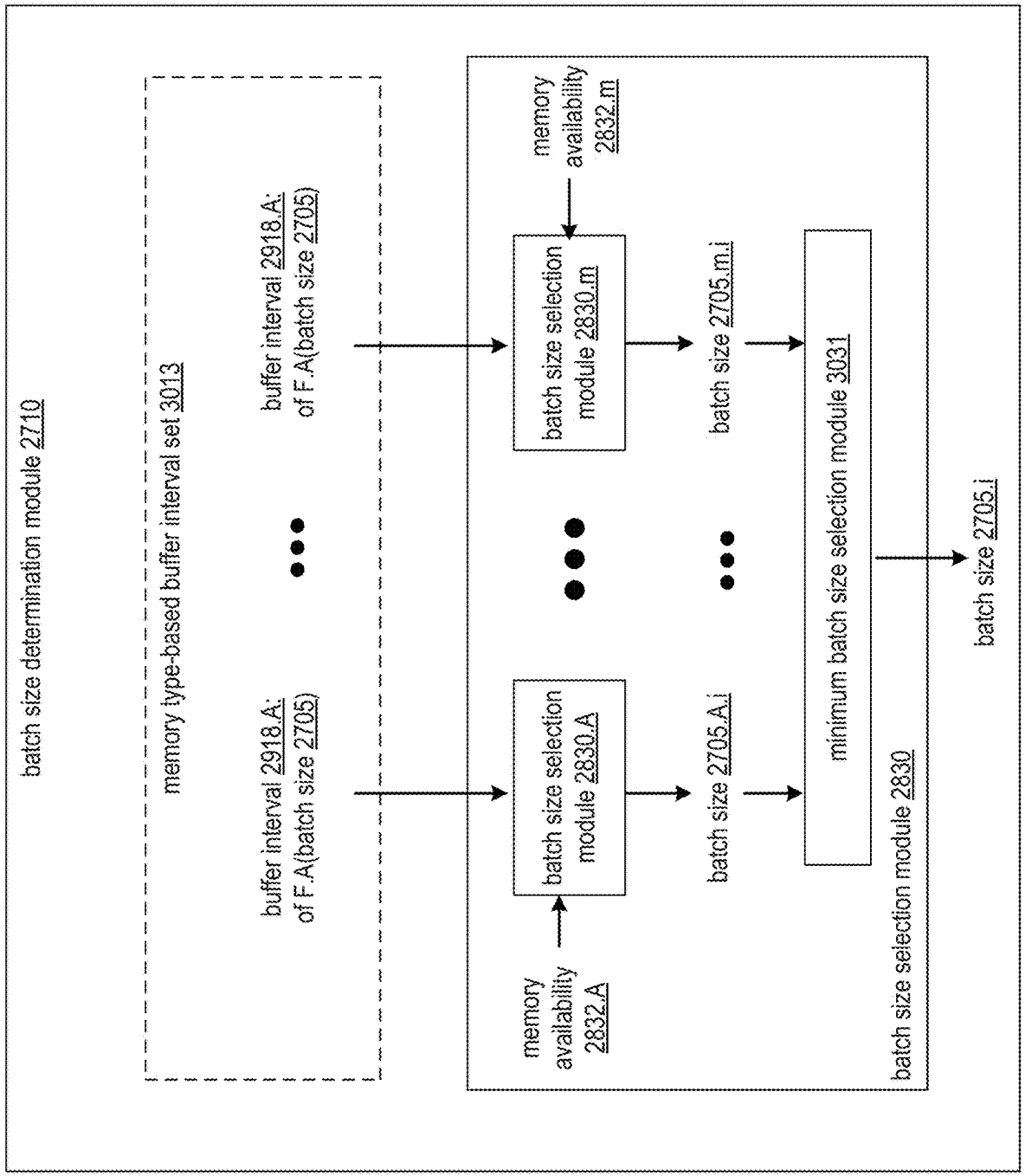
Figure 30F:
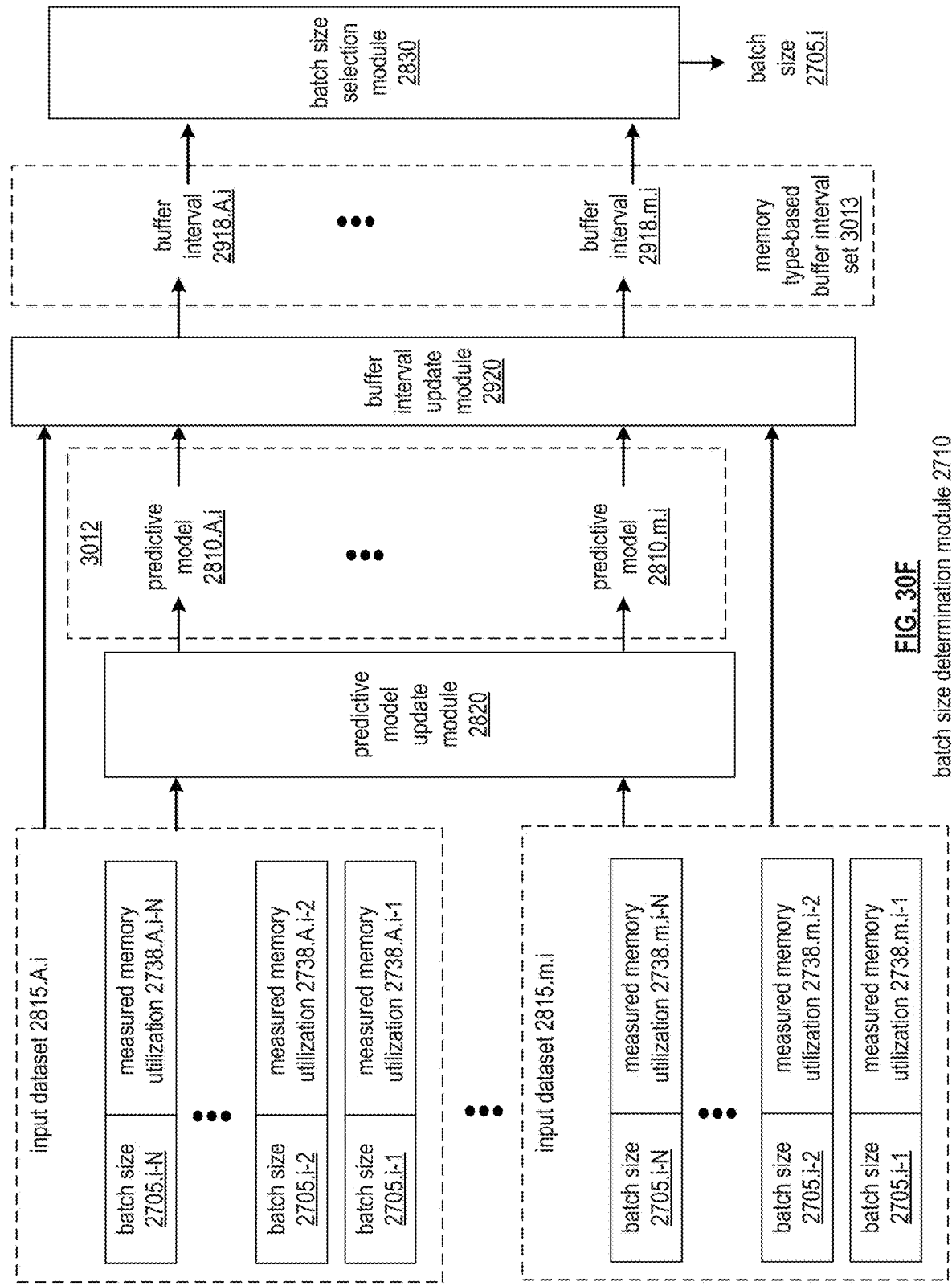
Figure 30G:
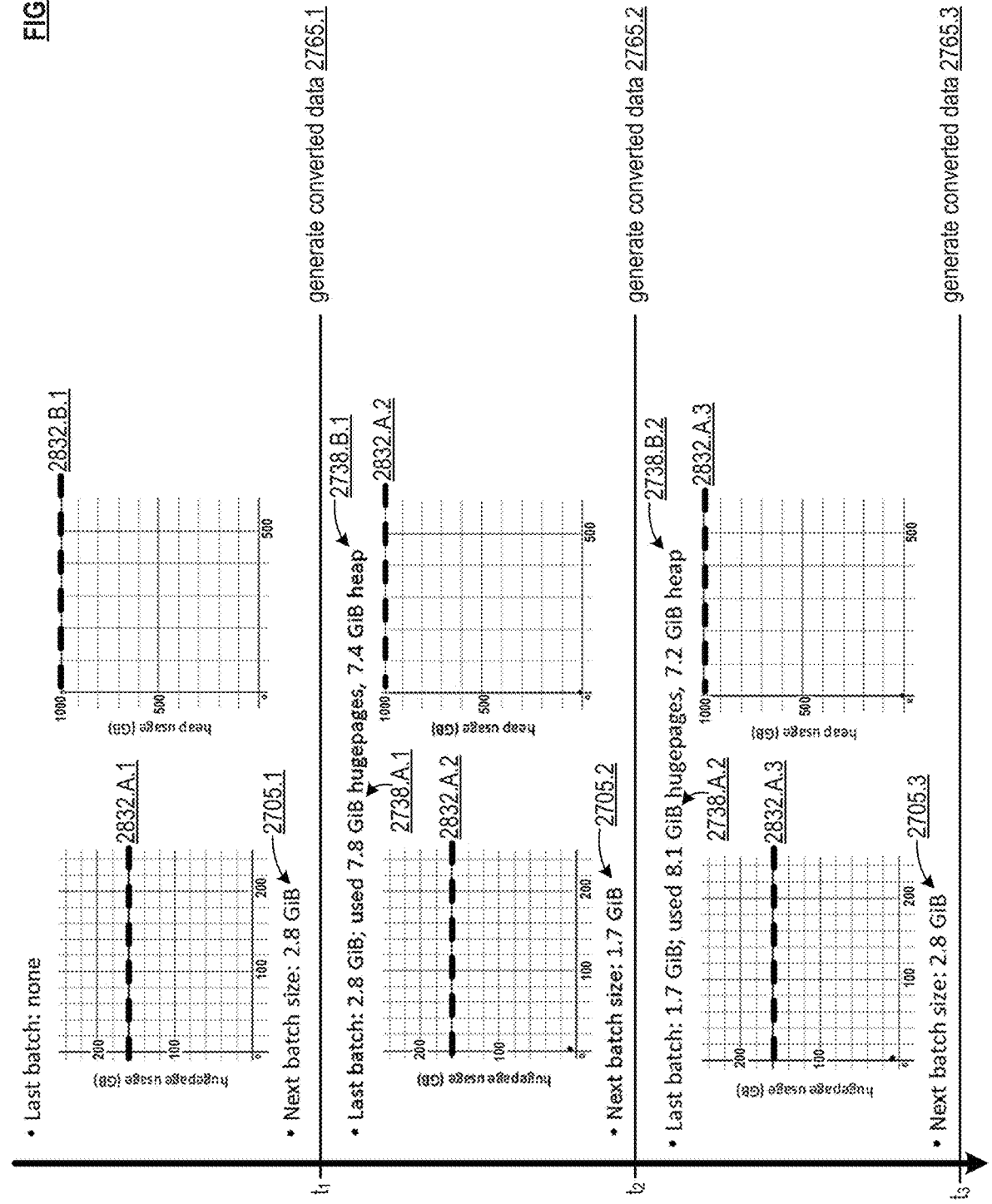
Figure 30H:
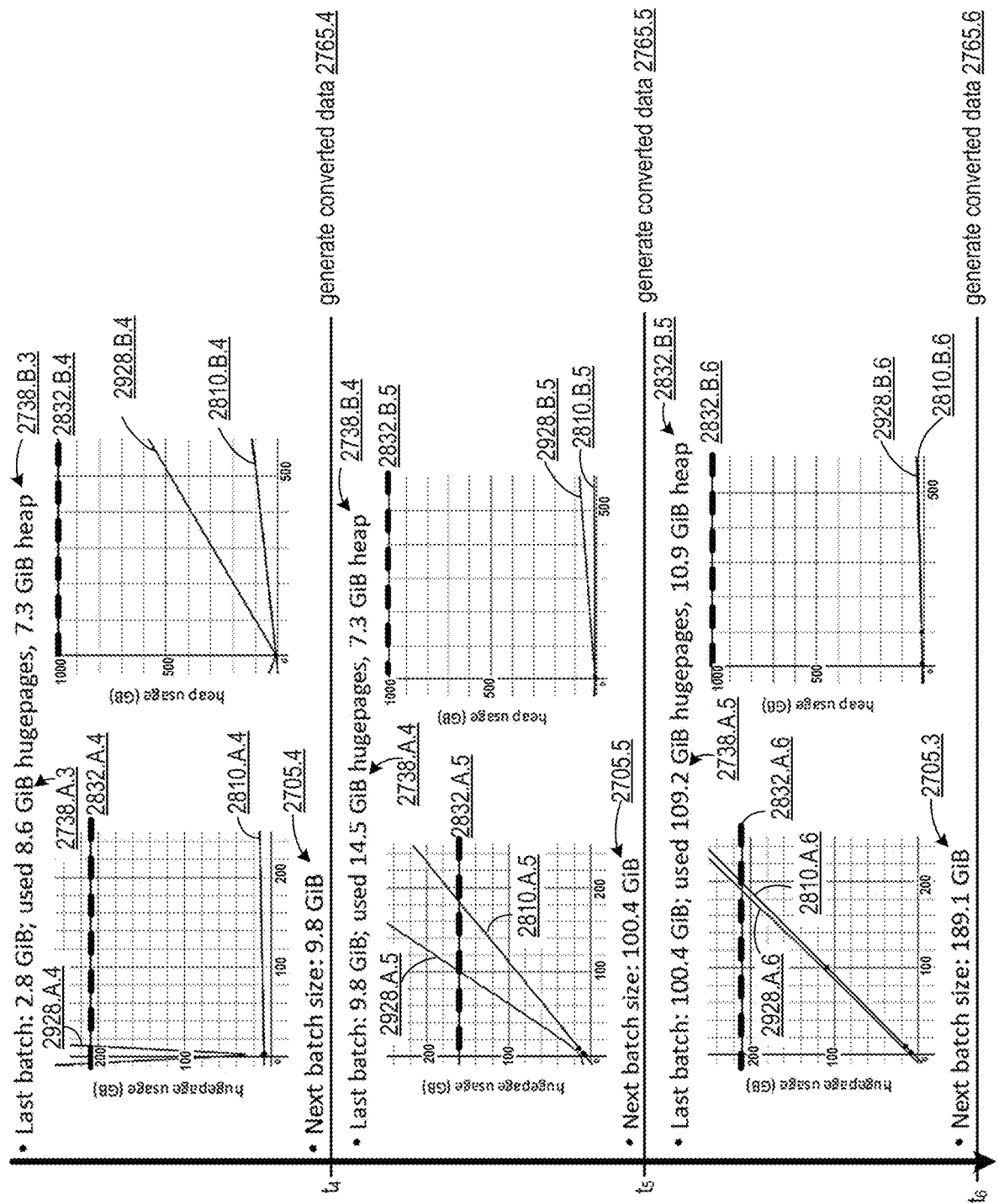
Figure 30I:
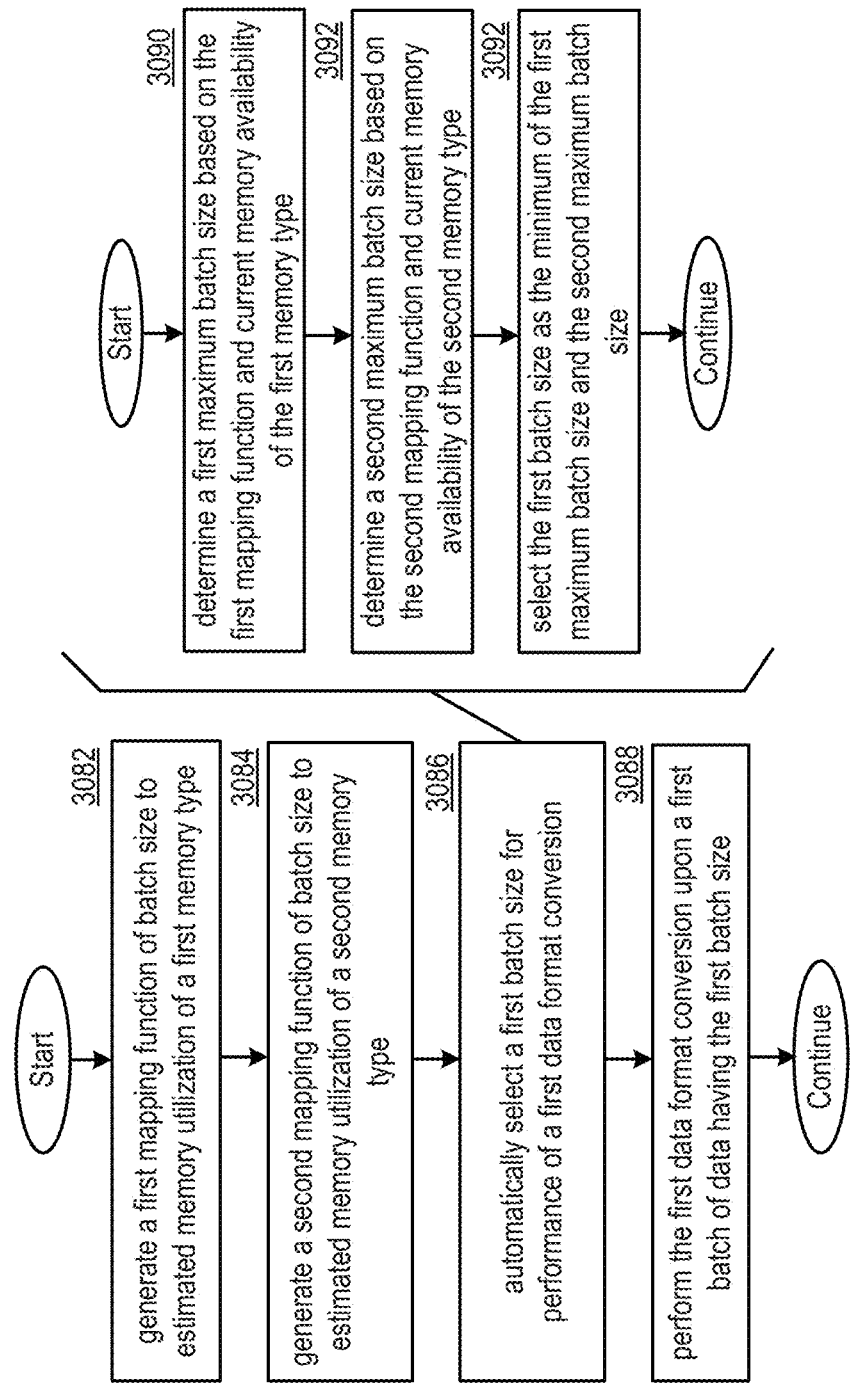

FIG. 27B a schematic block diagram illustrating operation of a data format conversion module and a batch size determination module over time in accordance with various embodiments;

FIG. 27C is a schematic block diagram of a record processing and storage system that implements a page conversion determination module based on a batch size selected via a batch size determination module in accordance with various embodiments;

FIG. 27D is a logic diagram illustrating a method for execution in accordance with various embodiments;

FIG. 28A is a schematic block diagram of a batch size determination module that implements a batch size selection module that selects batch size based on a predictive model in accordance with various embodiments;

FIG. 28B illustrates the relationship between an example mapping function of an example predictive model, an example memory availability, and an example selected batch size in accordance with various embodiments;

FIG. 28C is a schematic block diagram of a batch size determination module that implements a predictive model update module based on an example input dataset in accordance with various embodiments;

FIG. 28D illustrates the relationship between an example mapping function of an example predictive model and an example input dataset in accordance with various embodiments;

FIG. 28E is a schematic block diagram illustrating operation of a batch size selection module and a conversion module and a predictive model update module over time in accordance with various embodiments;

FIG. 28F is a schematic block diagram illustrating initialization of a predictive model based on prior operation of a batch size selection module over time in accordance with various embodiments;

FIG. 28G is a logic diagram illustrating a method for execution in accordance with various embodiments;

FIG. 29A illustrates an example buffer between an example memory availability and example estimated memory utilization mapped to a selected batch size via an example mapping function example mapping function in accordance with various embodiments;

FIG. 29B is a schematic block diagram of a batch size determination module that implements a batch size selection module that select batch size based on a buffer interval in accordance with various embodiments;

FIG. 29C illustrates the relationship between an example buffer interval, an example memory availability, and an example selected batch size for a conversion process in accordance with various embodiments;

FIG. 29D illustrates the relationship between another example buffer interval, another example memory availability, and another example selected batch size for a subsequent conversion process in accordance with various embodiments;

FIG. 29E is a schematic block diagram of a batch size determination module that implements a buffer interval update module based on predictive model and an input dataset in accordance with various embodiments;

FIG. 29F is a schematic block diagram of a batch size determination module that implements a buffer interval update module that generates a prediction interval based on prediction interval parameter data in accordance with various embodiments;

FIG. 29G is a schematic block diagram of a batch size determination module that implements a batch size selection module that selects batch size based on a prediction interval for a mapping function of a predictive model in accordance with various embodiments;

FIG. 29H is a logic diagram illustrating a method for execution in accordance with various embodiments;

FIG. 30A is a schematic block diagram of a batch size determination module that implements a batch size selection module that selects batch size based on multiple predictive models for multiple memory types in accordance with various embodiments;

FIG. 30B is a schematic block diagram of a data format conversion module that generates converted data from a batch of data based on utilizing memory resources of multiple memory types in accordance with various embodiments;

FIG. 30C is a schematic block diagram of a batch size determination module that implements a batch size selection module that selects batch size based on applying a minimum batch size selection module for multiple batch sizes identified via multiple corresponding predictive models in accordance with various embodiments;

FIG. 30D is a schematic block diagram of a predictive model update module that generates multiple predictive models from multiple corresponding input datasets in accordance with various embodiments;

FIG. 30E is a schematic block diagram of a batch size determination module that implements a batch size selection module that selects batch size based on applying a minimum batch size selection module for multiple batch sizes identified via multiple corresponding buffer intervals in accordance with various embodiments;

FIG. 30F is a schematic block diagram of a predictive model update module that generates multiple buffer intervals from multiple corresponding predictive models and multiple corresponding input datasets in accordance with various embodiments;

FIGS. 30G-30H illustrates example selection of example batch sizes for a set of consecutive conversion processes over time in accordance with various embodiments; and FIG. 30I is a logic diagram illustrating a method for execution in accordance with various embodiments.

DETAILED DESCRIPTION OF THE INVENTION

Figure 1:
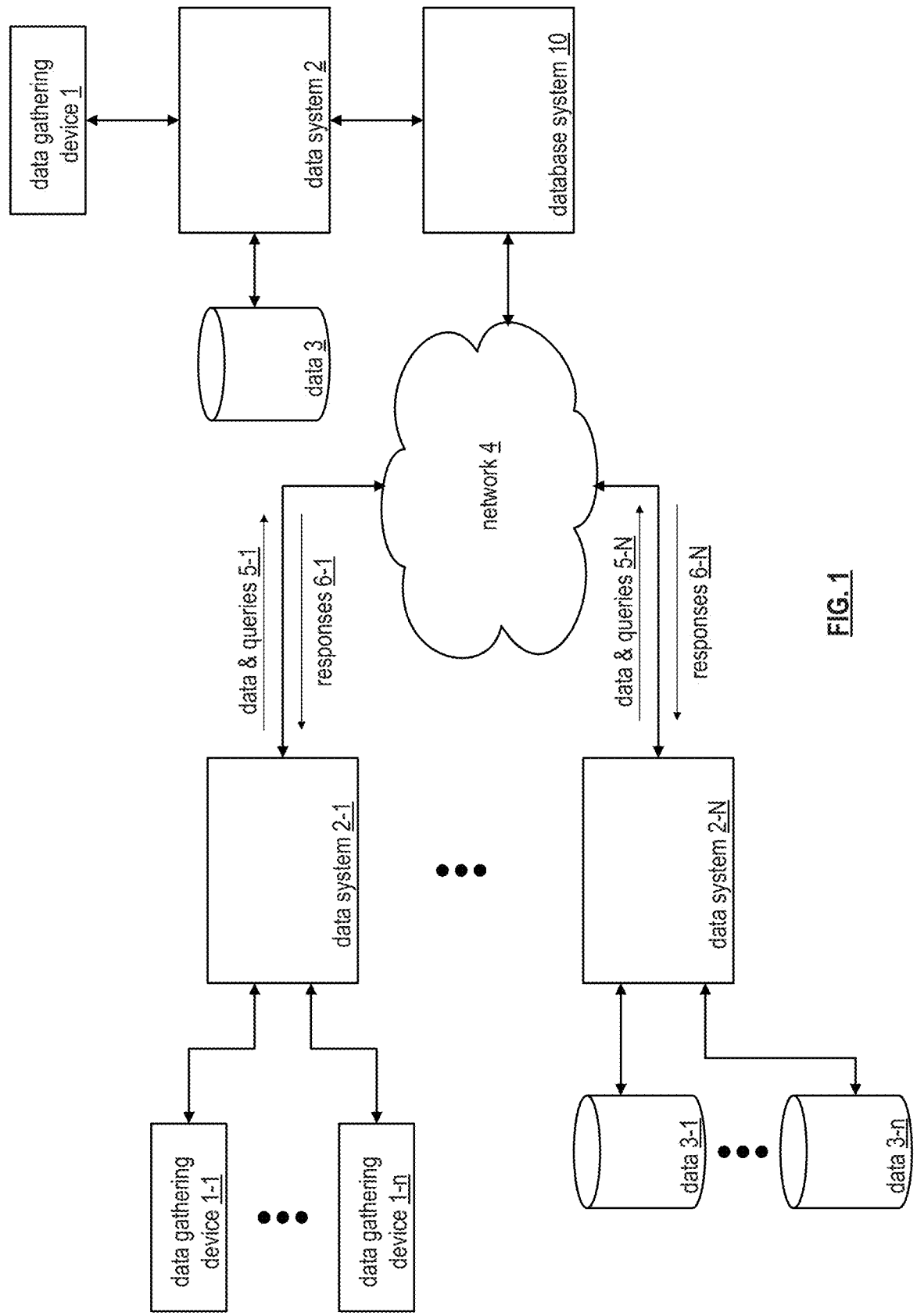
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
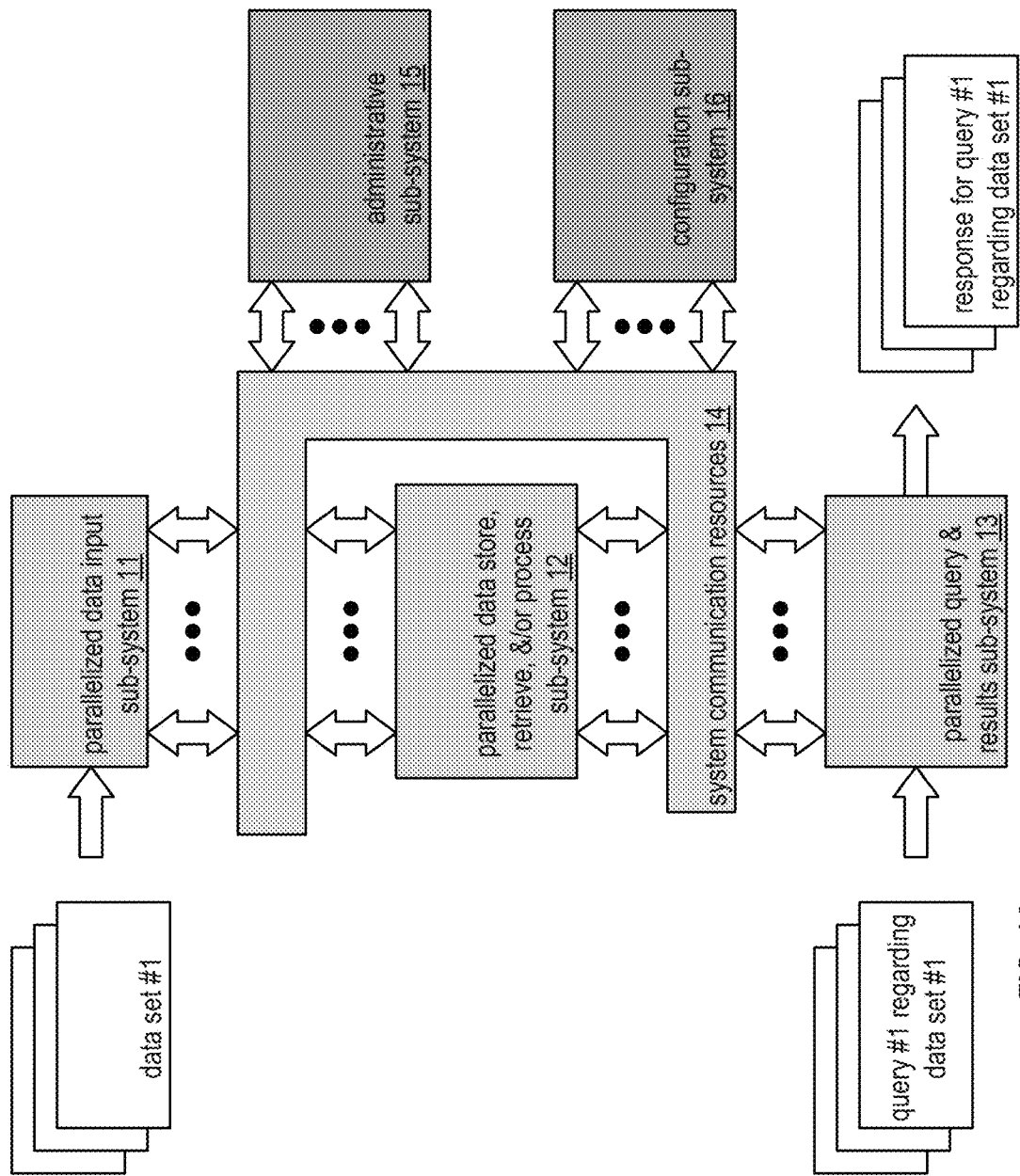
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates an SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
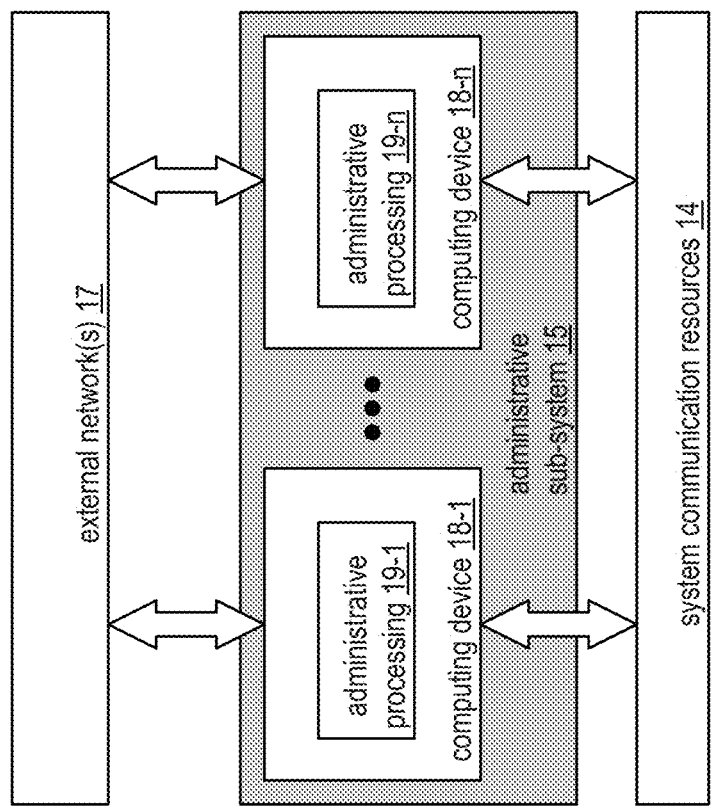
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
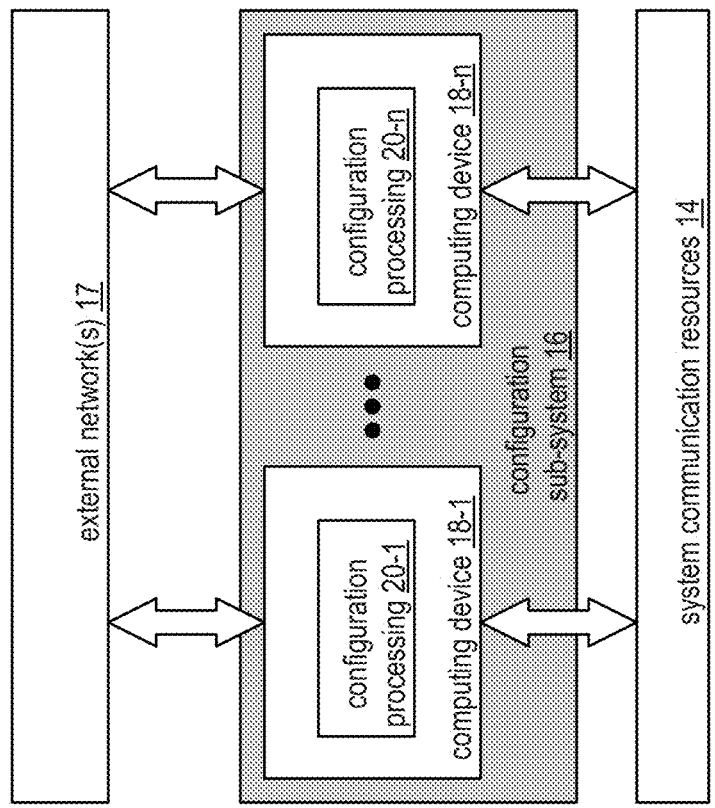
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
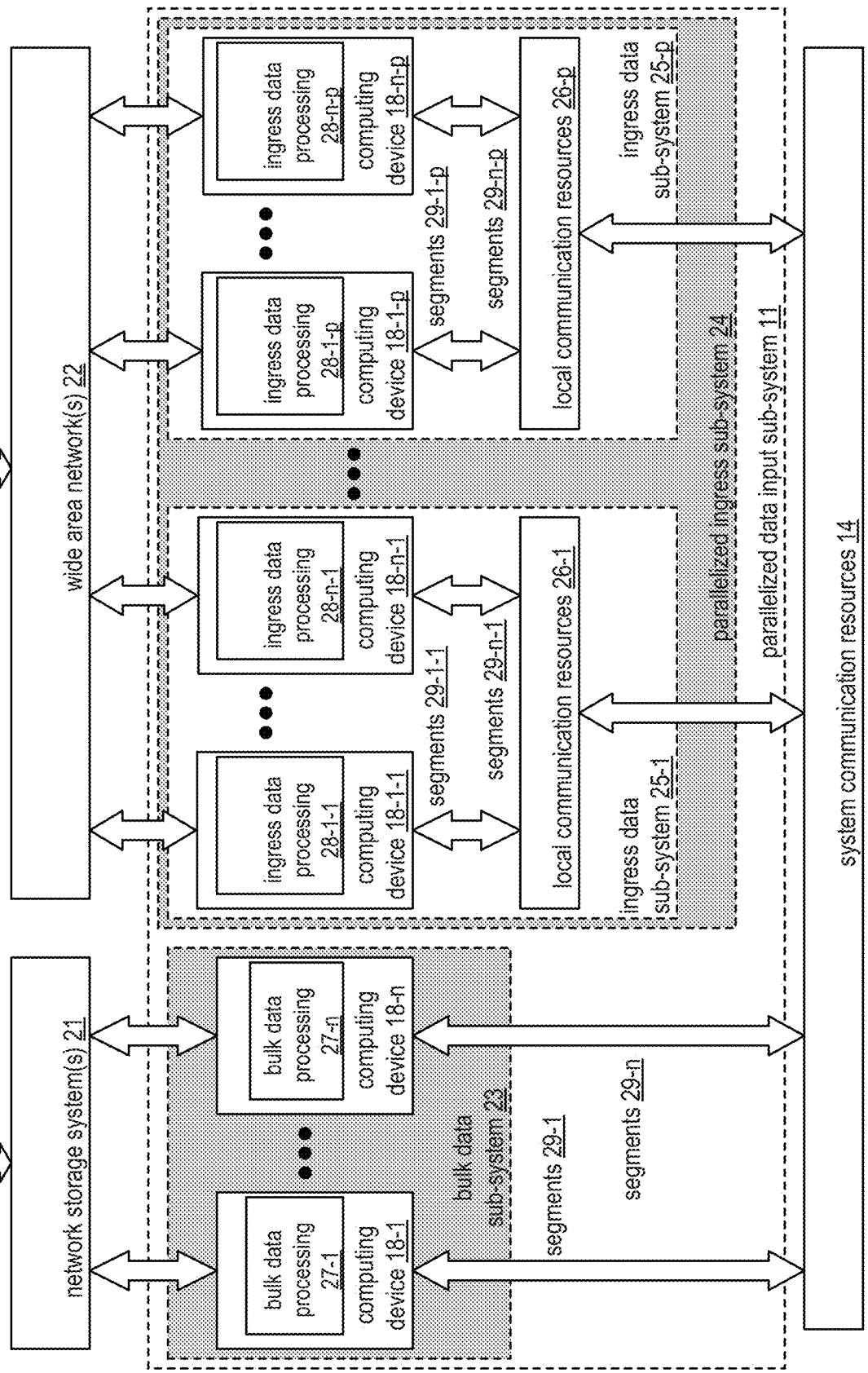
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through **25-*p*, data from a plurality of tables can be streamed into the database system 10** at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
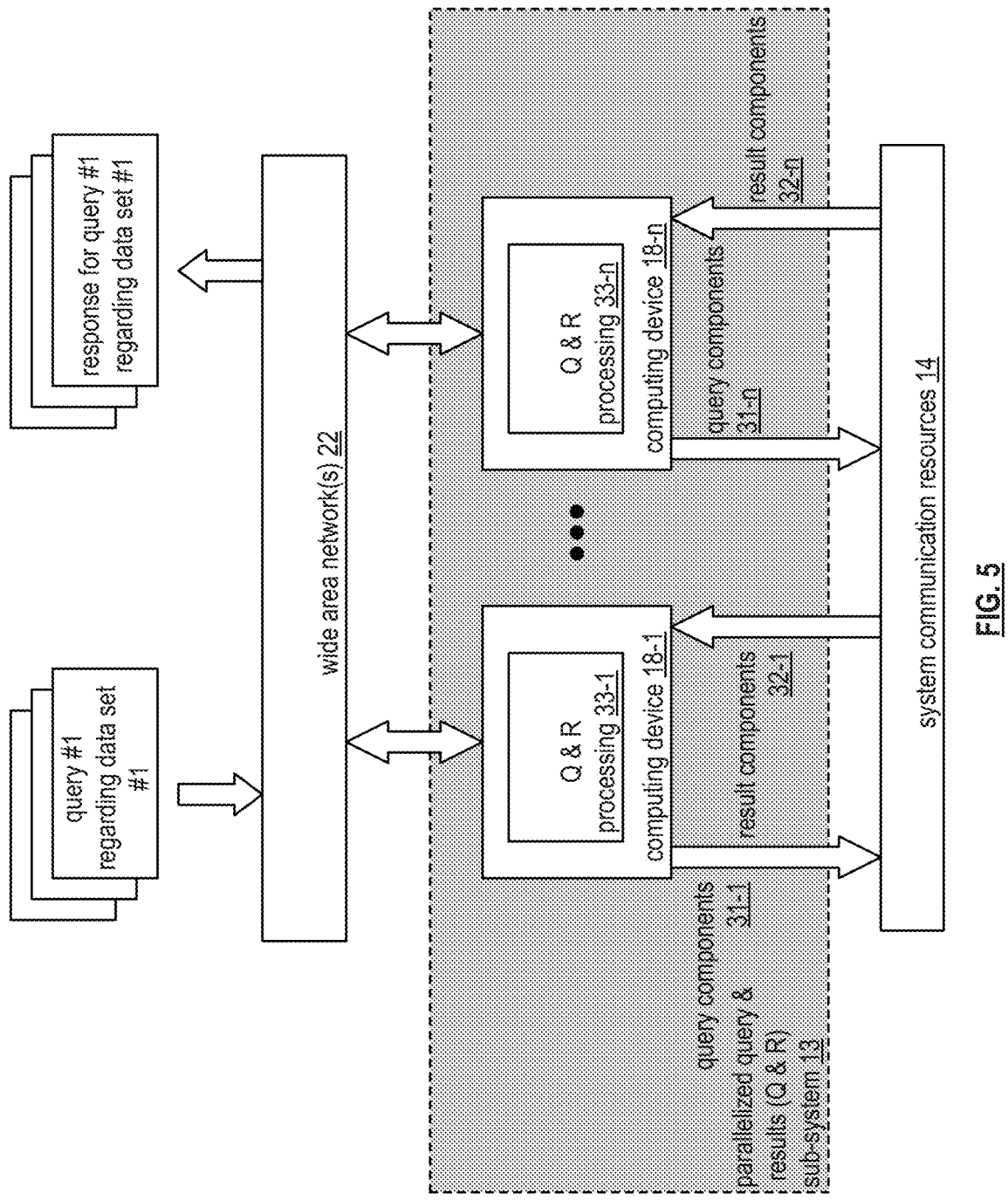
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through **18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12**.

Processing resources of the parallelized data store, retrieve, &/or process sub-system 12 processes the components of the optimized plan to produce results components 32-1 through **32-*n*. The computing device of the Q&R sub-system 13** processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
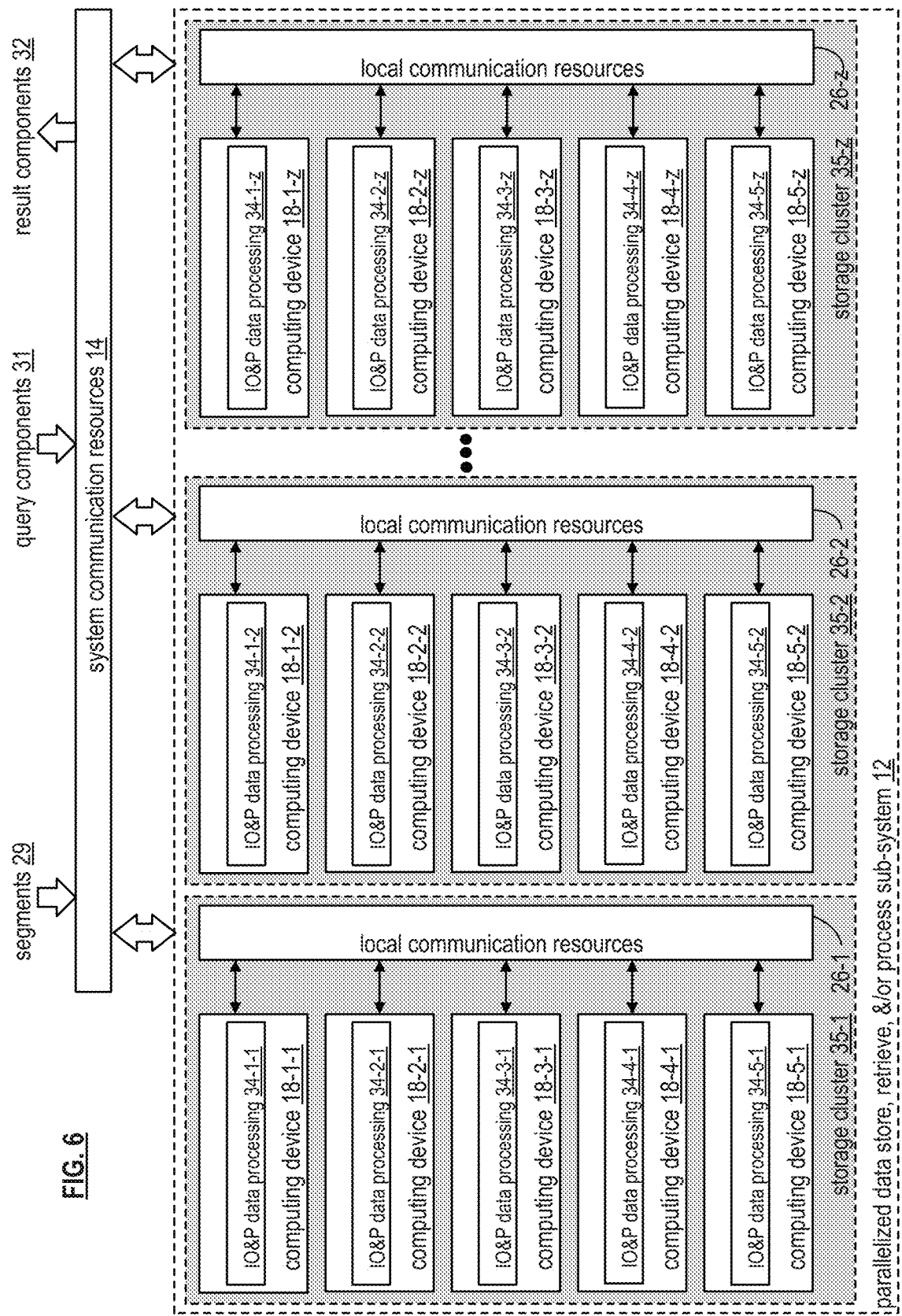
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through **35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5** to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through **35-*n* are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1** is storing and/or processing a second segment group while it is storing/or and processing a first segment group.

Figure 7:
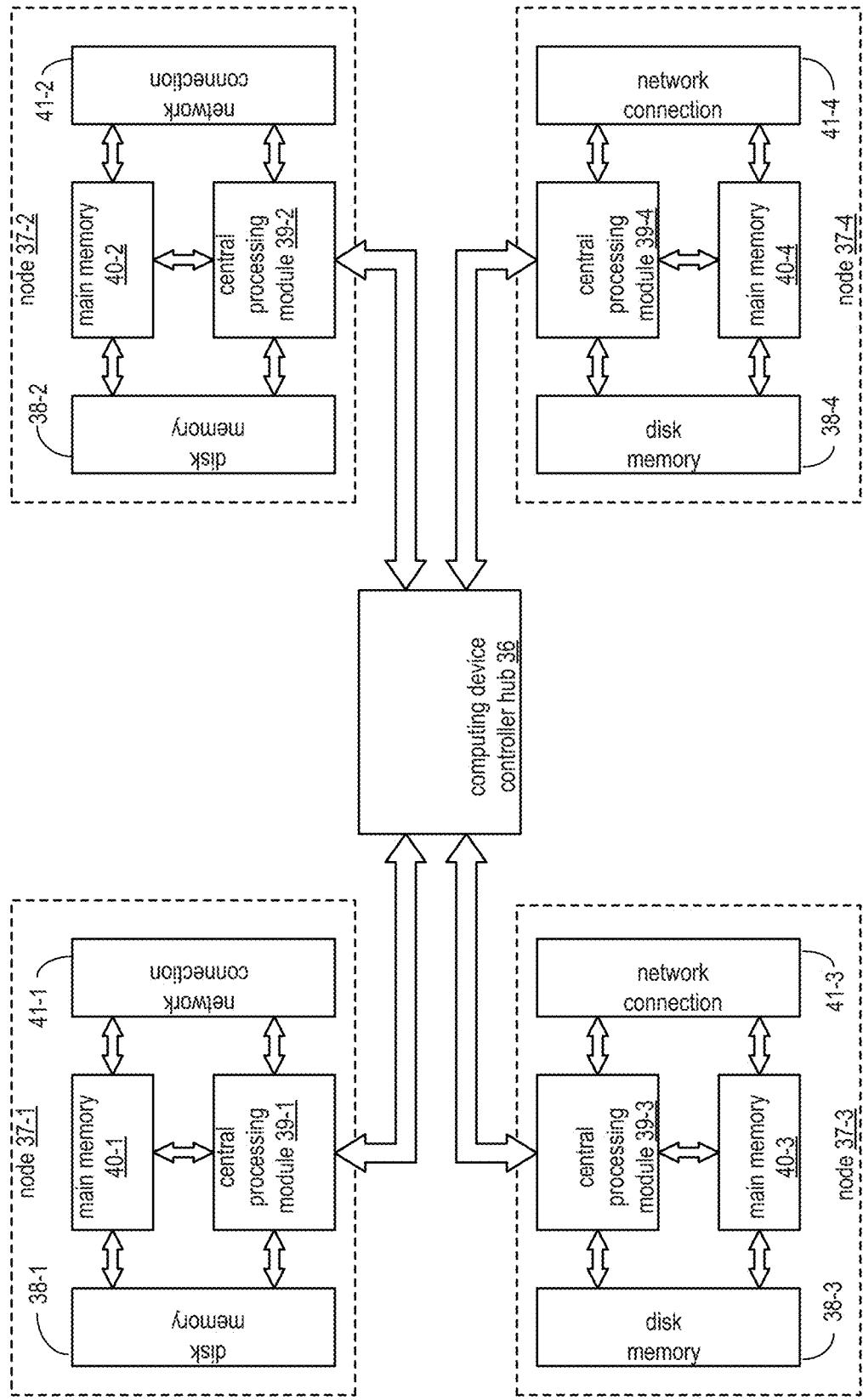
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
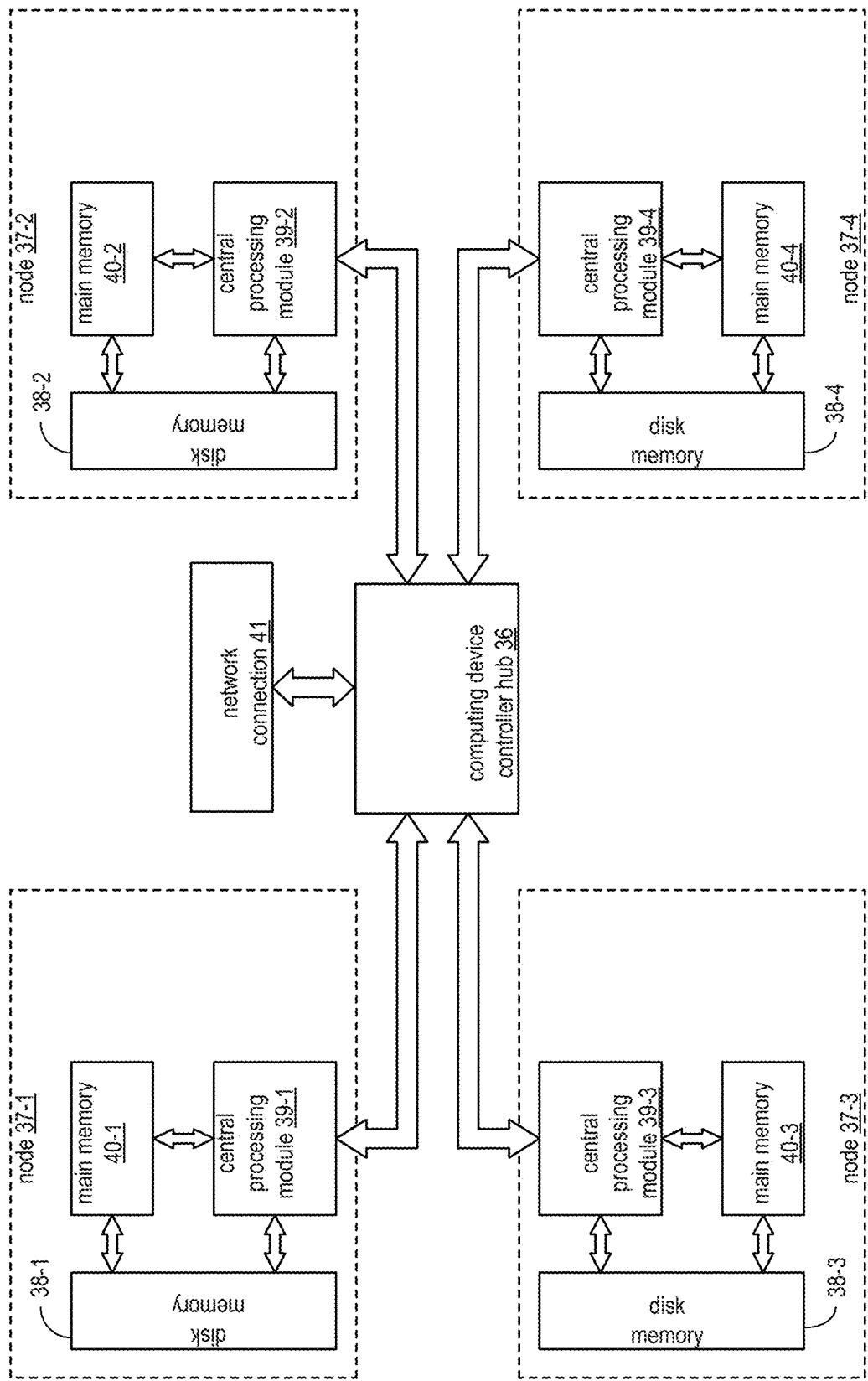
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
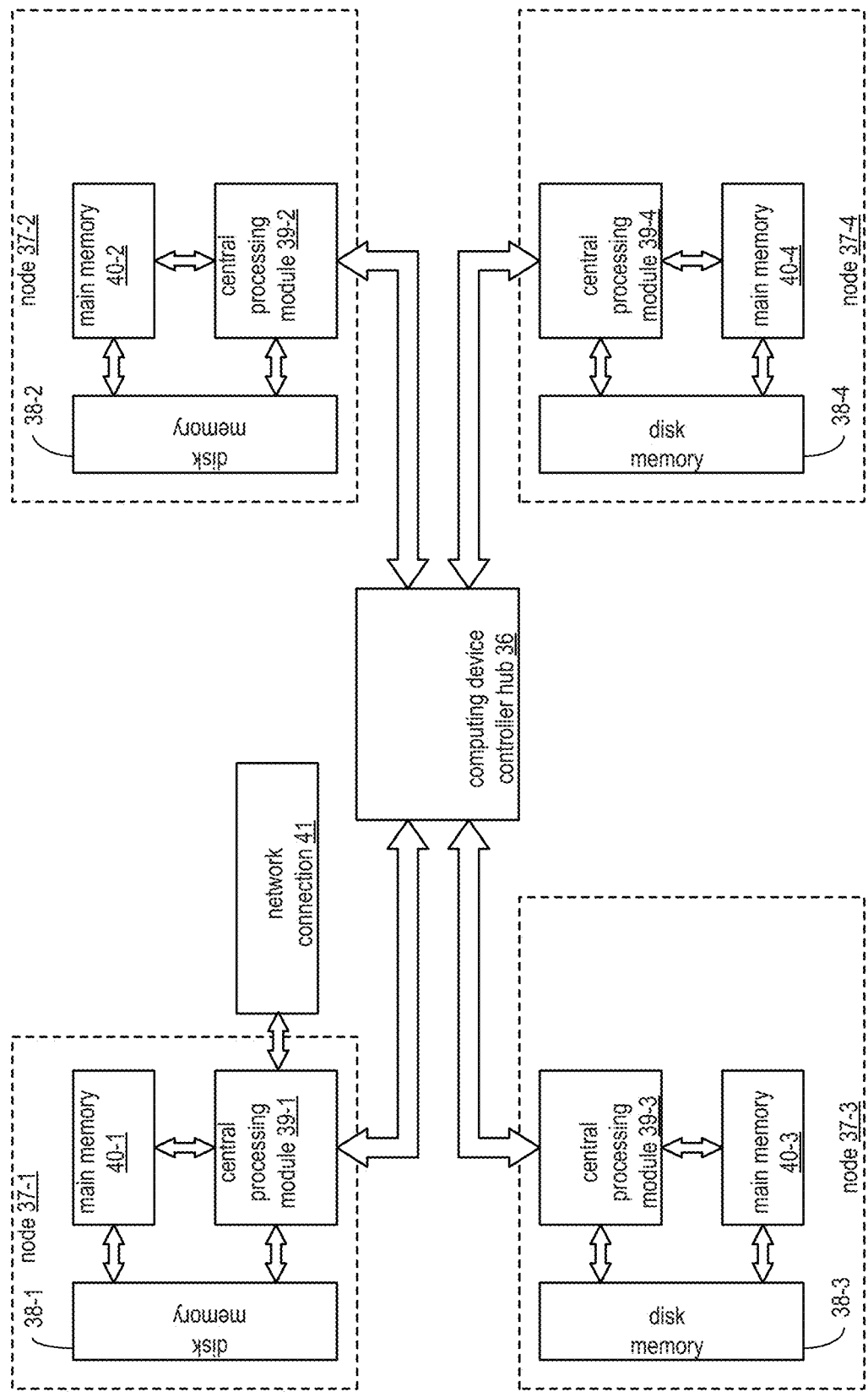
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
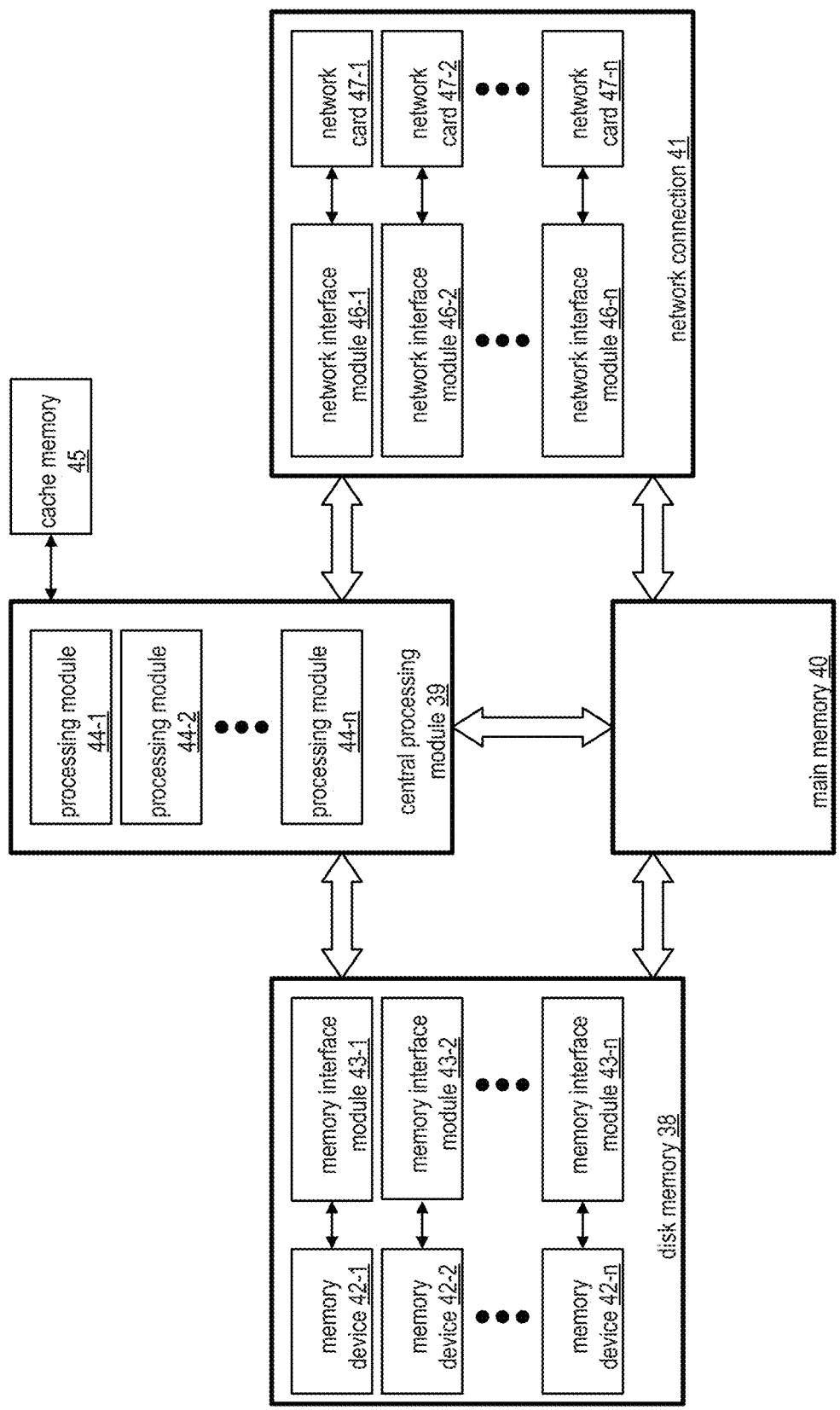
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
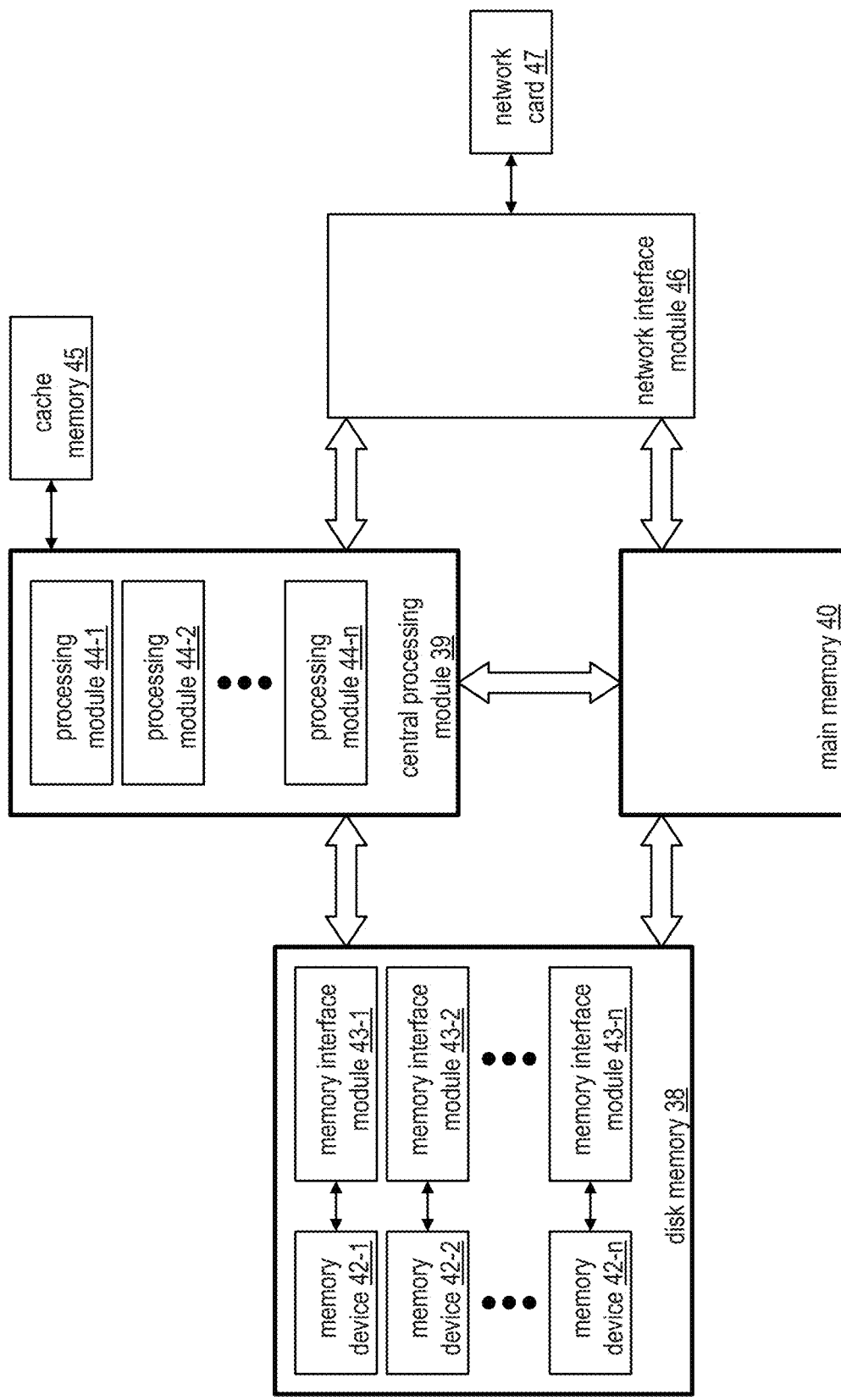
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
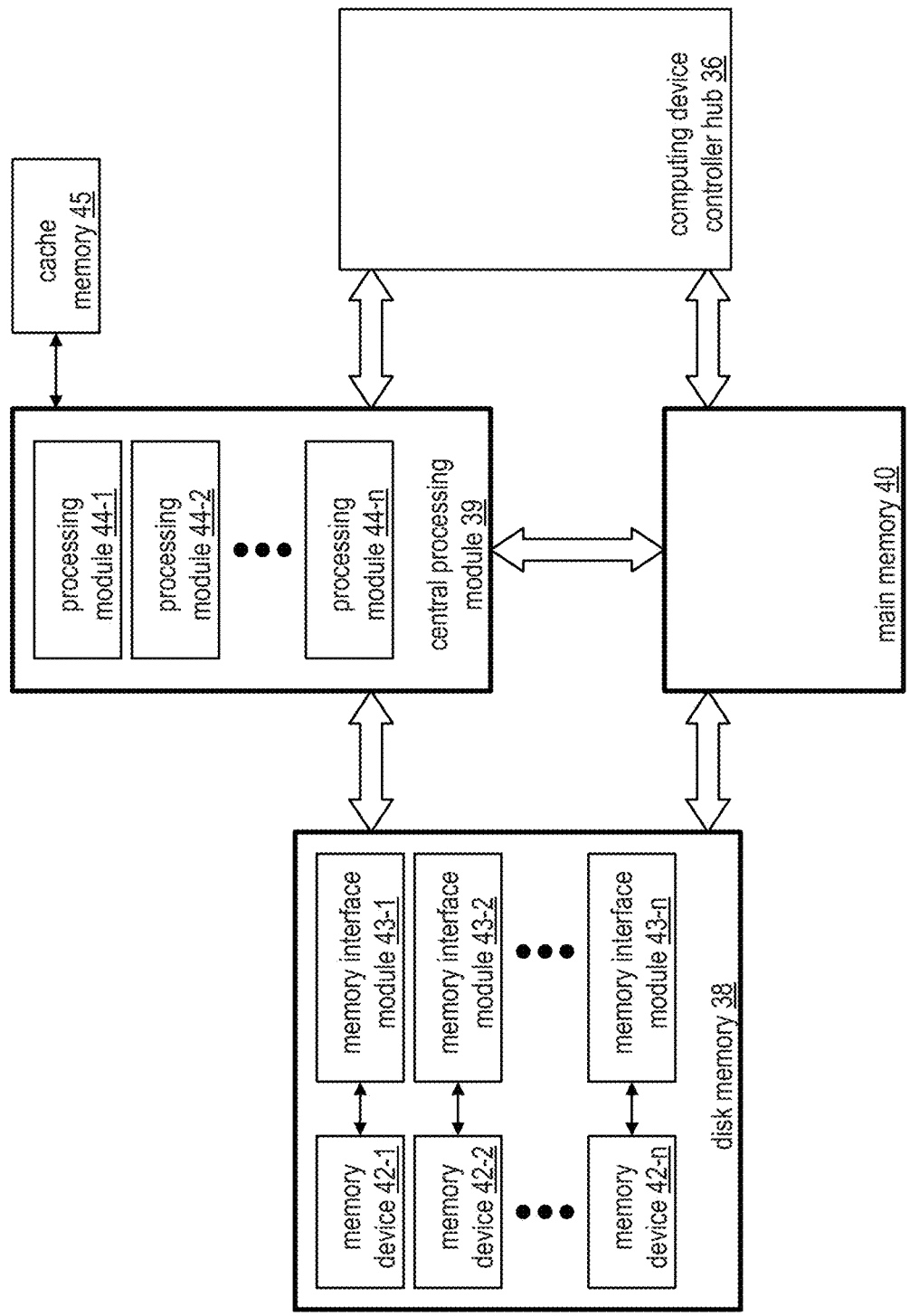
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
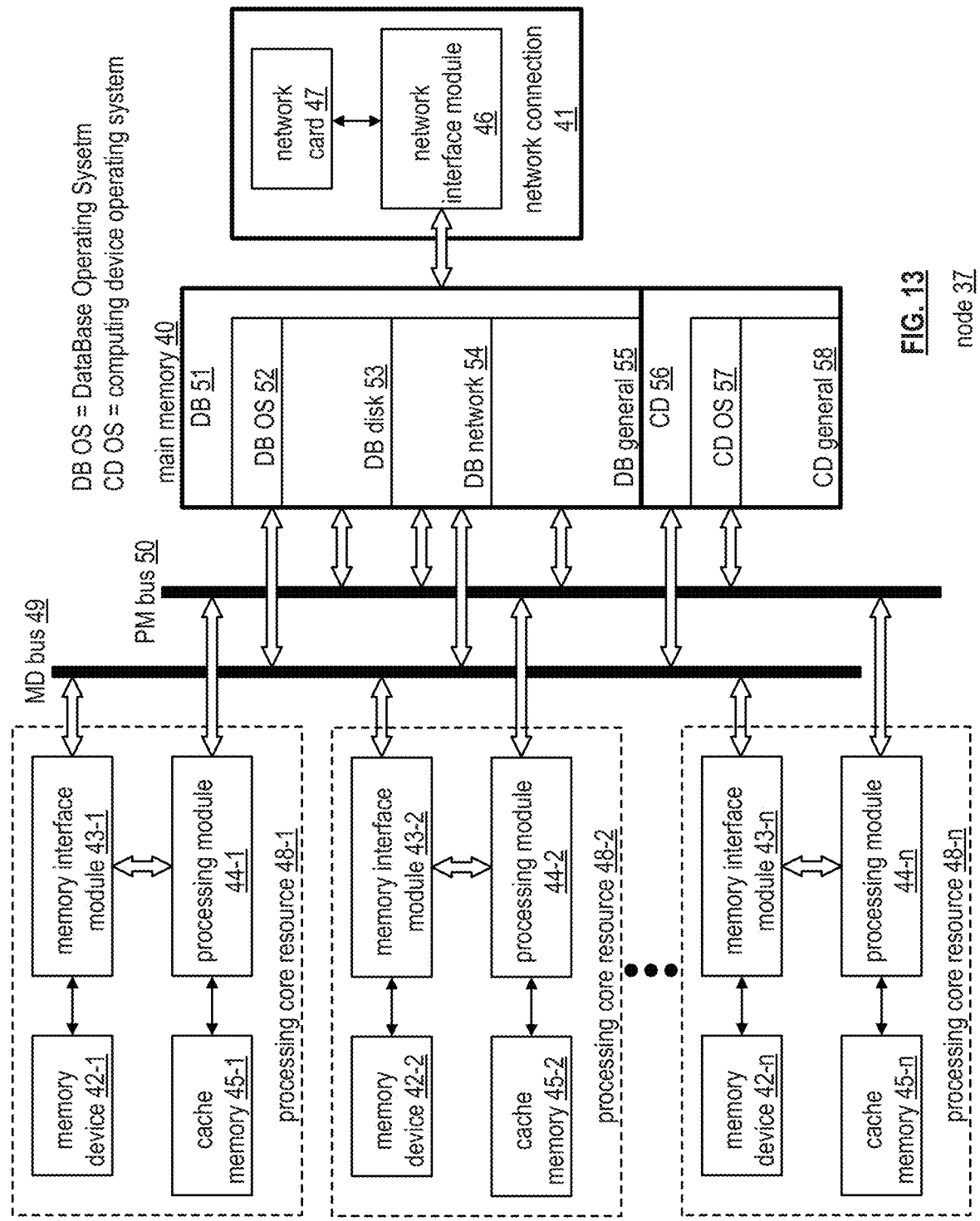
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
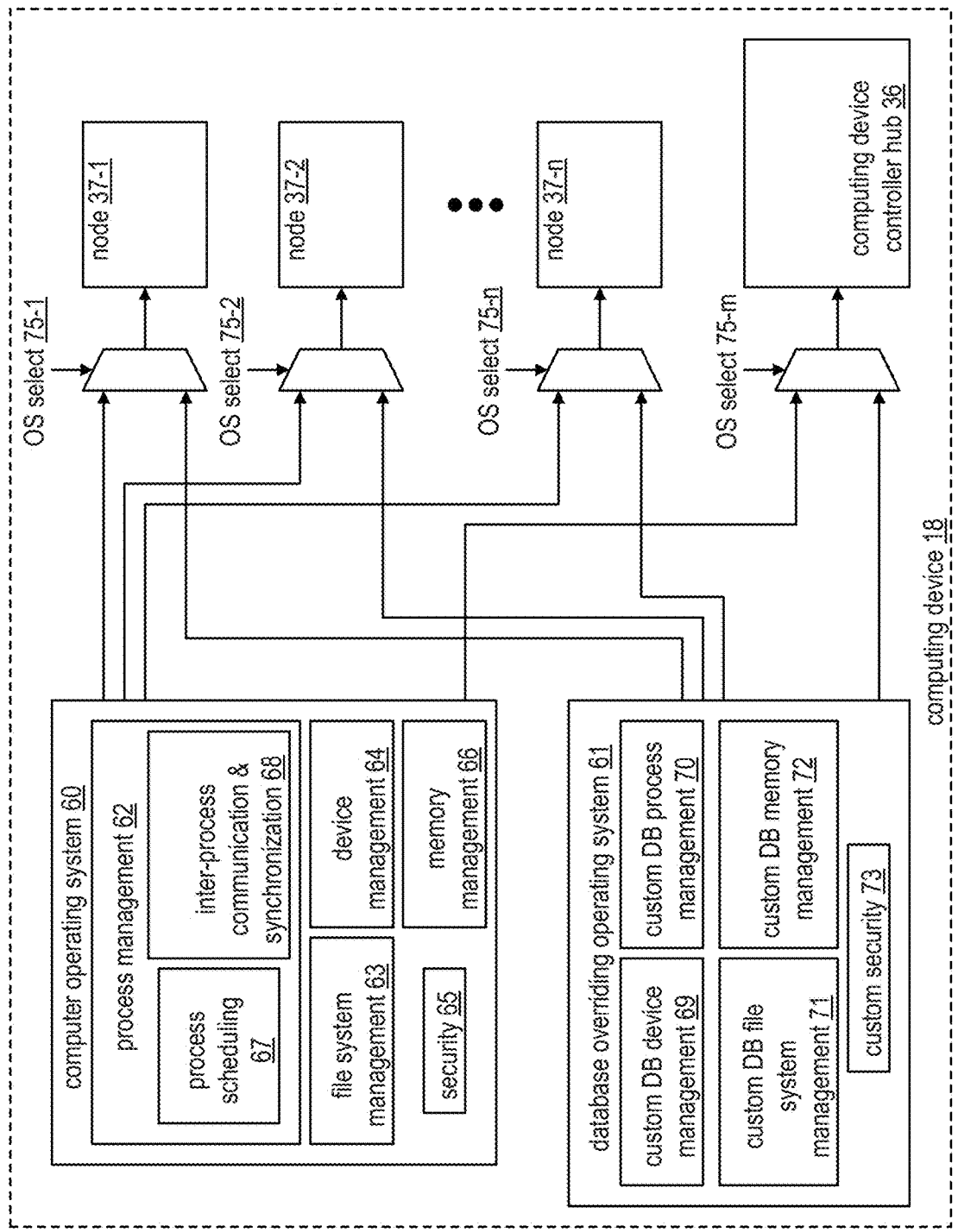
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
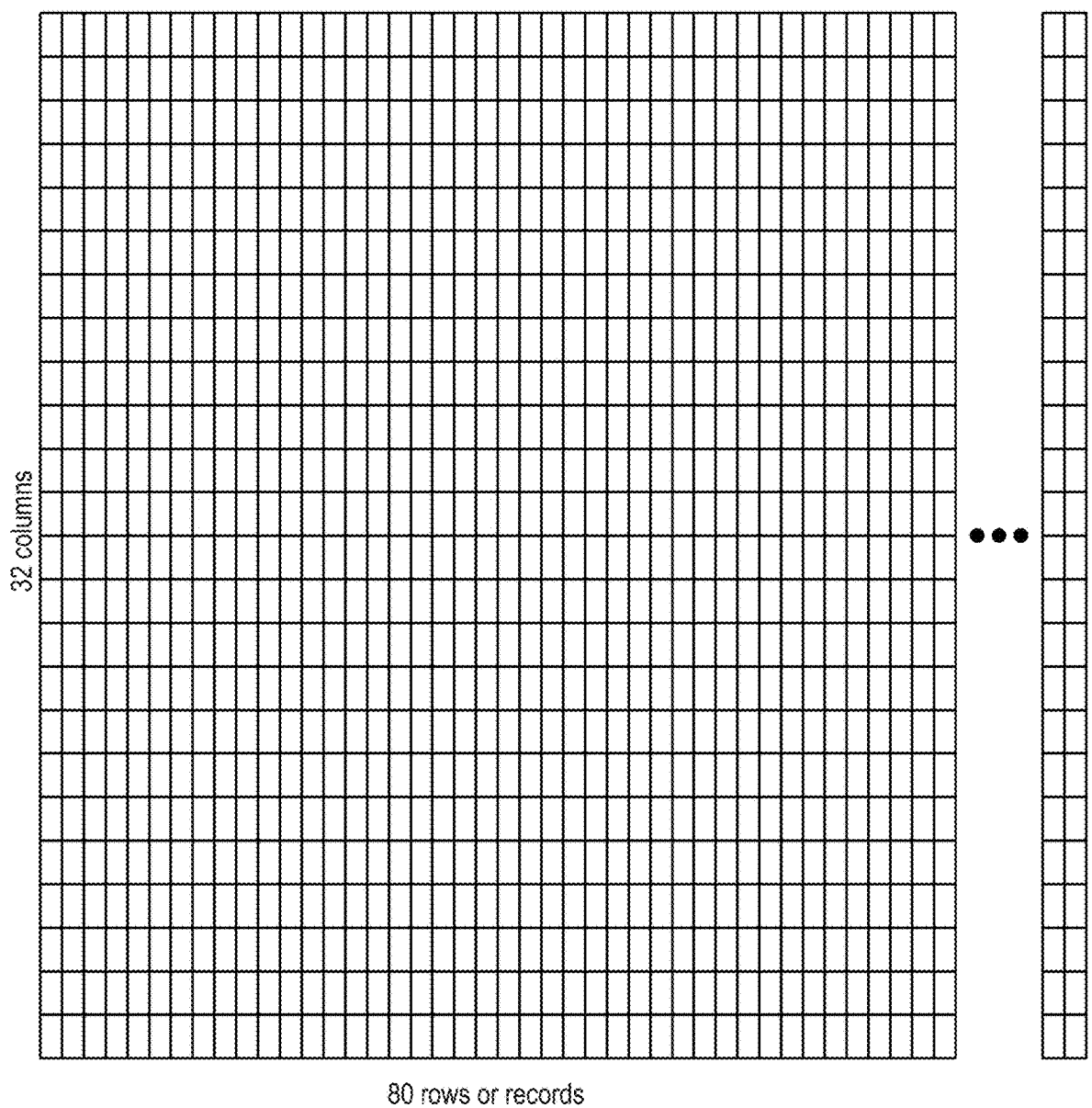

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
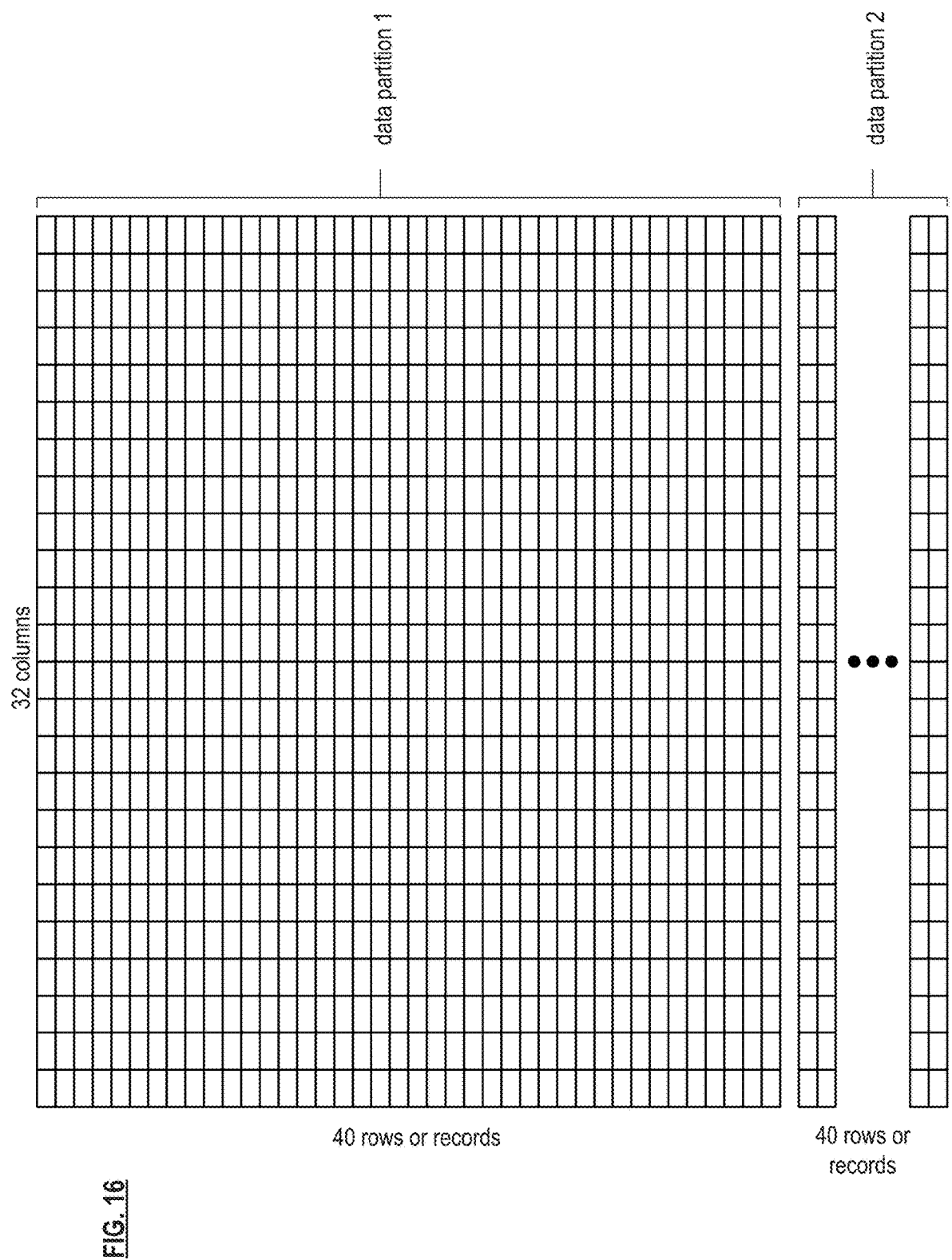

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
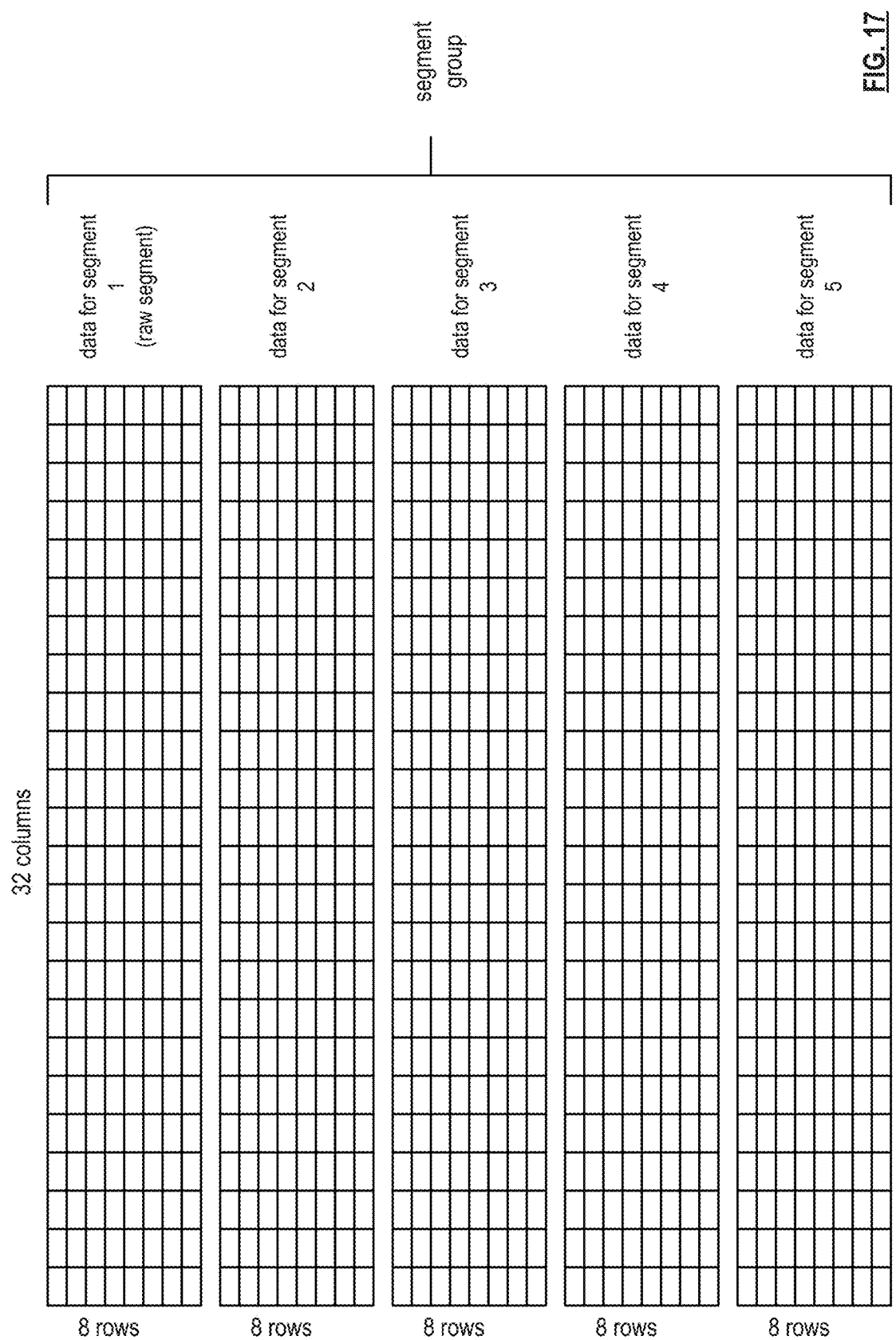

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
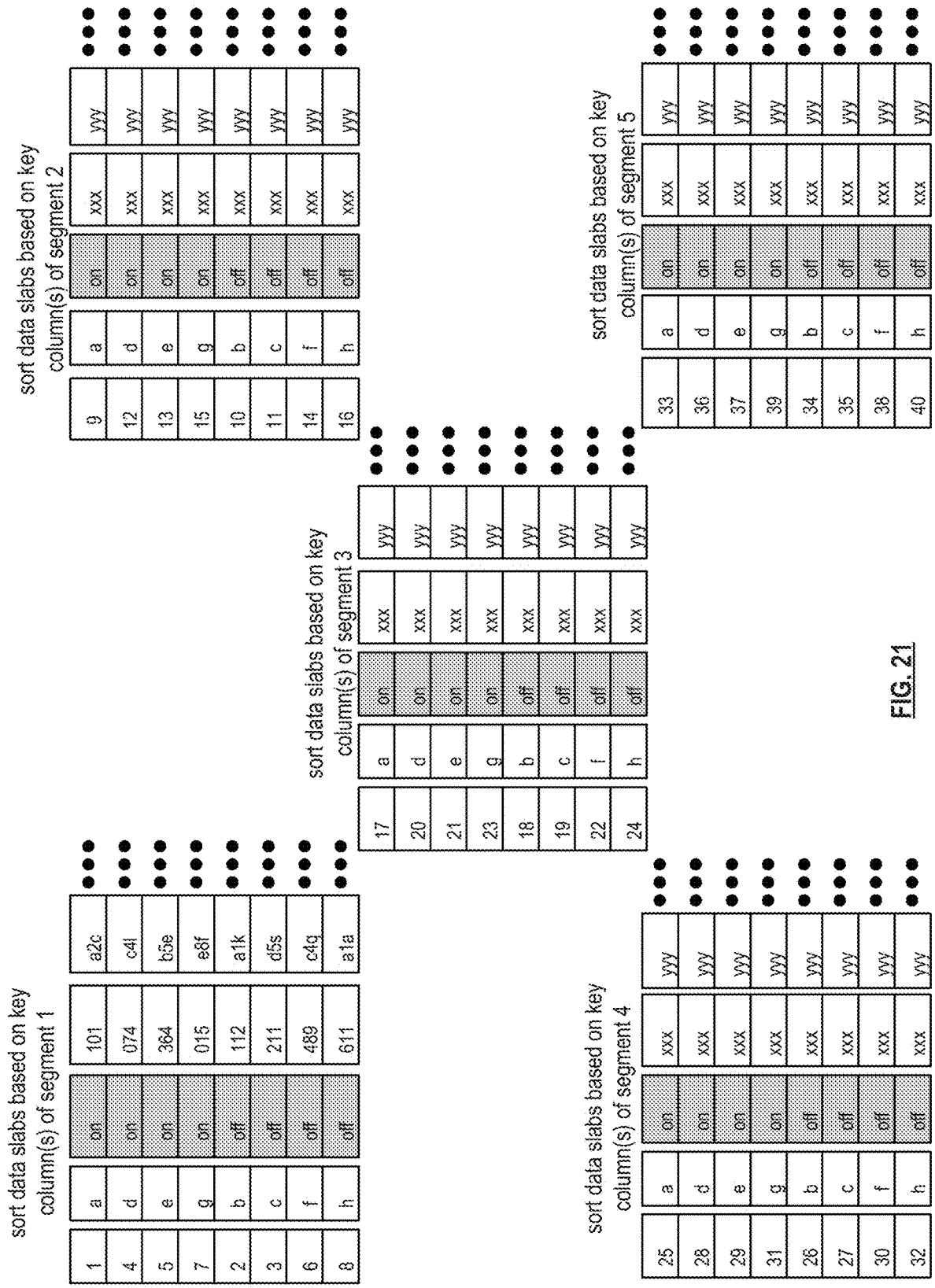

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
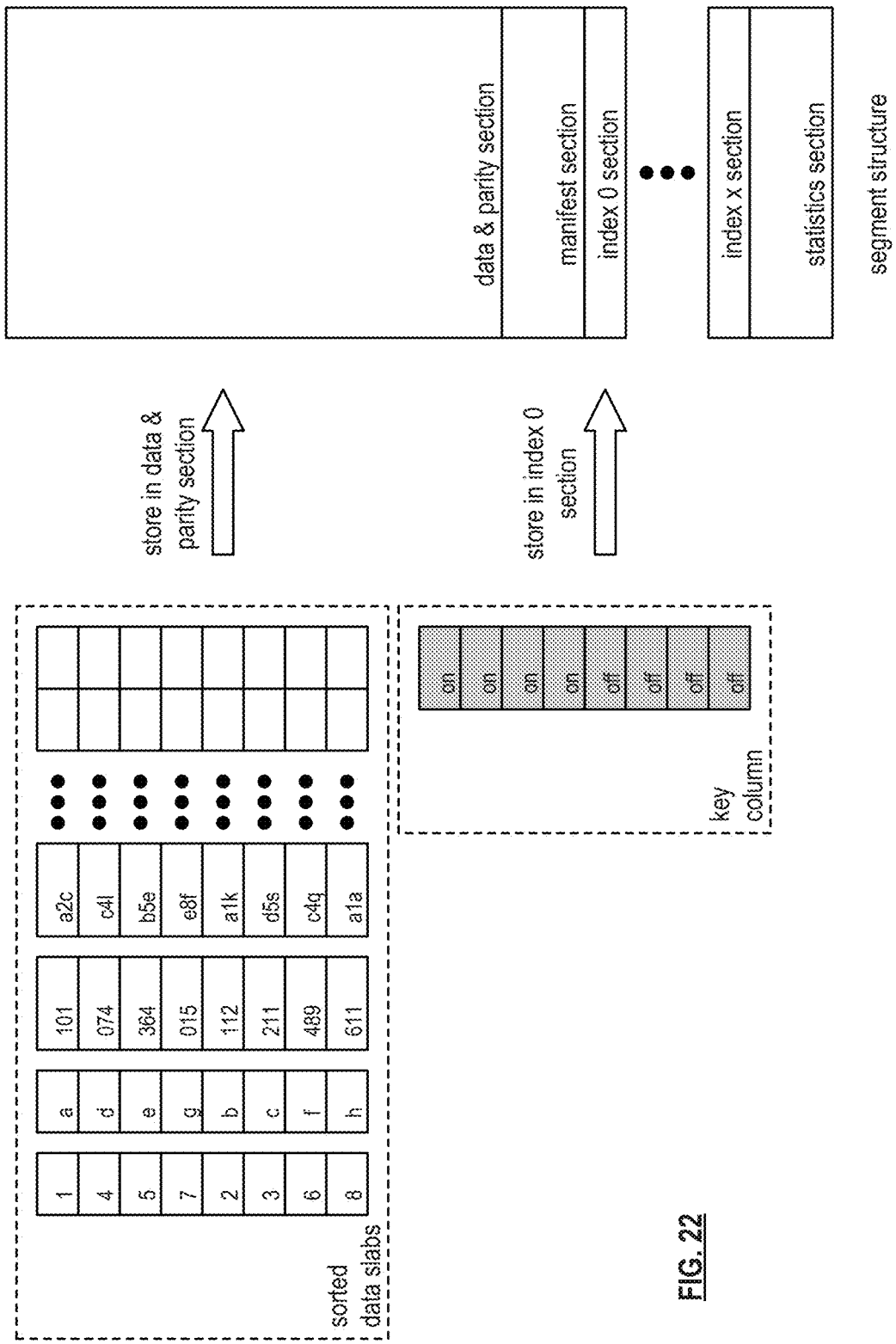

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
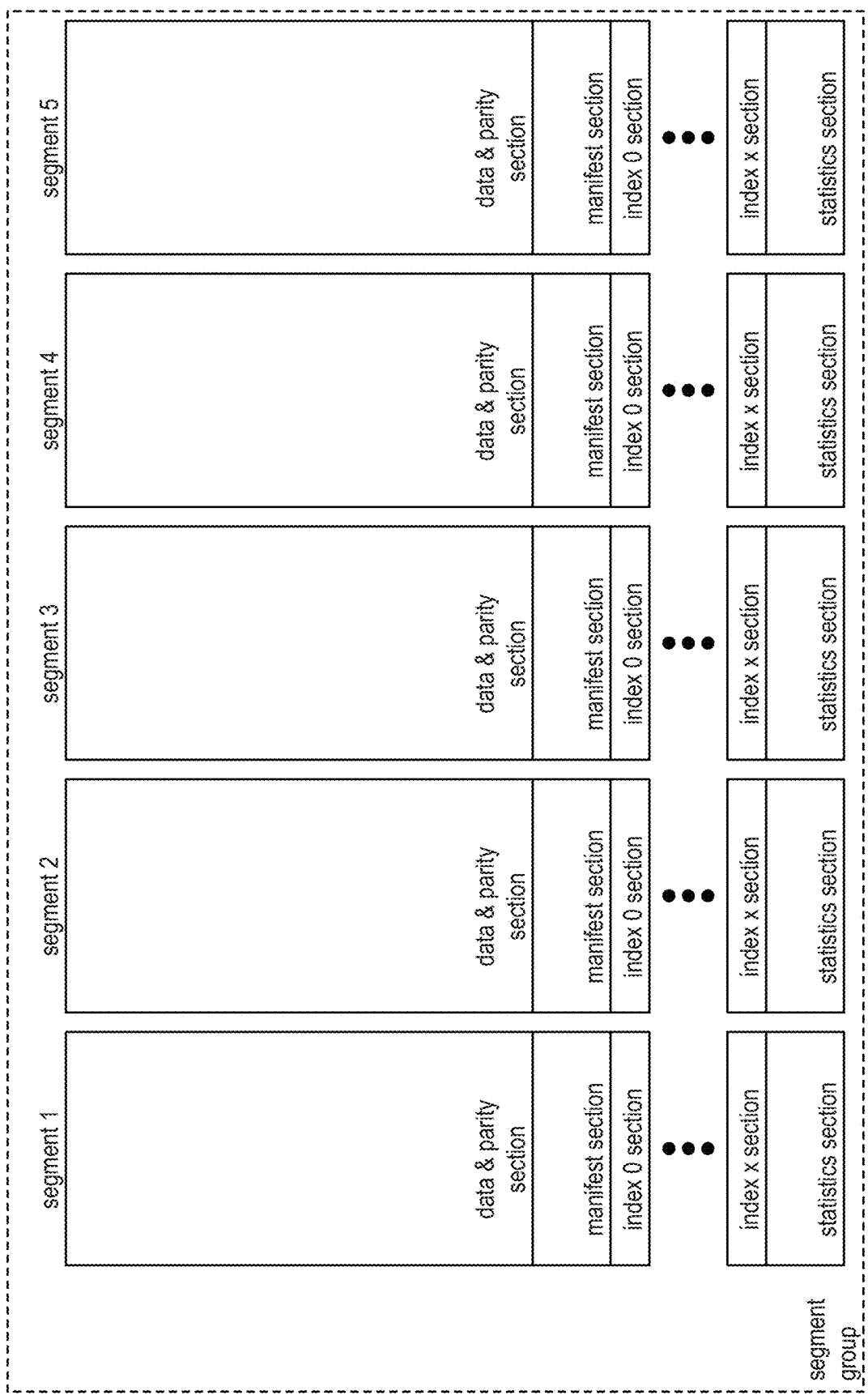

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
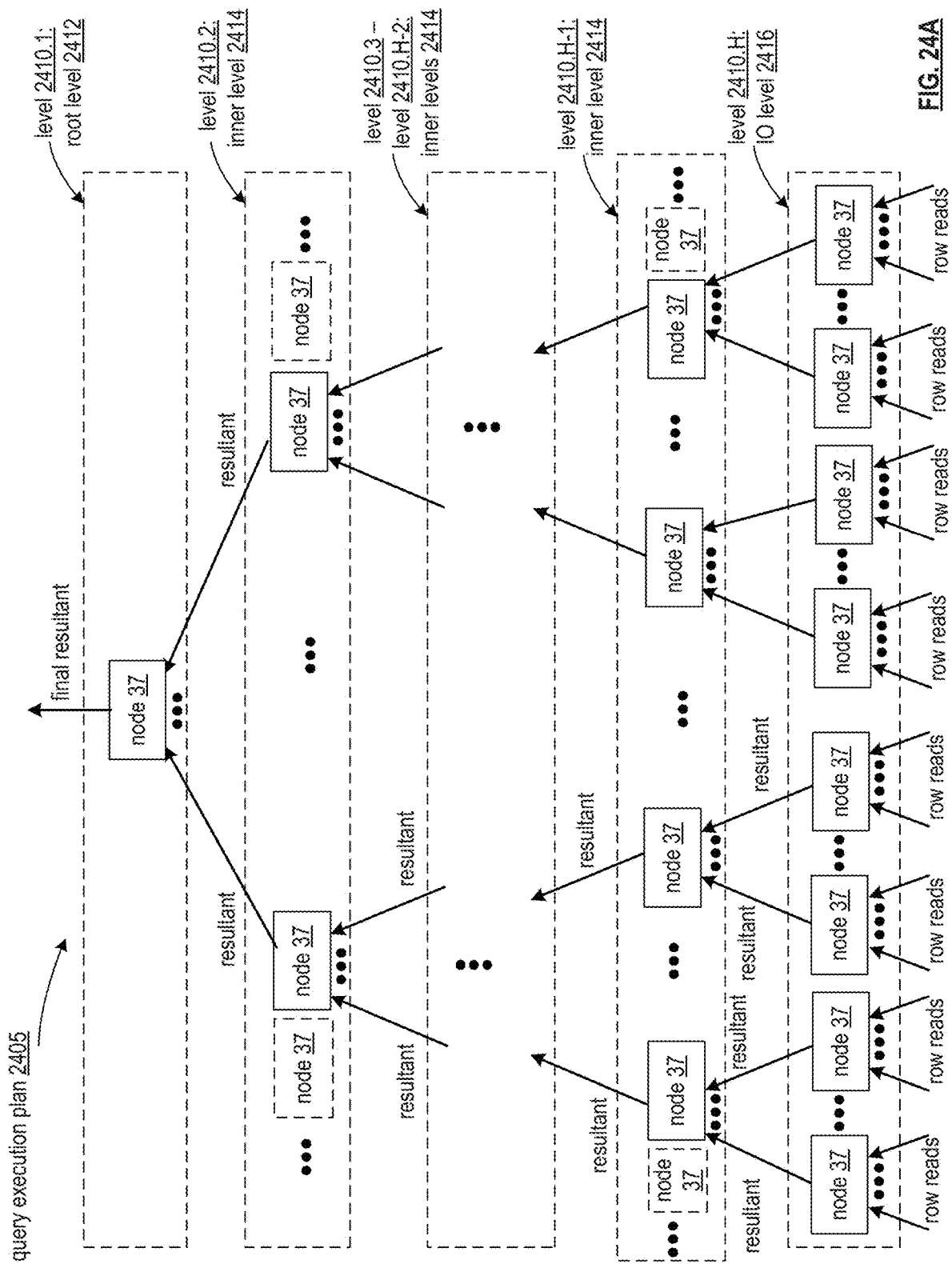
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-$z$ and/or all nodes in all storage clusters 35-1-35-$z$. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
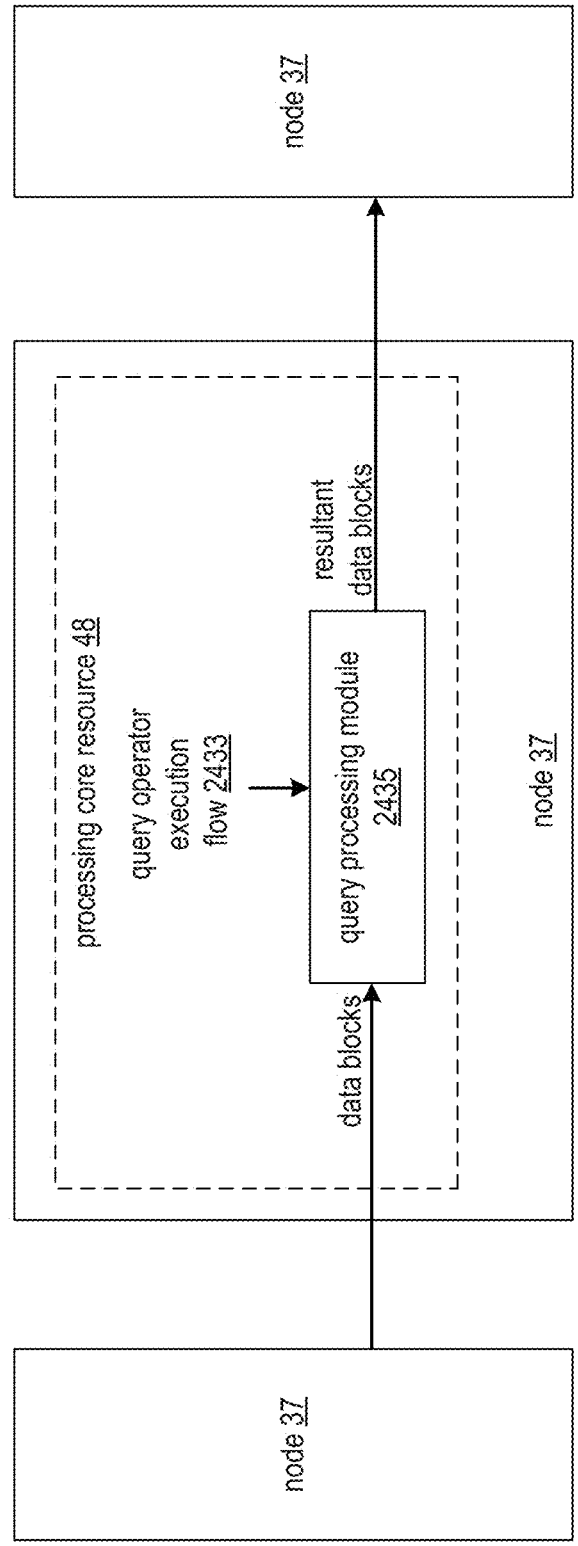
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-$n$ of a same node 37 can be executing at least one query concurrently via their own query processing module 2435, where a single node 37 implements each of set of operator processing modules 2435-1-2435-$n$ via a corresponding one of the set of processing core resources 48-1-48-$n$. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
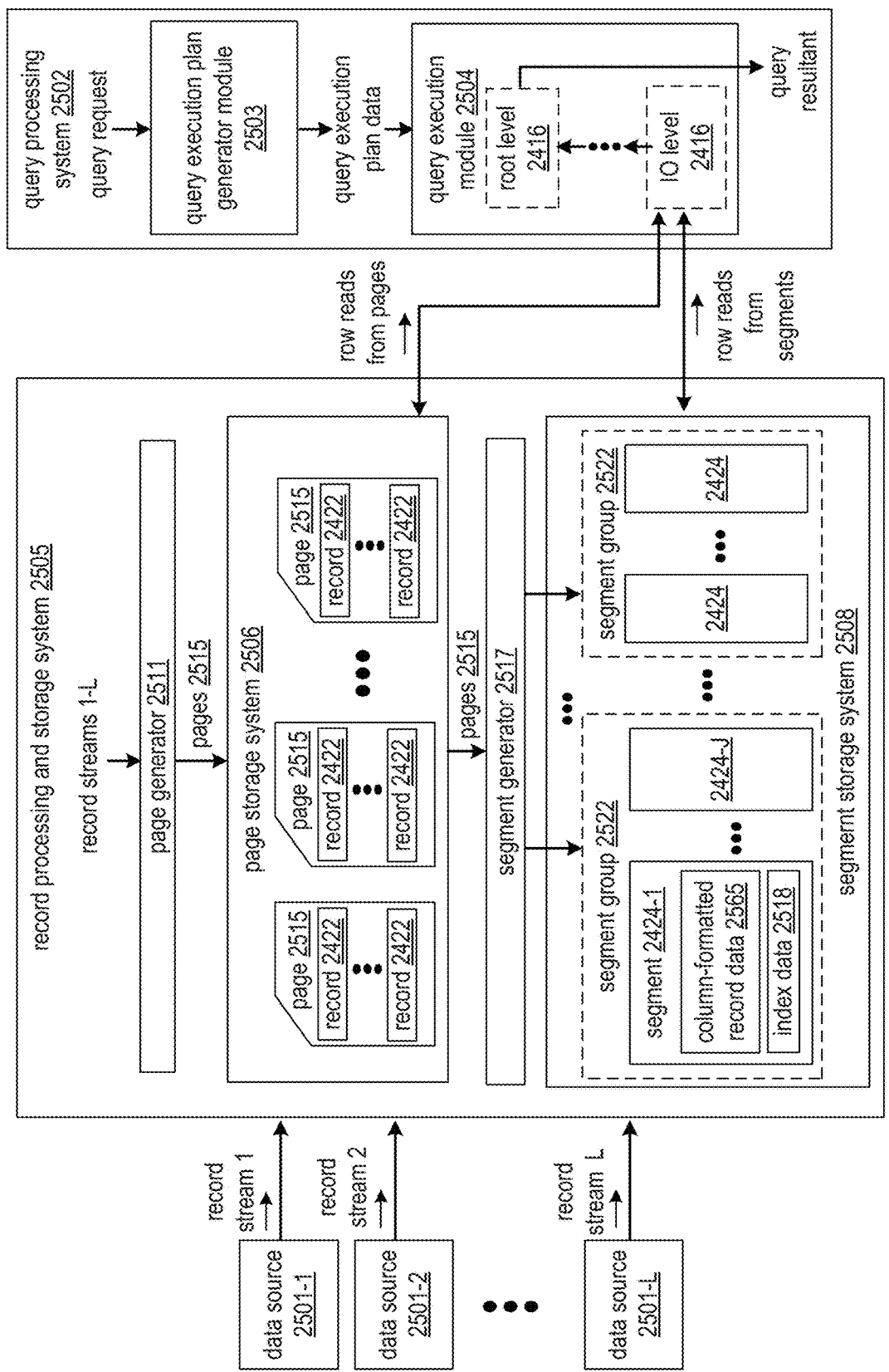
FIGS. 25A-25B are schematic block diagrams of embodiments of a database system that includes a record processing and storage system in accordance with various embodiments.
Figure 25B:
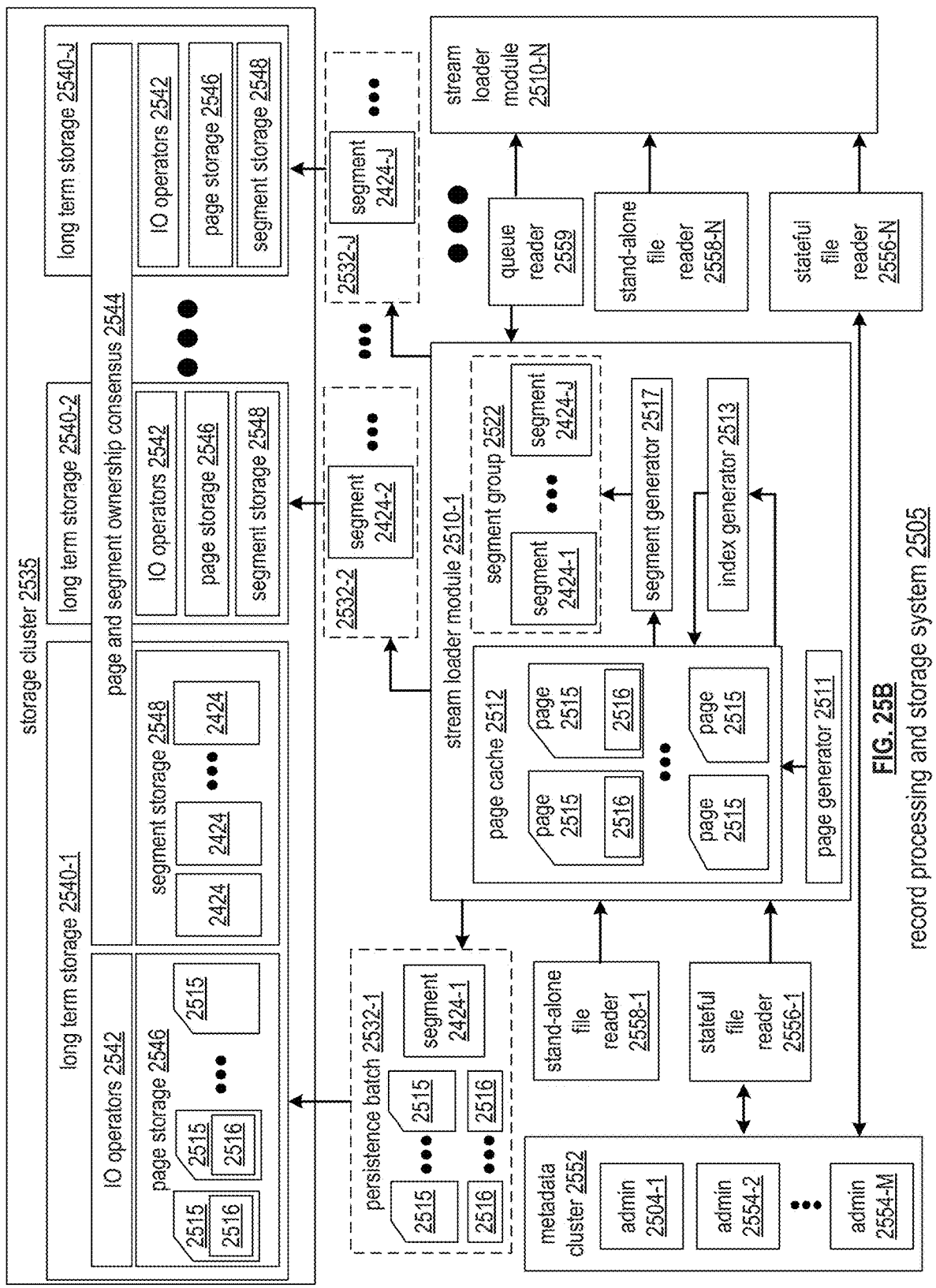
Figure 25C:
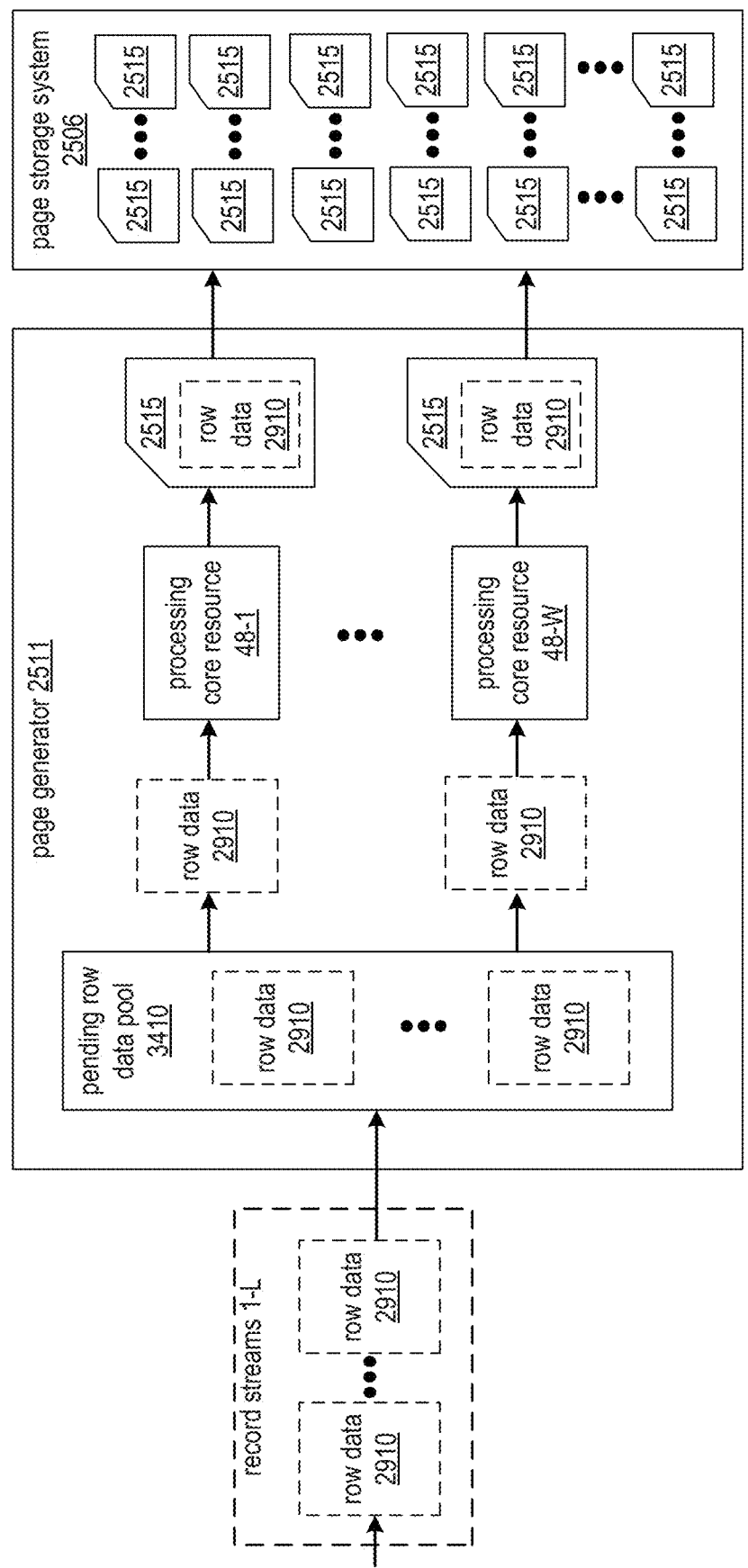
FIG. 25C is a is a schematic block diagrams of an embodiment of a page generator in accordance with various embodiments.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-$n$ of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
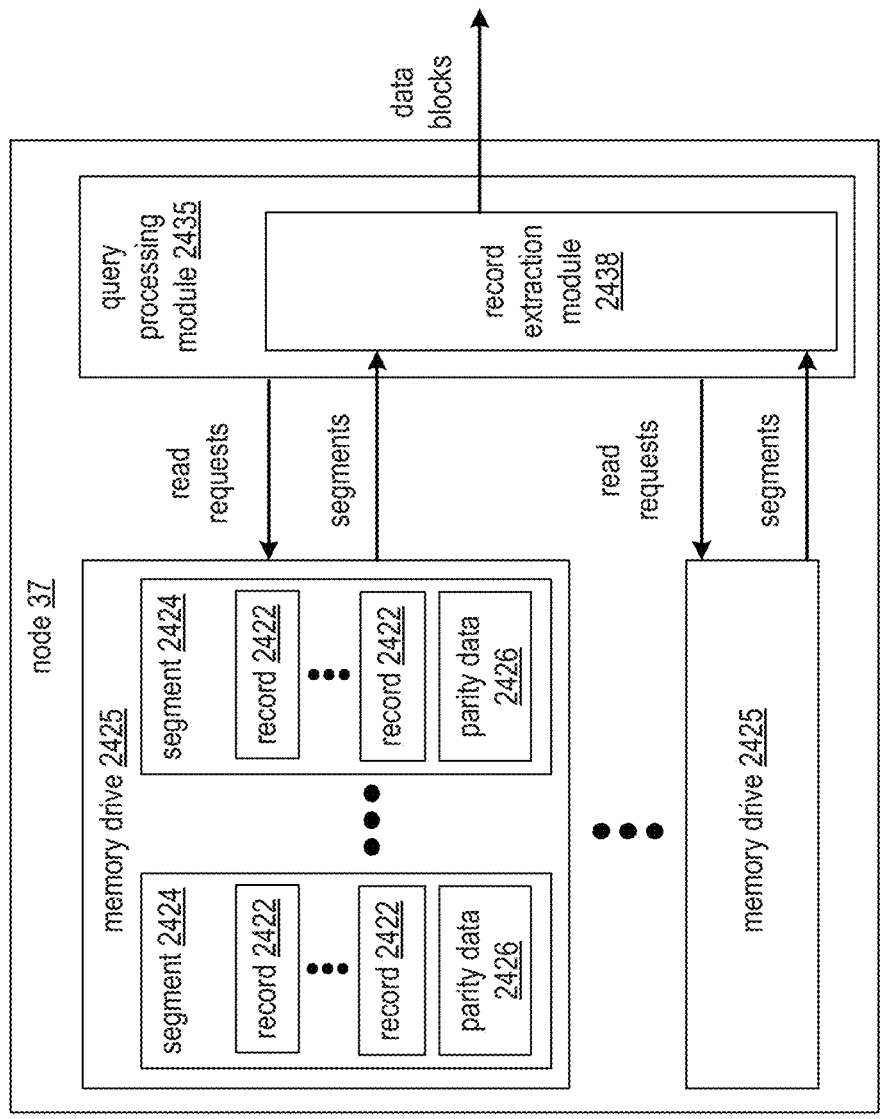
Figure 24D:
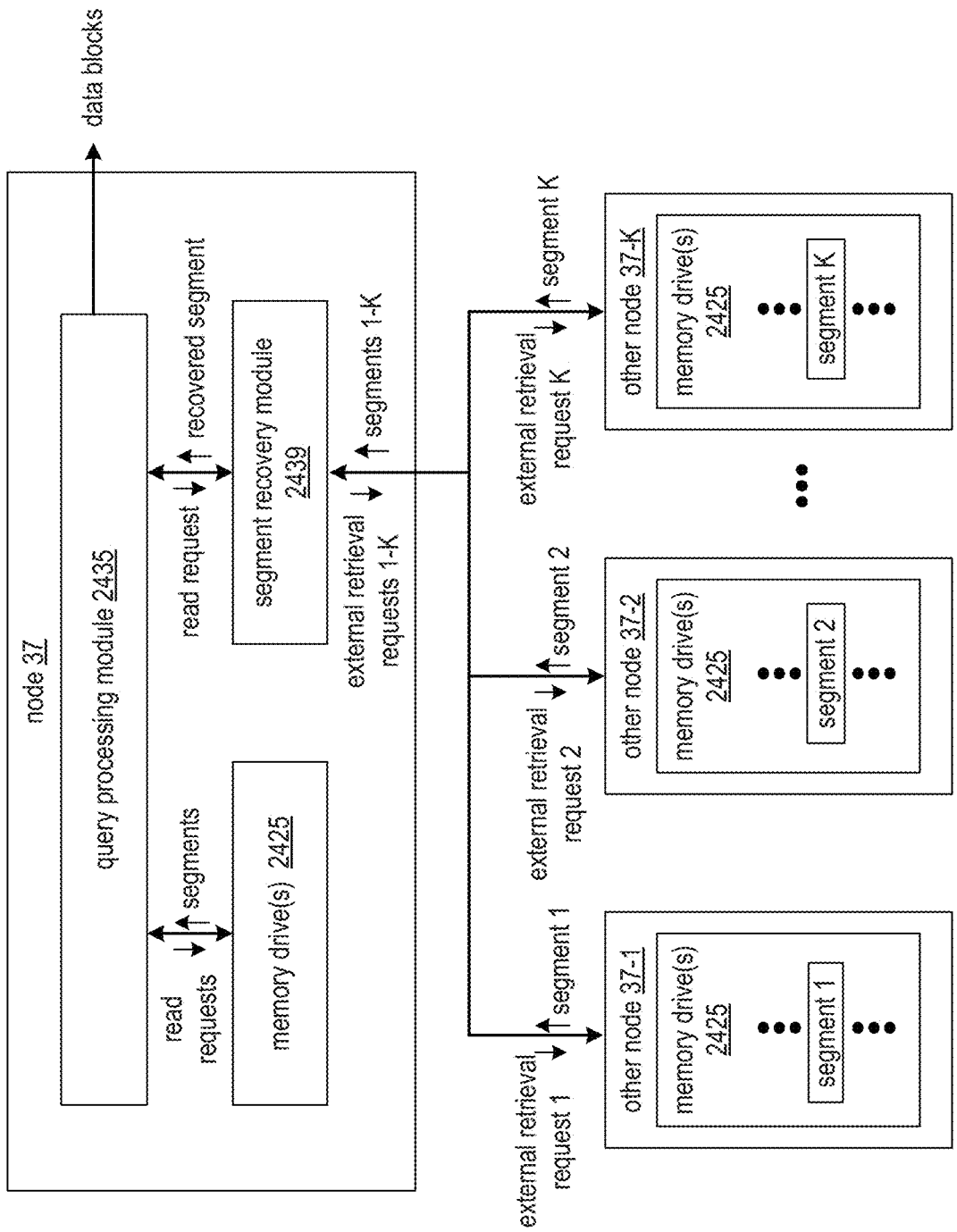

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIG. 25A illustrates an embodiment of a database system 10 that implements a record processing and storage system 2505. The record processing and storage system 2505 can be operable to generate and store the segments 2424 discussed previously by utilizing a segment generator 2517 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2517 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering. For example, greater numbers of records with common cluster keys are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2417 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2517 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2517, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2517, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2517; transfer of segments 2424 to the segment storage system 2508 once generated by the segment generator 2517; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of stream loader modules 2510-1-2510-N. Each stream loader module 2510 can be implemented via its own processing and/or memory resources. For example, each stream loader module 2510 can be implemented via its own computing device 18, via its own node 37, and/or via its own processing core resource 48. The plurality of stream loader modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each stream loader modules 2510 to receive one or more of the record streams 1-L received from the data sources 2501-1-2501-L as illustrated in FIG. 25A. For example, each stream loader module 2510 receives a distinct subset of the entire set of records received by the record processing and storage system 2505 at a given time.

Each stream loader module 2510 can receive records 2422 in one or more record streams via its own stateful file reader 2556 and/or stand-alone file reader 2558. Each stream loader module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given stream loader module 2510 is implemented via its own computing device 18 and/or node 37, the same computing device 18 and/or node 37 can optionally be utilized to implement the stateful file reader 2556, and/or each stand-alone file reader 2558 communicating with the given stream loader module 2510.

Each stream loader module 2510 can implement its own page generator 2511, its own index generator 2513, and/or its own segment generator 2517, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of stream loader modules 2510 as illustrated in FIG. 25B. Each page generator 2511 of FIG. 25B can process its own incoming records 2422 to generate its own corresponding pages 2515.

As pages 2515 are generated by the page generator 2511 of a stream loader module 2510, they can be stored in a page cache 2512. The page cache 2512 can be implemented utilizing memory resources of the stream loader module 2510, such as memory resources of the corresponding computing device 18. For example, the page cache 2512 of each stream loader module 2010-1-2010-N can individually or collectively implement some or all of the page storage system 2506 of FIG. 25A.

The segment generator 2517 of FIG. 25A can similarly be implemented as a plurality of segment generators 2517 of a corresponding plurality of stream loader modules 2510 as illustrated in FIG. 25B. Each segment generator 2517 of FIG. 25B can generate its own set of segments 2424-1-2424-J included in one or more segment groups 2522. The segment group 2522 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2517 of a stream loader module 2510 can access the page cache 2512 of the stream loader module 2510 to convert the pages 2515 previously generated by the page generator 2511 into segments. In some cases, each segment generator 2517 requires access to all pages 2515 generated by the segment generator 2517 since the last conversion process of pages into segments. The page cache 2512 can optionally store all pages generated by the page generator 2511 since the last conversion process, where the segment generator 2517 accesses all of these pages generated since the last conversion process to cluster records into groups and generate segments. For example, the page cache 2512 is implemented as a write-through cache to enable all previously generated pages since the last conversion process to be accessed by the segment generator 2517 once the conversion process commences.

In some cases, each stream loader module 2510 implements its segment generator 2517 upon only the set of pages 2515 that were generated by its own page generator 2511, accessible via its own page cache 2512. In such cases, the record grouping via clustering key to create segments with the same or similar cluster keys are separately performed by each segment generator 2517 independently without coordination, where this record grouping via clustering key is performed on N distinct sets of records stored in the N distinct sets of pages generated by the N distinct page generators 2511 of the N distinct stream loader modules 2510. In such cases, despite records never being shared between stream loader modules 2510 to further improve clustering, the level of clustering of the resulting segments generated independently by each stream loader module 2510 on its own data is sufficient, for example, due to the number of records in each stream loader module's 2510 set of pages 2515 for conversion being sufficiently large to attain favorable levels of clustering.

In such embodiments, each stream loader modules 2510 can independently initiate its own conversion process of pages 2515 into segments 2424 by waiting as long as possible based on its own resource utilization, such as memory availability of its page cache 2512. Different segment generators 2517 of the different stream loader modules 2510 can thus perform their own conversion of the corresponding set of pages 2515 into segments 2424 at different times, based on when each stream loader modules 2510 independently determines to initiate the conversion process, for example, based on each independently making the determination to generate segments as discussed in conjunction with FIG. 26A. Thus, as discussed herein, the conversion process of pages into segments can correspond to a single stream loader module 2510 converting all of its pages 2515 generated by its own page generator 2511 since its own last the conversion process into segments 2424, where different stream loader modules 2510 can initiate and execute this conversion process at different times and/or with different frequency.

In other cases, it is ideal for even more favorable levels of clustering to be attained via sharing of all pages for conversion across all stream loader modules 2510. In such cases, a collective decision to initiate the conversion process can be made across some or all stream loader modules 2510, for example, based on resource utilization across all stream loader modules 2510. The conversion process can include sharing of and/or access to all pages 2515 generated via the process, where each segment generator 2517 accesses records in some or all pages 2515 generated by and/or stored by some or all other stream loader modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple stream loader modules 2510. As discussed herein, the conversion process of pages into segments can optionally correspond to multiple stream loader modules 2510 converting all of their collectively generated pages 2515 since their last conversion process into segments 2424 via sharing of their generated pages 2515.

An index generator 2513 can optionally be implemented by some or all stream loader modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a stream loader module 2510 and can utilize its index generator 2513 to generate index data 2516 for a particular page 2515 in response to having query execution plan data indicating that records 2422 be read the particular page from the page cache 2512 of the stream loader module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each stream loader modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from stream loader modules 2510 to storage cluster 2535 and/or to facilitate sending of data from storage cluster 2535 to stream loader modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-z of FIG. 6 can receive pages 2515, corresponding index data 2516, and/or segments 2424 from its own set of stream loader modules 2510-1-2510-N, where the record processing and storage system 2505 of FIG. 25B can include z sets of stream loader modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the stream loader modules 2510. Alternatively, some stream loader modules can optionally share processing and/or memory resources long term storage 2540, for example, where a same computing device 18 and/or a same node 37 implements a particular long term storage 2540 and also implements a particular stream loader modules 2510.

Each stream loader module 2510 can generate and send the segments 2424 to long term storage 2540-1-2540-J in a set of persistence batches 2532-1-2532-J sent to the set of long term storage 2540-1-2540-J as illustrated in FIG. 25B.

For example, upon generating a segment group 2522 of J segments 2424, a stream loader module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a stream loader module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2517. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a stream loader module 2510 maintains storage of pages 2515 via page cache 2512, even if they are sent to storage cluster 2535 in persistence batches 2532. This can enable the segment generator 2517 to efficiently read pages 2515 during the conversion process via reads from this local page cache 2512. This can be ideal in minimizing page movement, as pages do not need to be retrieved from long term storage 2540 for conversion into segments by stream loader modules 2510 and can instead be locally accessed via maintained storage in page cache 2512. Alternatively, a stream loader module 2510 removes pages 2515 from storage via page cache 2512 once they are determined to be successfully stored in long term storage 2540. This can be ideal in reducing the memory resources required by stream loader module 2510 to store pages, as only pages that are not yet durably stored in long term storage 2540 need be stored in page cache 2512.

Each long term storage 2540 can include its own page storage 2546 that stores received pages 2515 generated by and received from one or more stream loader modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more stream loader modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the stream loader module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a stream loader module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and segment ownership consensus 2544 can include one or more versions of ownership data, for example, that is generated via execution of a consensus protocol mediated via the set of long term storage 2540-1-2540-J. The page and segment ownership consensus 2544 can dictate that every record is owned by exactly one long term storage 2540 via access to either a page 2515 storing the record or a segment 2424 storing the record, but not both. The page and segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and segment ownership consensus 2544. For example, the long term storage 2540 can be solely responsible for durably storing the records utilized in query executions. In such embodiments, the cached and/or temporary storage of pages and/or segments of stream loader modules 2510, such as pages 2515 in page caches 2512, are not read for query executions via accesses to storage resources of stream loader modules 2510.

FIG. 25C illustrates an example embodiment of a page generator 2511. The page generator 2511 of FIG. 25C can be utilized to implement the page generator 2511 of FIG. 25A, can be utilized to implement each page generator 2511 of each stream loader module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a stream loader module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each stream loader module 2510 can have its own pending row data pool 3410. Alternatively, multiple stream loader modules 2510 can access the same row data pool 3410 that stores all incoming row data 2910, for example, by utilizing queue reader 2559.

The page generator 2511 can facilitate parallelized page generation via a plurality of processing core resources 48-1-48-W. For example, each stream loader module 2510 has its own plurality of processing core resources 48-1-48-W, where the processing core resources 48-1-48-W of a given stream loader module 2510 is implemented via the set of processing core resources 48 of one or more nodes 37 utilized to implement the given stream loader module 2510. As another example, the plurality of processing core resources 48-1-48-W are each implemented by a corresponding one of the set of each stream loader module 2510-1-2510-N, for example, where each stream loader module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding stream loader module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Figure 25D:
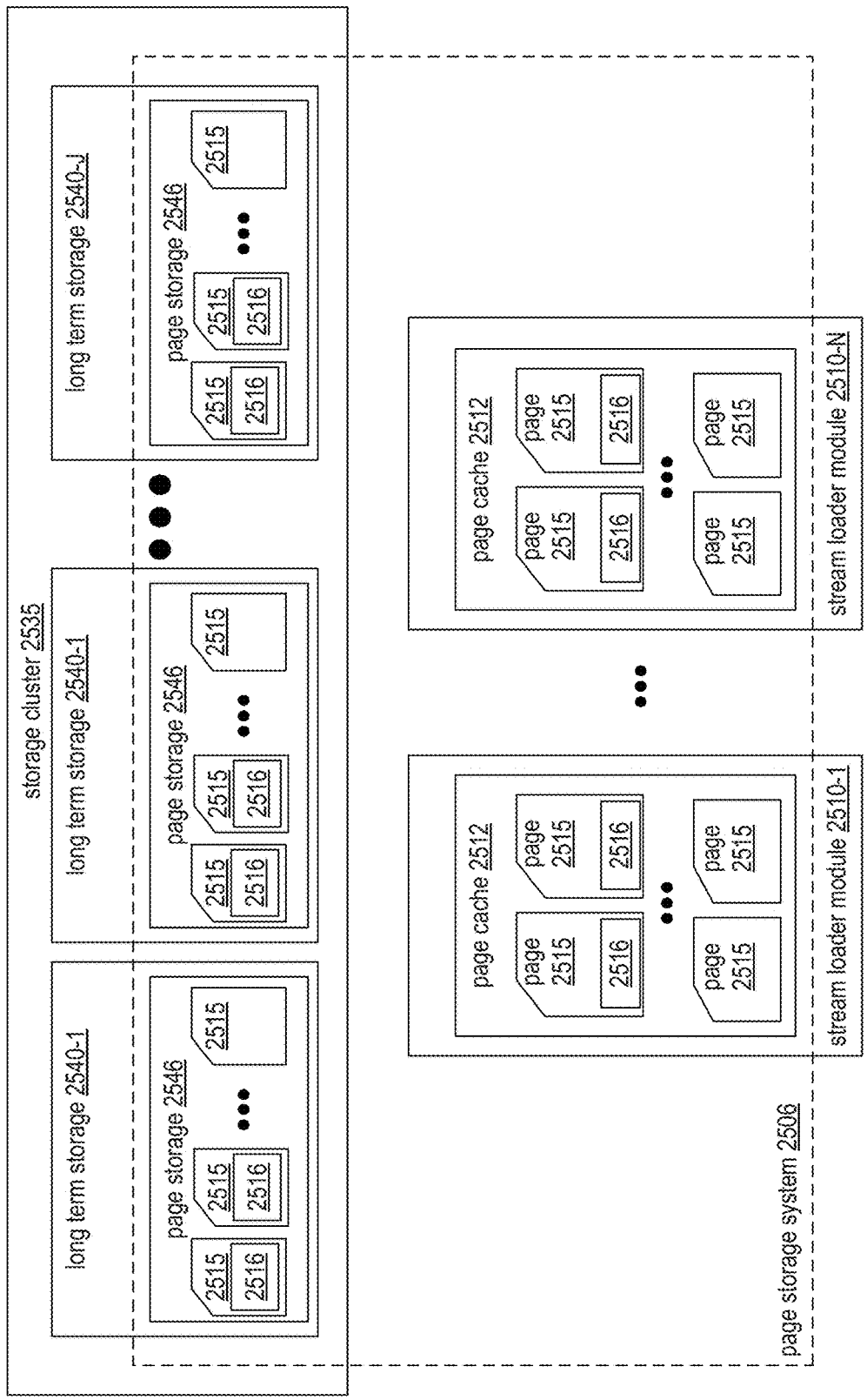
FIG. 25D is a schematic block diagrams of an embodiment of a page storage system of a record processing and storage system in accordance with various embodiments.
Figure 25E:
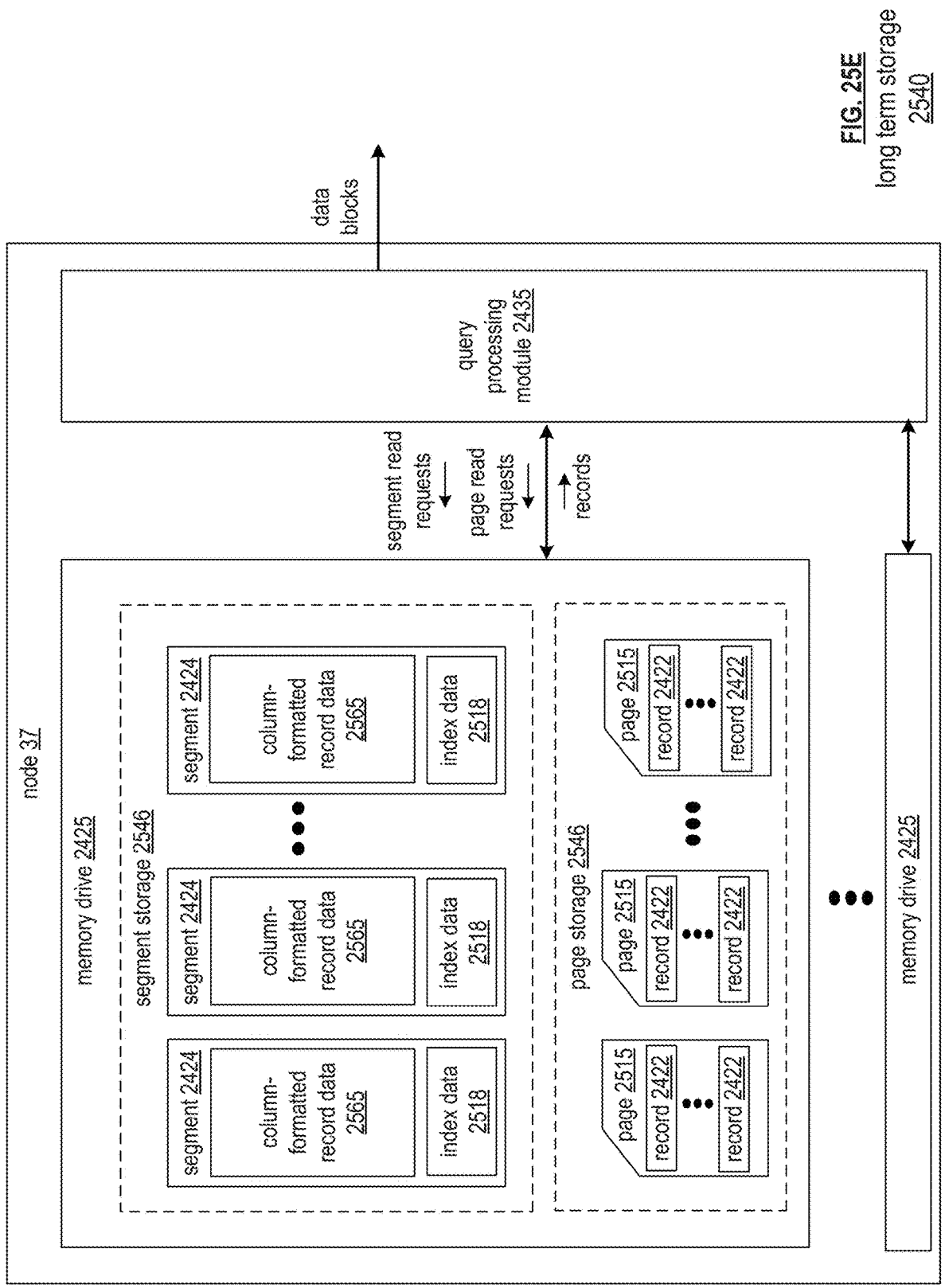
FIG. 25E is a schematic block diagrams of a node that implements a query processing module that reads records from segment storage and page storage in accordance with various embodiments.

FIG. 25D illustrates an example embodiment of the page storage system 2505. As used herein, the page storage system 2505 can include page cache 2512 of a single stream loader module 2510; can include page caches 2512 of some or all stream loader module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Figure 26A:
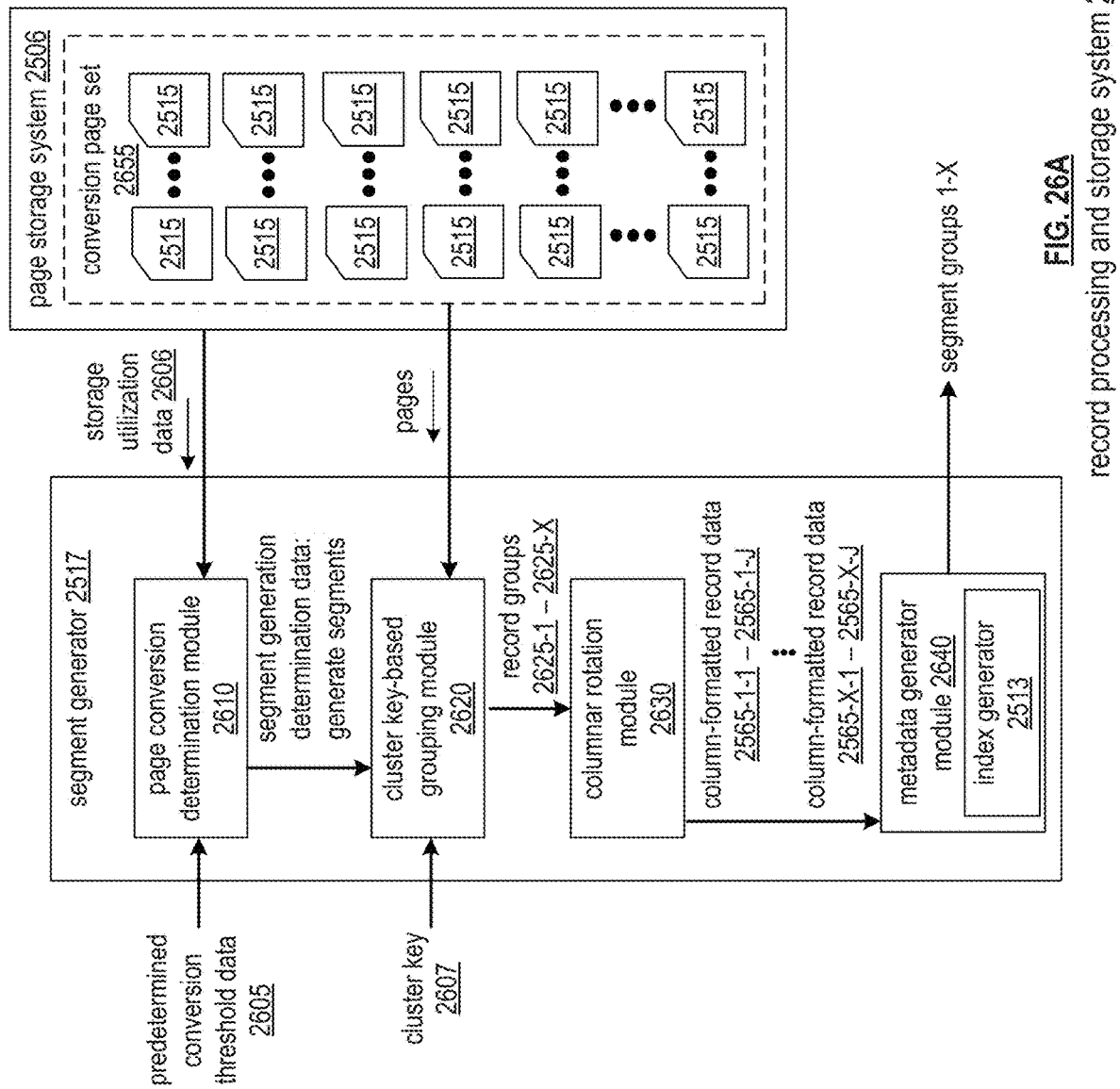
FIG. 26A is a schematic block diagram of a segment generator of a record processing and storage system in accordance with various embodiments.

FIG. 26A illustrates an example embodiment of a segment generator 2517. The segment generator 2517 of FIG. 26A can be utilized to implement the segment generator 2517 of FIG. 25A, can be utilized to implement each segment generator 2517 of each stream loader module 2510 of FIG. 25B, and/or can be utilized to implement any embodiments of segment generator 2517 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to enable the accumulating of as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2517 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2517 can commence the conversion process accordingly in response to the segment generation determination data indicating it is time to generate segments, for example, via a cluster key-based grouping module 2620, a columnar rotation module 2630, and/or a metadata generator module 2640. The delay of converting pages into segments via the page conversion determination module 2610 and the repeating of this process over time is discussed in further detail in conjunction with the example timeline of FIG. 26B.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system

2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a stream loader module 2510 of FIG. 25B, where the segment generator 2517 of FIG. 26A is implemented by the corresponding stream loader module 2510 and where the segment generator 2517 of FIG. 26A is operable to perform the conversion process only upon pages 2515 in the page cache 2512. In some cases, the storage utilization data 2606 can relate specifically to storage utilization across all page caches 2512 of all stream loader modules 2510-1-2510-N, where the page conversion determination module 2610 of FIG. 26A is implemented to dictate whether the conversion process be commenced across all corresponding stream loader modules 2510. In some cases, the storage utilization data 2606 can alternatively or include to storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2517.

The storage utilization data 2606 can be sent to and/or requested by the segment generator 2517: in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2517 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2517 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26C.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2517. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2517 as discussed previously, and where each column-formatted row data 2565-1-2565-J is included in a corresponding segment of a set of J segments 2424 of a segment group 2522.

The final segments can be formed from the column-formatted row data 2565 to include metadata generated via a metadata generator module 2640. The metadata generator module 2640 can be operable to generate the manifest section, statistics section, and/or the set of index sections 0-x for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Figure 26B:
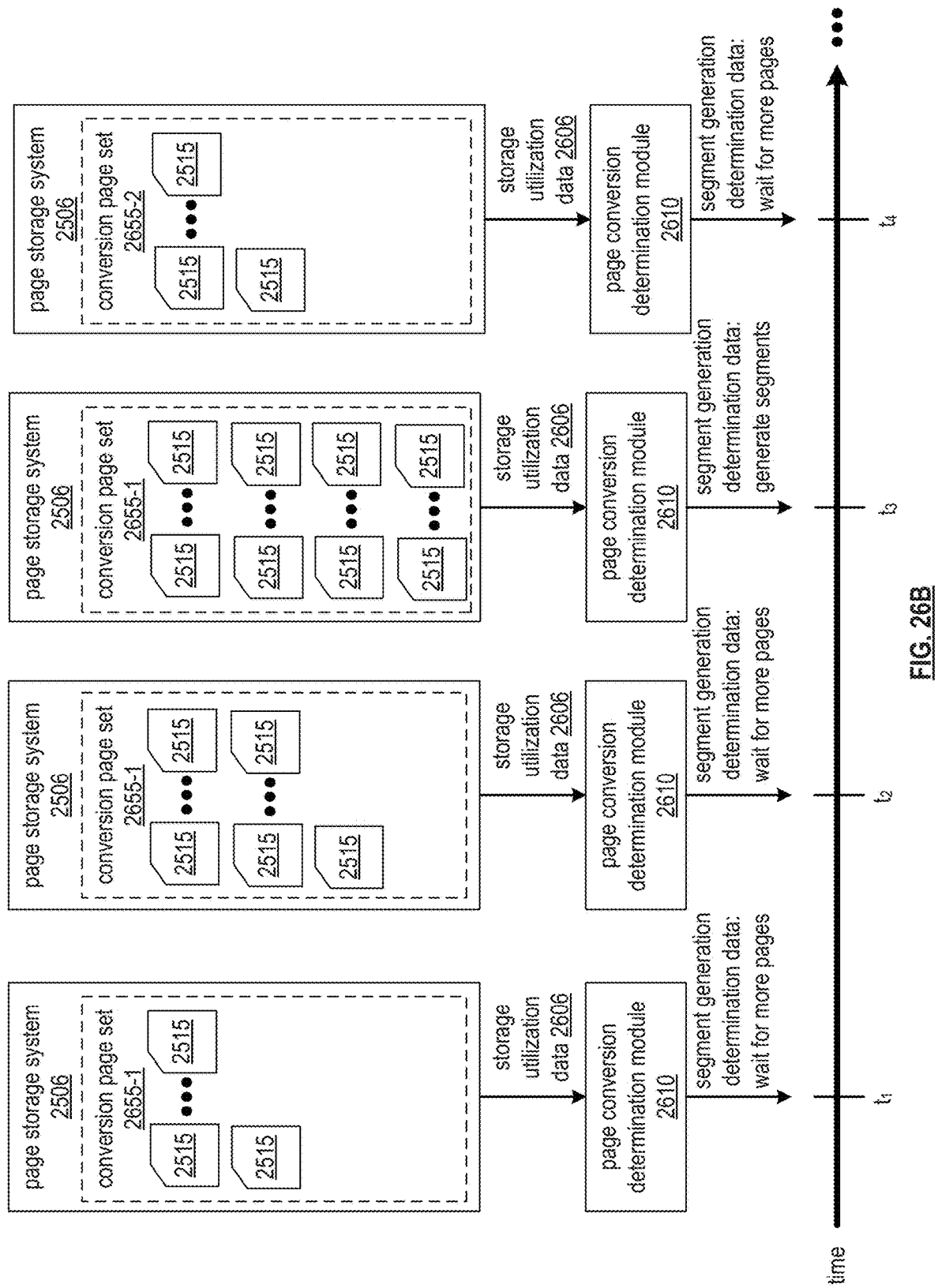
FIG. 26B is a schematic block diagram illustrating operation of a page conversion determination module over time in accordance with various embodiments.

FIG. 26B depicts an example timeline illustrating when the conversion process is determined to be conducted and how this process is iterated over time. The page conversion determination module 2610, and/or the determinations to delay conversion versus initiate conversion over time as illustrated in FIG. 26B, can be utilized to implement the segment generator 2517 of FIG. 26A and/or any other embodiment of the segment generator 2517 discussed herein.

First, a first conversion page set 2655-1 accumulates pages 2515 over time until the page conversion determination module 2610 determines a conversion page set 2655-1 is ready for conversion. At time $t_1$, the conversion page set 2655-1 includes a small number of pages 2515, where the storage resources of page storage system 2506 are not yet fully utilized. This small number of pages relative to the page storage capacity of page storage system 2506 renders the storage utilization data 2606 at time $t_1$ to compare unfavorably to the predetermined conversion threshold data. The segment generation determination data generated by the page conversion determination module 2610 at time $t_1$ therefore delays the conversion process, indicating to wait for more pages 2515 rather than generating segments from the current conversion page set 2655-1 at time $t_1$.

At time $t_2$, more pages 2515 have been accumulated since time $t_1$ based on additional pages having been generated by the page generator 2511 from incoming records of one or more record streams. However, the storage resources of page storage system 2506 are still not yet fully utilized at this time, causing the storage utilization data 2606 at time $t_2$ to again compare unfavorably to the predetermined conversion threshold data. The segment generation determination data generated by the page conversion determination module 2610 at time $t_2$ again delays the conversion process, indicating to wait for more pages 2515 rather than generating segments from the current conversion page set 2655-1 at time $t_2$.

At time $t_3$, even more pages 2515 have been accumulated since time $t_2$, and storage resources of page storage system 2506 are fully utilized and/or sufficiently utilized as dictated by the predetermined conversion threshold data. Thus, enough pages have been accumulated to cause storage utilization data 2606 at time $t_3$ to compare favorably to the predetermined conversion threshold data. The segment generation determination data generated by the page conversion determination module 2610 at time $t_3$ initiates the conversion process by indicating that segments be generated from the current conversion page set 2655-1 at time $t_3$.

After time $t_3$, the pages of the conversion page set 2655-1 can be flushed to other storage and/or can be removed from page storage system 2506. For example, once the segments are successfully generated from conversion page set 2655-1, the pages of conversion page set 2655-1 are deleted from page storage system 2506. The storage utilization data 2606 can indicate that more pages be accumulated for a next conversion page set 2655-2, for example, due to the storage resources of page storage system 2506 again becoming available for storing new pages once the pages of conversion page set 2655-1 are removed.

At time $t_4$, after some or all of the pages of conversion page set 2655-1 have been removed from storage by page storage system 2506, new pages have been generated and stored in page storage system 2506 for conversion in the next conversion page set 2655-2. For example, the next conversion page set 2655-2 can include some pages that were generated while the conversion process of conversion page set 2655-2 was in progress and/or while the resulting segments were being stored in to segment storage system 2508. At this time, the storage resources of page storage system 2506 are not yet fully utilized at this time, causing the storage utilization data 2606 at time $t_4$ to compare unfavorably to the predetermined conversion threshold data.

At some later time after $t_4$, enough pages are accumulated in this next conversion page set 2655-2 to cause the storage utilization data 2606 at time $t_4$ to compare favorably to the predetermined conversion threshold data and to initiate another conversion process of converting the conversion page set 2655-2 into segments. This process can continue accumulating and converting subsequent conversion page sets 2655 over time.

Note that the predetermined conversion threshold data can change over time, for example, based on different user configurations, based on changes to storage capacity of the page storage system 2506, based on adding or removal of memory devices of page storage system 2506, based on failures of page storage system 2506, based on trends in clustering levels that can be attained by different numbers of pages at different times, based on changes in amount of different data stored by the resources of the page storage system 2506, based on resource assignment changes in the record processing and storage system 2505, and/or based on other determinations made over time causing the predetermined conversion threshold data to be adjusted accordingly. For example, the predetermined conversion threshold data that triggers initiation of the conversion process for conversion page set 2655-1 at time $t_3$ can be the same as or different from the predetermined conversion threshold data that eventually triggers initiation of the conversion process for conversion page set 2655-2 at some later time after $t_4$.

FIG. 26C illustrates an example embodiment of a cluster key-based grouping module 2620 implemented by segment generator 2517. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26C can be utilized to implement the segment generator 2517 of FIG. 26A and/or any other embodiment of the segment generator 2517 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

In various embodiments, a record processing and storage system includes at least one processor and memory. The memory stores operational instructions that, when executed by the at least one processor, cause the record processing and storage system to receive a plurality of records and generate a plurality of pages that include the plurality of records in accordance with a row-based format. The execution of the operational instructions further causes the record processing and storage system to store the plurality of pages via a page storage system. The execution of the operational instructions further causes the record processing and storage system to generate segment generation determination data based on storage utilization data of the page storage system. The execution of the operational instructions further causes the record processing and storage system to generate a plurality of segments from the plurality of pages that include the plurality of records in a column-based format based on the segment generation determination data indicating segments be generated. The execution of the operational instructions further causes the record processing and storage system to store the plurality of segments via a segment storage system.

Figure 26D:
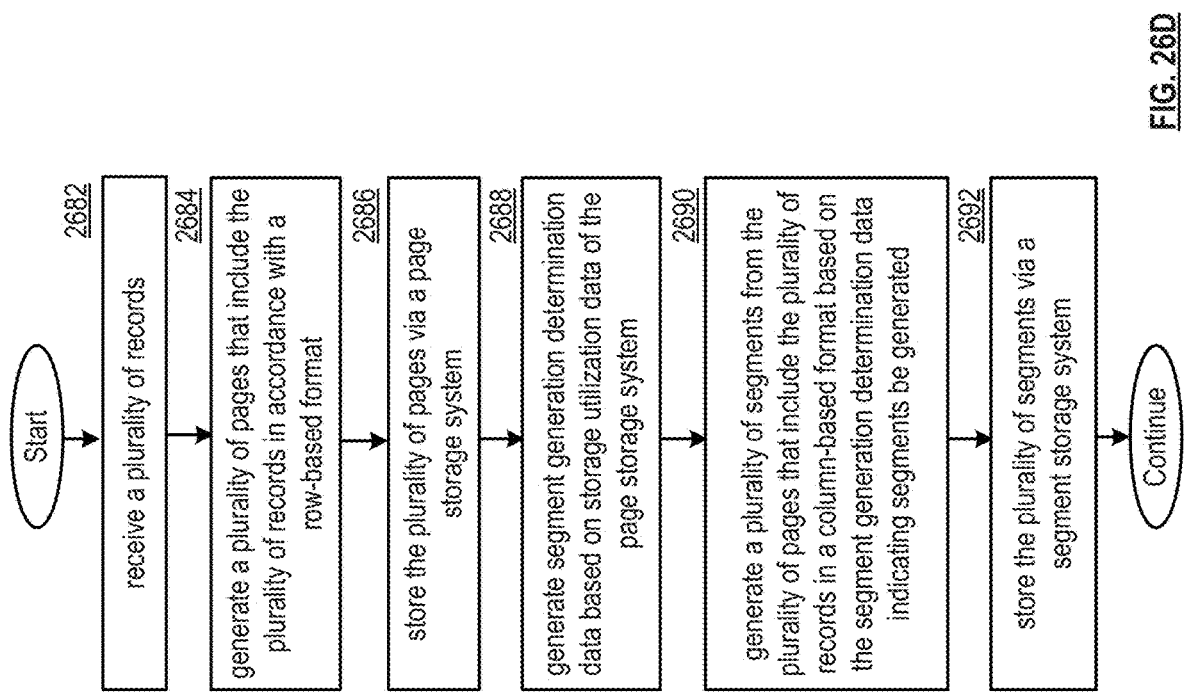
FIG. 26D is a logic diagram illustrating a method of generating segments in accordance with various embodiments.

FIG. 26D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26D. Some or all of the method of FIG. 26D can be performed by the page generator 2511, the page storage system 2506, the segment generator 2517, and/or the segment storage system 2508 of FIG. 25A. Some or all of the method of FIG. 26D can be performed by one or more stream loader modules 2510 of FIG. 25B, independently or in conjunction. Some or all of the method of FIG. 26D can be performed by the page conversion determination module 2610, the cluster key-based grouping module 2620, the columnar rotation module 2630, and/or the metadata generator module 2640 of FIG. 26A. Some or all of the steps of FIG. 26A can optionally be performed by any other processing module of the database system 10. Some or all of the steps of FIG. 26D can be performed to implement some or all of the functionality of the record processing and storage system 2505 of FIG. 25A and/or FIG. 25B. Some or all of the steps of FIG. 26D can be performed to implement some or all of the functionality of the segment generator 2517 of FIG. 26A. Some or all steps of FIG. 26D can be performed by database system 10 in accordance with other embodiments of the database system 10 and/or nodes 37 discussed herein.

Step 2682 includes receiving a plurality of records. For example, the plurality of records is received in one or more record streams from one or more data sources 2501. Step 2684 includes generating a plurality of pages that include the plurality of records in accordance with a row-based format. For example, step 2684 is performed by utilizing an embodiment of page generator 2511 discussed herein. In some cases, no clustering or sorting is performed, and/or the rows included in pages is based on the order in which they are received. Step 2686 includes storing the plurality of pages via a page storage system, such as page cache 2512 of one or more stream loader modules 2510 and/or page storage 2546 of one or more long term storage 2540.

Step 2688 includes generating segment generation determination data based on storage utilization data, such as storage utilization data 2606, of the page storage system. For example, the segment generation determination data is generated by the page conversion determination module 2610. Step 2690 includes generating a plurality of segments from the plurality of pages that include the plurality of records in a column-based format based on the segment generation determination data indicating segments be generated. For example, the plurality of segments is generated via the cluster key-based grouping module 2620, the columnar rotation module 2630, and/or the metadata generator module 2640. Step 2692 includes storing the plurality of segments via a segment storage system, such as segment storage 2548 of one or more long term storage 2540.

In various embodiments, the segment generation determination data indicates segments be generated based on the storage utilization data comparing favorably to predetermined conversion threshold data, such as predetermined conversion threshold data 2605. In various embodiments, the predetermined conversion threshold data indicates a threshold data size. The storage utilization data indicates a data size of the plurality of pages, and the segment generation determination data indicates segments be generated based on the data size of the plurality of pages meeting, exceeding, and/or otherwise comparing favorably to the threshold data size. In various embodiments, the predetermined conversion threshold data indicates a threshold minimum amount of available storage resources. The storage utilization data indicates an amount of available storage resources of the page storage system due to storage of the plurality of pages, and the segment generation determination data indicates segments be generated based on the amount of available storage resources meeting, falling below, and/or otherwise comparing favorably to the threshold minimum amount of available storage resources. In various embodiments, the segment generation determination data is generated based on an elapsed amount of time since a previous plurality of segments was generated from a previous plurality of pages.

In various embodiments, the method includes performing a plurality of previous record storage conversions. Each of the plurality of previous record storage conversions includes generating a previous plurality of segments from a previously generated plurality of pages. The method further includes generating record conversion tracking data based on the plurality of previous record storage conversions. The method further includes generating the predetermined conversion threshold data automatically based on the record conversion tracking data. In various embodiments, the record conversion tracking data includes each of a plurality of clustering metrics determined based on generating each previous plurality of segments from each previously generated plurality of pages, and/or or each of a plurality of previous storage utilization data determined based on generating each previous plurality of segments from each previously generated plurality of pages.

In various embodiments, the segment generation determination data is generated at a first time, and the storage utilization data corresponds to storage capacity of the page storage system at the first time. The method further includes generating other segment generation determination data at previous time prior to the first time based on previous storage utilization data corresponding to storage capacity of the page storage system at the previous time. The other segment generation determination data indicates segments not yet be generated based on the previous storage utilization data comparing unfavorably to the predetermined conversion threshold data.

In various embodiments, prior to the previous time, the method includes receiving a first subset of the plurality of records, generating a first subset of the plurality of pages to include the first subset of the plurality of records, and storing the first subset of the plurality of pages via the page storage system. The previous storage utilization data is based on a first amount of storage resources utilized to store the first subset of the plurality of pages. Prior to the first time the method can further include receiving a second subset of the plurality of records, where the second subset of the plurality of records and the first subset of the plurality of records are mutually exclusive and collectively exhaustive. A second subset of the plurality of pages is generated to include the second subset of the plurality of records. The second subset of the plurality of pages is stored via the page storage system. The storage utilization data is based on a second amount of storage resources utilized to store the first subset of the plurality of pages and the second subset of the plurality of pages.

In various embodiments, the method includes facilitating execution of a first query by reading at least one of the plurality of pages to access a set of the plurality of records during a first temporal period prior to generating a plurality of segments from the plurality of pages. The method includes facilitating execution of a second query by reading at least one of the plurality of segments to access the set of the plurality of records during a second temporal period after generating the plurality of segments from the plurality of pages. For example, the first query and second query are executed by utilizing and/or communicating with the query processing system 2502.

In various embodiments, the method further includes receiving a second plurality of records after generating the plurality of segments from the plurality of pages. A second plurality of pages that include the second plurality of records in accordance with the row-based format are generated, and the second plurality of pages are stored via the page storage system. Facilitating execution of the second query further includes reading at least one of the second plurality of pages to access at least one record of the second plurality of records, and wherein a query resultant of the query is based on the set of the plurality of records and is further based on the at least one record of the second plurality of records.

In various embodiments, the record processing and storage system includes a plurality of nodes that each include a set of memory drives. One of the plurality of nodes is included in the page storage system and stores the at least one of the second plurality of pages via its set of memory drives. The one of the plurality of nodes is further included in the segment storage system and further stores the at least one of the plurality of segments via its set of memory drives. Facilitating execution of the second query includes reading of the at least one of the second plurality of pages by the one of the plurality of nodes and further includes reading of the at least one of the plurality of segments by the one of the plurality of nodes.

In various embodiments, the plurality of records is received in a plurality of record streams generated by a corresponding plurality of data sources, and at least one of the plurality of pages is generated to include records from different ones of the record streams. In various embodiments, the plurality of records is received as formatted row data, and the plurality of pages are generated to include plurality of records in accordance with the formatted row data. In various embodiments, the method includes removing the plurality of pages from storage via the page storage system based on the storage of the plurality of segments via the segment storage system.

In various embodiments, generating a plurality of segments from the plurality of pages includes segregating the plurality of records into a plurality of record groups in accordance with a cluster key of the plurality of records, generating a set of column-formatted row data for each of the plurality of record groups, and generating segment metadata for each column-formatted row data. Generating the plurality of segments from the plurality of pages further includes generating plurality of segment groups that includes the plurality of segments. Each segment group includes a set of segments generated from a corresponding set of column-formatted row data, and each segment in a segment group includes one column-formatted row data from the corresponding set of column-formatted row data and further includes segment metadata generated for the one column-formatted row data.

In various embodiments a first plurality of sets of records of the plurality of records are each included in a corresponding one of the plurality of pages. The first plurality of sets of records are mutually exclusive and collectively exhaustive with respect to the plurality of records. A second plurality of sets of records of the plurality of records are each included in a corresponding one of the plurality of segments. The second plurality of sets of records are mutually exclusive and collectively exhaustive with respect to the plurality of records of records.

In various embodiments, a first page of the plurality of pages includes a first record and a second record, and a second page of the plurality of pages includes a third record and a fourth record. A first segment of the plurality of segments includes the first record and the third record, and a second segment of the plurality of segments includes the second record and the fourth record.

In various embodiments, a non-transitory computer readable storage medium includes at least one memory section that stores operational instructions that, when executed by a processing module that includes a processor and a memory, cause the processing module to: receive a plurality of records; generate a plurality of pages that include the plurality of records in accordance with a row-based format; store the plurality of pages via a page storage system; generate segment generation determination data based on storage utilization data of the page storage system; generate a plurality of segments from the plurality of pages that include the plurality of records in a column-based format based on the segment generation determination data indicating segments be generated; and store the plurality of segments via a segment storage system.

FIG. 27A illustrates an embodiment of a database system 10 that implements a data format conversion module 2720 operable to convert sets of data 2750 from one storage format to another storage format. Some or all features of database system 10 of FIG. 27A can be utilized to implement any embodiment of database system 10 described herein. Some or all features and/or functionality of the data format conversion module 2720 can be implemented via the parallelized data store, retrieve, and/or process subsystem 12, and/or the parallelized data input sub-system 11. Some or all features of the data format conversion module 2720 can be implemented via any set of one or more computing devices 18, nodes 37, and/or processing core resources 48 operating independently or in conjunction.

The data format conversion module 2720 can be operable to generate converted data 2765 from a batch of data 2755 that includes a plurality of different data 2750 in accordance with a first storage format A, for example, via a format A to format B conversion module 2730 of the data format conversion module 2720. The converted data 2765 can include all of the plurality of different data 2750 of the batch of data 2755 in a second storage format B that is different from the first storage format A.

Storage format A can correspond to a less efficient storage format than storage format B. Alternatively or in addition, storage format A can correspond to a short-term storage format, while storage format B can correspond to a long-term storage format. Alternatively or in addition, storage format A is in accordance with a row-based format and storage format B is in accordance with a column-based format. As a particular example, storage format A corresponds to pages 2515 of row data 2910 and/or records 2422, and storage format B corresponds to segments 2424 generated from pages 2515. Storage format A and storage format B can correspond to any other types of distinct storage formats for data 2750.

Each data 2750 can be implemented as one or more row data 2910, one or more records 2422, and/or one or more pages 2515 that include the one or more row data 2910, one or more records 2422. The data 2750 can be implemented via any other data that is received and/or stored by the database system 10, for example via memory resources of a data format A storage system 2706. The plurality of data 2750 received by the database system 10 and/or stored in the data format A storage system 2706 can be distinct records, row data, pages, and/or other data. Each data 2750 can be included in one batch of data 2755 for conversion into converted data 2765, where each data 2750 is converted exactly once.

The data format conversion module 2720 can optionally facilitate storage of converted data 2765 in the second storage format B in at least one memory of the database system 10, for example, that is distinct from storage resources and/or memory locations previously utilized to store the set of data in the first storage format A prior to conversion. Once the given converted data 2765 is generated and/or successfully stored in another location, the data 2750 of the corresponding batch of data 2755 is optionally deleted from storage in the data format A storage system 2706.

The format A to format B conversion module 2730 can facilitate generation of converted data 2765 from a given batch of data 2755, and/or performance of corresponding operations to perform this conversion, by utilizing one or more memory resources 2735. The memory resources 2735 can be implemented via one or more memory devices of one or more computing devices 18, nodes 37, and/or processing core resources 48 that implement the format A to format B conversion module 2730, for example, by performing respective portions of the data conversion independently or in conjunction. The memory resources 2735 can be implemented via any other memory modules accessible via the database system 10.

The memory resources 2735 can be implemented to store temporary data generated in the processing of the data 2750 of a given batch of data 2755 to generate the converted data 2765, for example, most efficiently. This can include: memory resources utilized to cluster or otherwise sort the plurality data 2750 of a given batch of data 2755, for example, based on interpreting the data value of one or more fields of each record 2422, such as cluster key fields, of the of a given batch of data 2755; memory resources utilized to generate index data, statistical data, and/or metadata characterizing and/or included in each of a plurality of segments or other data structures of the converted data 2765; or other processing associated with generating the converted data 2765 from the given batch of data 2755.

The memory resources 2735 can be implemented via a single type of memory or multiple different types of memory. The memory resources 2735 for each type of memory can include one or more memory locations of one or more memory devices that are shared with or distinct from one or more other memory locations of one or more other memory devices implementing other types of memory. Different functionality of the format A to format B conversion module 2730 for a given conversion process can optionally be performed via use of different types of memory.

The memory resources 2735 can include one or more dynamically allocated memory resources for allocation when performing the conversion process to generate converted data 2765 from a given batch of data. For example, some or all memory resources 2735 are implemented as heap memory resources of heap memory.

Alternatively or in addition, the memory resources 2735 can include one or more huge pages for allocation when performing the conversion process to generate converted data 2765 from a given batch of data. For example, some or all memory resources 2735 are implemented as huge page memory resources of huge page memory, such as a huge page implemented as a memory page that is larger than 4 KiB, that is equal to 2 MiB and/or that is equal to 1 GiB. The huge page memory resources can optionally be implemented as one or more huge pages, which can be implemented in a same or similar fashion as pages 2515. In some embodiments, pages 2515 of page storage system storing row data 2910 have a first memory size, such as 4 KiB, and one or more huge pages of huge page memory has a second memory size that is strictly larger than the first memory size. The huge page memory resources can be implemented as Linux HugePages, superpages, and/or Large Pages.

Alternatively or in addition, the memory resources 2735 can be implemented via any one or more other types of memory.

Some or all of the memory resources 2735 can be consumed during a given conversion process to generate first converted data from a first batch of data 2755. Some or all of the memory resources 2735 are optionally only freed and/or available for reuse once the given conversion process is completed, for reuse in a subsequent conversion process to generate subsequent converted data from a subsequent batch of data 2755, where prior data from the prior conversion written to these memory resources 2735 is overwritten and/or deleted.

Consumption of all of the available memory resources 2735 during a given conversion process and/or attempting to utilize more than the available memory resources 2735 during a given conversion process can result in a failure condition, such as failure of the given conversion process and/or failure of one or more hardware and/or software components of the data format conversion module 2720. For example, the failure condition can include or be based on and/or a failure condition of one or more com; the converted data 2765 not being generated properly; the converted data 2765 needing to be regenerated from the batch of data 2755; at least one node 37 of the format A to format B conversion module 2730 crashing or otherwise becoming unavailable for further participation in the conversion process or other subsequent operation; additional, and optionally less efficient resources, needing to be allocated to complete the conversion process; state data being lost for the conversion process; hardware and/or software components of the data format conversion module 2720 being non-operational until a recovery process is performed and/or until human intervention enables recovery of the data format conversion module 2720; and/or other unfavorable conditions.

A data batch retrieval module 2725 can select, identify, receive, and/or otherwise determine a given batch of data 2755 for conversion into corresponding converted data 2765, for example, where this conversion is performed conjunction and/or via a single and/or shared process across all data 2750 of the batch of data 2755. This can include identifying the given batch of data 2755 for conversion based on the batch of data 2755 being exactly or substantially equal to a given batch size 2705. As discussed in further detail herein, the batch size 2705 for the batch of data 2755 is determined based on being expected and/or guaranteed to not require use of more than the available memory resources 2735 to ensure no failure condition ensues during the conversion.

The batch size 2705 can correspond to a number of bytes, a number of pages 2515, a number of records 2422, and/or other metric corresponding to amount of data in the given batch of data 2755. The batch size 2705 can opinionable correspond to a range of number bytes having a maximum and/or minimum number of bytes, a range of number pages 2515 having a maximum and/or minimum number of pages, a range of number of records 2422 having a maximum and/or minimum number of records, and/or range for another metric corresponding to amount of data in the given batch of data 2755.

The data batch retrieval module 2725 determining the given batch of data 2755 for conversion can include querying the data format A storage system 2706 for a batch of data 2755 having a given batch size 2705, and receiving the batch of data 2755 having exactly and/or substantially the given batch size 2705 in response. For example, the batch of data 2755 has substantially the given batch size 2705, but not exactly the given batch size 2705, based on not splitting up a given page 2515, given record 2422, given row data 2910, or other given data 2750, and thus not exactly matching the given batch size 2705. In such embodiments, identification of the given batch of data 2755 is optionally performed via inclusion of one data 2750 at a time, and/or is optionally determined to be completed once the batch size 2705 has been reached and/or exceeded via inclusion of a given data 2750.

Converting sets of data from the first storage format to the second storage format can involve converting as much data as possible in a given batch of data 2750, where the batch size 2705 of a given batch of data 2755 is ideally as large as possible. For example, generation of converted data 2765 from batches of data 2755 with larger batch sizes 2705 can result in converted data 2765 more effectively organizing the data 2750 to induce more efficient query execution for queries performed upon the converted data 2765 of a corresponding dataset than that generated from batches of data 2755 with smaller batch sizes 2705. Alternatively or in addition, generation of converted data 2765 from batches of data 2755 with larger batch sizes 2705 can result in more efficient resource utilization in generating a plurality of converted data over time than when generated from batches of data 2755 with smaller batch sizes 2705.

For example, generation of converted data 2765 from batches of data 2755 with larger batch sizes 2705 can be ideal for some or all reasons discussed in conjunction with the embodiments of FIGS. 26A-26D, where the batch of data 2755 is implemented as row data 2910 of a set of pages 2515 and/or where the converted data 2765 is implemented as a set of segments 2424 generated from the set of pages. Generation of converted data 2765 from batches of data 2755 with larger batch sizes 2705 can otherwise result in more efficient operation of one or more aspects of the database system 10 than when generated from batches of data 2755 with smaller batch sizes 2705.

Utilizing the largest possible batch size can be challenging, as batch sizes that are too large can induce memory overload induced upon memory resources, such as memory resources 2735 of the format A to format B conversion module, during the conversion process into converted data. In particular, performing a conversion process with memory requirements exceeding that of available memory resources 2735 can result in unideal failure conditions as discussed previously. Thus, upper end limitations should be imposed upon the batch sizes to ensure that the available memory resources 2735 one or more different memory types are not fully consumed to avoid any failure condition. The batch size 2705 can thus be selected to be as large as possible, so that as much of the available memory resources 2735 are used as possible, while being guaranteed to not fully consume the available memory resources 2735.

However, the exact batch size 2705 that can be managed during data conversion managed may vary with conditions such as: schema of the corresponding data set; total memory available on the one or more nodes of the format A to format B conversion module 2730; changes in the overall state of the data format conversion module 2720 and/or database system 10; and/or other conditions.

As different conditions of the available memory resources 2735 and/or consumption of memory during conversion processes can change over time, it can be unideal to utilize a fixed, hardcoded batch size 2705. For example, while a fixed batch size can be selected based on being estimated to be manageable under all anticipated circumstances, this can leave resources unused in some situations, and if circumstances change so that the fixed size no longer works, the system may not be able to recover without user intervention.

Instead of implementing a fixed batch size and/or requiring batch size be selected for a given conversion process via user input, the database system 10 can automatically set the batch size 2705 adaptively, for example, based on adaptively determining the maximum allowed batch size that will not induce failure over time. This can include pushing towards the largest possible size without causing failure, and/or dynamically ramping up or backing off if the dynamics of the system change.

This dynamic, automatic selection of batch sizes 2705 for performance of various data format conversion over time can improve the technology of database systems 10 by enabling large batches of data to be converted while ensuring failures do not occur due to adapting to changing conditions of the system and/or adaptively optimizing selection of the batch size. This can reduce the number of system failures and/or data conversion failures, while optimizing resource usage during data format conversion and/or while rendering more optimal converted data for access in to improve the efficiency of query processing. For example, more optimal segments 2424 are produced due to performing clustering across higher numbers of records 2422 in each conversion, while ensuring that failures are not induced in generating these more optimal segments.

The database system 10 can achieve these improvements via implementing a batch size determination module 2710 that is implemented via at least one processor and/or at least one memory. For example, the batch size determination module 2710 is implemented via at least one processing core resource 48, at least one node 37, and/or at least one computing device 18.

The batch size determination module 2710 can select a given batch size 2705.$i$ for an ith iteration of the conversion process to render identification of a corresponding batch of data 2755.$i$, for example, via the data batch retrieval module, having this batch size 2705. Different iterations of the conversion process can be performed via different sized batches of data 2755 based on selection of different batch sizes 2705 via the batch size determination module 2710 over time.

A given batch size 2705.$i$ for an ith conversion process can be selected based on measured memory utilization 2738 of one or more prior conversion processes via the format A to format B conversion module. For example, the given batch size 2705.$i$ is selected based on at least the measured memory utilization 2738.$i-1$ of the i−1th conversion, and/or additional measured memory utilization 2738.$i-k$ for one or more values of k for corresponding the i-kth conversion processes. This can optionally include utilizing the measured memory utilization 2738.$i-1$ to update a predictive model mapping estimated memory utilization to batch size as discussed in conjunction with FIGS. 28A-28G, and/or can otherwise include selecting batch size 2705.$i$ as a function of one or more prior measured memory utilization 2738.

The measured memory utilization 2738 utilized by batch size determination module 2710 to select batch sizes 2710 for one or more subsequent conversion processes can be generated via a conversion-based memory utilization measurement module 2740 that tracks, receives, estimates, measures, and/or otherwise determines memory utilization data 2736 indicating memory utilization of memory resources 2735 during a given conversion process. For example, the measured memory utilization 2738.$i$ can indicate a peak amount of memory that was utilized in performing conversion process i for one or more types of memory implemented via memory resources 2735.

In some embodiments, when performing the ith conversion process via the batch of data 2755.$i$, identified based on having the selected batch size 2705.$i$ for this conversion, corresponding memory utilization data 2736.$i$ is determined by conversion-based memory utilization measurement module 2740 for one or more memory types, and corresponding measured memory utilization 2738.$i$ is communicated to the batch size determination module for its use in selecting batch size 2705.$i+1$ for conversion process i+1. For example, memory utilization data 2736 indicates memory utilization measured over one or more times during the given conversion process, where the measured memory utilization 2738 indicates a peak and/or maximum memory utilization measured during the given conversion process.

FIG. 27B illustrates a timeline illustrating generation of different converted data over time by a data format conversion module 2720 via corresponding batches of data having different batch sizes selected via the batch size determination module 2710. Some or all features and/or functionality of the batch size determination module 2710 and/or the data format conversion module 2720 of FIG. 27B can implement the batch size determination module 2710 and/or the data format conversion module 2720 of FIG. 27A, and/or any other embodiment of the batch size determination module 2710 and/or the data format conversion module 2720 described herein.

For example, an ith conversion process at time $t_i$, is performed upon a first batch of data 2755.$i$ having batch size 2705.$i$, based on measured memory utilization 2738.$i-1$ of a prior conversion process. Measured memory utilization 2738.$i$ is generated, for example, via the conversion-based memory utilization measurement module 2740, based on resource consumption during the ith conversion process in generating the converted data 2765.$i$, and is utilized by the batch size determination module 2710 to determine batch size 2705.$i+1$, which is utilized to identify the next batch of data 2755.*i*+1 for performance of the i+1th conversion process at $t_{i+1}$. For example, the batch size determination module 2710 selects a batch size 2705.*i*+1 that increases from batch size 2705.*i*, as pictorially presented in FIG. 27B, based on the measured memory utilization 2738.*i* indicating an amount of unutilized memory resources exceeded a predetermined threshold and/or based on otherwise determining the batch size 2705 can safely increase and not be expected to induce failure.

Similarly, measured memory utilization 2738.*i*+1 is generated based on resource consumption during the i+1th conversion process in generating the converted data 2765.*i*+1, and is utilized by the batch size determination module 2710 to determine batch size 2705.*i*+2, which is utilized to identify the next batch of data 2755.*i*+2 for performance of the i+2nd conversion process at $t_{i2}$. For example, the batch size determination module 2710 selects a batch size 2705.*i*+2 that again increases from batch size 2705.*i*+1, as pictorially presented in FIG. 27B, based on the measured memory utilization 2738.*i*+1 indicating an amount of unutilized memory resources still exceeded the predetermined threshold despite the prior increase in size for the i+1th conversion process, and/or based on otherwise determining the batch size 2705 can safely increase further and still not be expected to induce failure.

Continuing with this process, measured memory utilization 2738.*i*+2 is generated based on resource consumption during the i+2nd conversion process in generating the converted data 2765.*i*+2, and is utilized by the batch size determination module 2710 to determine batch size 2705.*i*+3, which is utilized to identify the next batch of data 2755.*i*+23 for performance of the i+3rd conversion process at $t_{i+3}$. However, in this case, the batch size determination module 2710 selects a batch size 2705.*i*+3 that decreases from batch size 2705.*i*+2, as pictorially presented in FIG. 27B. For example, the batch size determination module 2710 selects batch size 2705.*i*+3 to decrease from batch size 2705.*i*+2 based on the measured memory utilization 2738.*i*+2 indicating a failure condition during the i+2nd conversion process. As another example, no failure condition occurred, but the batch size determination module 2710 still selects batch size 2705.*i*+3 to decrease from batch size 2705.*i*+2 based on the measured memory utilization 2738.*i*+2 indicating an amount of unutilized memory resources fell below the predetermined threshold due to the prior increase in size for the i+2nd conversion process and/or due to other changes in conditions of the data format conversion module, and/or based on otherwise determining the batch size 2705 should decrease to ensure that failure is not induced.

FIG. 27C illustrates an embodiment of a segment generator 2517 of a record processing and storage system 2505 that implements page conversion determination module 2610 based on a batch size 2705 generated via the batch size determination module 2710. Some or all features and/or functionality of the record processing and storage system 2505 of FIG. 27C can be implemented utilizing some or all features and/or functionality of the record processing and storage system 2505 presented and discussed in conjunction with some or all of FIGS. 25A-26D.

Some or all features and/or functionality of the record processing and storage system 2505 of FIG. 27C can implement the embodiment of database system 10 of FIG. 27A. In particular, in some embodiments of the database system 10 of FIG. 27A, the segment generator 2517 can implements the data format conversion module 2720 of FIGS. 27A-27B, where the data format B is implemented as a set of segments 2424 storing records from the batch of data as column-formatted record data, and/or where the converted data 2765 of FIG. 27A. For example, the cluster key-based grouping module 2620, the columnar rotation module 2630, and/or the metadata generator module 2640 can implement the format A to format B conversion module 2730. Alternatively or in addition, in some embodiments of the database system 10 of FIG. 27A, the page storage system 2506 implements the data format A storage system 2706 of FIG. 27A, where data format A is implemented as records 2422 stored in a row-based format as row data 2910 stored in pages 2515.

In particular, the selection of batch size 2705 via batch size determination module 2710 can implement some or all features and/or functionality of the page conversion determination module 2610, where as many pages as possible are accumulated for conversion into segments via a given conversion process as discussed in conjunction with FIGS. 26A-26D. However, the batch size 2705 can bound the accumulation of as many pages as possible based on expecting and/or guaranteeing that the conversion process will not require more than the amount of memory resources 2735 of the segment generator 2517 utilized in performing the conversions of a conversion page set 2655 into a corresponding set of segment groups 1-X.

In particular, the conversion page set 2655 can be identified based on having the selected batch size 2705 for the given conversion process. In some embodiments, this can include selecting the conversion page set as a proper subset of all pages currently stored in page storage system awaiting conversion, where some pages are not selected despite being ready for conversion to ensure that the selected batch size 2705 is not exceeded and that the conversion process is thus expected to perform successfully without inducing failure conditions.

In other embodiments, this can include waiting for the selected batch size 2705 amount of pages to be accumulated over time, for example, via the page generator of FIG. 25C, where the page conversion determination module 2610 determines to generate segments once the batch size 2705 amount of pages have been accumulated. For example, the predetermined conversion threshold data 2605 of FIG. 26A is implemented to indicate the batch size 2705 selected for the next conversion process, and the predetermined page conversion determination module 2610 of FIG. 26A determines to initiate the next conversion process to generate segments from the pages accumulated in page storage system 2506 awaiting conversion once the storage size of the number of pages awaiting conversion reaches the selected batch size 2705. For example, the storage utilization data 2606 of FIG. 26A indicates the current amount of data in pages awaiting conversion at any given time, and the page conversion determination module generates the segment generation determination data to indicate the generation of segments only once the storage utilization data 2606 indicates the size of the conversion page set 2655 has reached the selected batch size 2705.

The data batch retrieval module 2725 can be implemented to retrieve all pages of the conversion page set in such cases where the conversion process is initiated once the size of the conversion page set 2655 has reached the selected batch size 2705. Alternatively, the data batch retrieval module 2725 can indicate the batch size 2705 and only retrieve a proper subset of pages in cases where the segment generation is performed in accordance with a schedule or at other times not based on the size of the conversion page set 2655 reaching the selected batch size 2705, and/or to ensure that no additional pages accumulated since the storage utilization data 2606 inducing initiation of the process are included to ensure the conversion page set 2655 does not exceed the selected batch size 2705.

FIG. 27D illustrates a method for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D. Some or all of the method of FIG. 27D can be performed by a record processing and storage system 2505. For example, some or all of the method of FIG. 27D can be performed by the page generator 2511, the page storage system 2506, the segment generator 2517, and/or the segment storage system 2508 of FIG. 25A. Some or all of the method of FIG. 27D can be performed by one or more stream loader modules 2510 of FIG. 25B, independently or in conjunction. Some or all of the method of FIG. 27D can be performed by the page conversion determination module 2610, the cluster key-based grouping module 2620, the columnar rotation module 2630, and/or the metadata generator module 2640 of FIG. 26A. Some or all of the method of FIG. 28G can be performed via the batch size determination module 2710, the data format conversion module 2720, and/or the conversion-based memory utilization measurement module 2740 of FIGS. 27A-27B. Some or all of the steps of FIG. 27D can optionally be performed by any other processing module of the database system 10.

Some or all of the method of FIG. 28G can be performed via the batch size selection module 2830 and/or the predictive model update module 2820 of FIGS. 27A-27B. Some or all of the steps of FIG. 27D can be performed to implement some or all of the functionality of the record processing and storage system 2505 of FIG. 25A and/or FIG. 25B. Some or all of the steps of FIG. 27D can be performed to implement some or all of the functionality of the segment generator 2517 of FIG. 26A. Some or all steps of FIG. 26D can be performed by database system 10 in accordance with other embodiments of the database system 10 and/or nodes 37 discussed herein. Some or all of the steps of FIG. 27D can be performed in conjunction with performing some or all steps of FIG. 26D, and/or any other method described herein. Some or all of the steps of FIG. 27D can be performed automatically, without human intervention.

Step 2782 includes automatically selecting a first conversion batch size for a first temporal period. Step 2784 includes identifying a first batch of data stored in a first storage format and for conversion during the first temporal period based on having the first conversion batch size. Step 2786 includes generating a first set of converted data by converting the first batch of data from the first storage format to the second storage format during the first temporal period. Step 2788 includes determining an actual amount of memory utilized in generating the first set of converted data during the first temporal period.

Step 2790 includes automatically selecting a second conversion batch size for a second temporal period after the first temporal period. In various embodiments, the second conversion batch size is different from the first conversion batch size based on the actual amount of memory utilized in generating the first set of converted data. Step 2792 includes identifying a second batch of data stored in the first storage format for conversion during the second temporal period based on having the second conversion batch size. Step 2794 includes generating a second set of converted data by converting the second batch of data from the first storage format to the second storage format during the second temporal period.

In various embodiments, the method further includes selecting the first conversion batch size based on an estimated amount of memory utilized in generating the first set of converted data during the first temporal period. In various embodiments. selecting the second conversion batch size is based on a difference between the estimated amount of memory utilized and the actual amount of memory utilized.

In various embodiments, the second conversion batch size is selected to be greater than the first conversion batch size based on the estimated amount of memory utilized being greater than the actual amount of memory utilized. In various embodiments, the second conversion batch size is selected to be less than the first conversion batch size based on the estimated amount of memory utilized being less than the actual amount of memory utilized.

In various embodiments, the second conversion batch size is selected as function of a difference between a total memory capacity and the actual amount of memory utilized in generating the first set of converted data during the first temporal period. In various embodiments, the second conversion batch size is selected to be greater than the first conversion batch size based on the difference between the total memory capacity and the actual amount of memory utilized in generating the first set of converted data during the first temporal period being less than a predetermined buffer amount. In various embodiments, the second conversion batch size is selected to be less than the first conversion batch size based on the difference between the total memory capacity and the actual amount of memory utilized in generating the first set of converted data during the first temporal period being greater than a predetermined buffer amount. In various embodiments, the second conversion batch size is selected to be less than the first conversion batch size based on a failure condition being detected in generating the first set of converted data during the first temporal period and/or the actual amount of memory utilized exceeding the total memory capacity.

In various embodiments, the first storage format is a short-term storage format, and/or the second storage format is a long-term storage format. In various embodiments, the first storage format is a row-based storage format, and/or the second storage format is a column-based storage format. In various embodiments, first batch of data in the first storage format includes a first plurality of records stored in accordance with the row-based format. In various embodiments, the first set of first set of converted data includes the first plurality of records stored in accordance with the column-based format.

In various embodiments, the first storage format is a page storage format. In various embodiments, the first batch of data includes a first set of pages, and/or the second batch of data includes a second batch of pages. In various embodiments, a first number of bytes of the first set of pages is different from a second number of bytes of the second set of pages based on the first conversion batch size being different from the second conversion batch size.

In various embodiments, the second storage format is a segment storage format. In various embodiments, the first set of converted data includes a first set of segments generated from the first set of pages, and/or the second set of converted data includes a second set of segments generated from the second set of pages.

In various embodiments, generating first set of segments includes segregating a plurality of records of the first set of pages into a plurality of record groups in accordance with a cluster key of the plurality of records generating a set of column-formatted record data for each of the plurality of record groups generating segment metadata for each column-formatted record data; and/or generating a plurality of segment groups that includes the plurality of segments. In various embodiments, each segment group includes a set of segments generated from a corresponding set of column-formatted record data, and wherein each segment in a segment group includes one column-formatted record data from the corresponding set of column-formatted record data and/or includes segment metadata generated for the one column-formatted record data.

In various embodiments, a first page of the first set of pages includes a first record and a second record, and/or a second page of the first set of pages includes a third record and a fourth record. In various embodiments, a first segment of the first set of segments includes the first record and the third record, and/or a second segment of the first set of segments includes the second record and the fourth record.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a record processing and storage system includes at least one processor and a memory that stores operational instructions. The operational instructions, when executed by the at least one processor, can cause the record processing and storage system to: automatically select a first conversion batch size for a first temporal period; identify a first batch of data stored in a first storage format and for conversion during the first temporal period based on having the first conversion batch size; generate a first set of converted data by converting the first batch of data from the first storage format to the second storage format during the first temporal period; determine an actual amount of memory utilized in generating the first set of converted data during the first temporal period; automatically select a second conversion batch size for a second temporal period after the first temporal period, wherein the second conversion batch size is different from the first conversion batch size based on the actual amount of memory utilized in generating the first set of converted data; identify a second batch of data stored in the first storage format for conversion during the second temporal period based on having the second conversion batch size; and/or generate a second set of converted data by converting the second batch of data from the first storage format to the second storage format during the second temporal period.

FIGS. 28A-28F illustrate embodiments of a batch size determination module 2710 that selects batch sizes 2705 based on applying a predictive model 2810. Some or all features and/or functionality of FIGS. 28A-28F can implement the record processing and storage system 2505 of FIG. 27C and/or the database system 10 of FIGS. 27A and/or 27B.

FIG. 28A illustrates a batch size determination module 2710 that implements a batch size selection module 2830 that selects batch size 2705.*i* for a given ith conversion process based on memory availability 2832 and based on a predictive model 2810. Some or all features and/or functionality of the batch size determination module 2710 of FIG. 28A can implement any embodiment of the batch size determination module 2710 described herein.

The memory availability 2832 can correspond to a current memory availability 2832 of memory resources 2735, a total memory availability of memory resources 2735 and/or other determination of the amount of memory available via memory resources 2735 of one or more memory types. The memory availability 2832 can be determined via conversion-based memory utilization measurement module 2740 and/or can be otherwise tracked and/or determined for the memory resources 2735 of the format A to format B conversion module 2730. In cases where the memory availability 2832 corresponds to the current memory availability 2832 of memory resources 2735, the memory availability 2832 can change over time for different iterations of the conversion process based on the memory availability of the memory resources 2735 for the upcoming conversion process, and/or at a current time prior to the upcoming conversion process.

For example, the memory availability 2832 indicates an amount of memory of memory resources 2735 available for consumption in performing a conversion process. When the amount of memory consumed in performing a conversion process exceeds and/or attempts to exceed the amount of memory availability 2832, a corresponding failure condition can occur due to the memory consumed via the conversion process overloading the available memory resources 2735. When the amount of memory consumed in performing a conversion process does not exceed and/or does not attempt to exceed the amount of memory availability 2832, no failure condition occurs due to the memory consumed via the conversion process not overloading the available memory resources 2735.

The predictive model 2810 can map estimated memory utilization 2848 to batch size 2705 via a corresponding mapping function F that predicts memory utilization of a given conversion process as a function of the batch size utilized in performing the given conversion process. The estimated memory utilization 2848 can correspond to the peak amount of memory utilization that will occur during the given conversion process.

The selected batch size 2705.*i* for an ith iteration of the conversion process can be selected as one of a plurality of possible batch sizes 2705. A particular selected batch size 2705-*x* can be selected based on being mapped to a corresponding estimated memory utilization 2848-*x* that is less than or equal to the memory availability 2832. For example, batch size 2705-*x* is selected such that F(batch size 2705-*x*) is less than or equal to memory availability 2832.

FIG. 28B illustrates this relationship. Predictive model 2810 can indicate mapping function F(batch size) as a linear function as illustrated in FIG. 28B, or optionally as a non-linear function. The given selected batch size 2705-*x* is selected based on being mapped to a corresponding estimated memory utilization 2848-*x* that is less than or equal to the memory availability 2832. In the example of FIG. 28B, F(batch size 2705-*x*) is equal to a corresponding estimated memory utilization 2848-*x* that is less than the memory availability 2832 by a non-zero buffer amount. This non-zero buffer can be fixed for a given conversion process, or can be different for different conversion processes. This non-zero buffer can be fixed for different batch sizes 2705-*x*, or can be different for different batch sizes 2705-*x*. Embodiments of such a non-zero buffer are discussed in further detail in conjunction with FIGS. 29A-29G. Alternatively, the batch size 2705-*x* can be selected such that the corresponding estimated memory utilization 2848-*x* is equal to the memory availability 2832.

FIG. 28C illustrates an embodiment of batch size determination module 2710 that implements a predictive module update module 2820 to update the predictive model 2810 over time based on measured memory utilization 2738 determined for a set of prior conversion processes with a set of corresponding batch sizes. Some or all embodiments of the batch size determination module 2710 of FIG. 28C can be utilized to implement the batch size determination module 2710 of FIG. 28A and/or any other embodiment of the batch size determination module 2710 described herein.

A predictive model update module 2820 can generate a given iteration of predictive model 2810.$i$ based on an updated input dataset 2815.$i$ that includes the most recent batch size 27-5.$i$−1 selected for the prior conversion process $i$−1 and most recent corresponding measured memory utilization 2738.$i$−1 induced in performing this prior conversion process $i$−1.

The given input dataset 2815.$i$ can have a full set of N such pairings of prior batch sizes 2705 to corresponding measured memory utilization 2738 for N prior batch sizes, where N is optionally greater than or equal to three, or another positive number, to enable a trend to be determined. The input dataset 2815.$i$ can be implemented as empirical data collected via prior iterations of the conversion process to enable generation of the predictive model.

The value of N can optionally be fixed, where the input data set $i$ never exceeds N, and/or always includes exactly the N most recent pairings when $i$ is greater than N, or when a full of set of N prior pairings are otherwise available. In such embodiments, the least recent pairing can be dropped for generation of each subsequent predictive model as the most recent pairing is added to maintain the input dataset having exactly N pairings. Alternatively, the value of N is not fixed and/or has no upper limit, where some or all old pairings are maintained as new pairings are added. In such embodiments, more recent pairings are optionally weighted higher and/or induce greater influence upon the corresponding predictive model than less recent pairings.

The predictive model update module 2820 can generate the predictive model 2810 based on processing the input dataset 2815. For example, the predictive model 2810 is retrained and/or otherwise updated after each conversion process in performed to reflect the most recent batch size and corresponding measured memory utilization This can include performing at least statistical training function and/or performing other statistical technique to generate the predictive model 2810. This can alternatively or additionally include performing at least one machine learning training function and/or performing other machine learning technique to generate the predictive model 2810. This can alternatively or additionally include performing a supervised training process upon input dataset 2815. The corresponding predictive model 2810 can optionally be implemented as a statistical model, artificial intelligence model, and/or machine learning model. As a particular example, the predictive model 2810 is implemented as a linear regression model, where the mapping function is a linear function generated via linear regression. The mapping function can be implemented as any other regression function, inference function, and/or predictive function corresponding to the predictive model, where the mapping function is any linear or non-linear function.

FIG. 28D illustrates an example predictive model 2810.$i$ generated as a linear regression model via performance of a linear regression technique upon the input dataset 2815.$i$. Some or all features and/or functionality of predictive model 2810 of FIG. 28D can implement the predictive model 2810 of FIG. 27A, and/or any other embodiment of the predictive model 2810 described herein.

In this example, the mapping function F(batch size) operable to output estimated memory utilization 2848 as a function of batch size is generated based on a set of seven prior points, corresponding to pairings of the input dataset 2815.$i$, for example, based on the value of N being equal to seven, based on the fixed max size of the input dataset being greater than or equal to seven, and/or based on the number of prior iterations of the conversion process being greater than or equal to seven. Other types of regression functions or other models can be generated based on the input dataset 2815 in different embodiments. Different iterations of the predictive model 2810 can be generated as the same type of model, or different types of models over time.

FIG. 28E illustrates a timeline depicting the updating of predictive model 2810 overtime. Some or all features and/or functionality of updating of predictive model 2810 over time as illustrated in FIG. 28E can implement the predictive model 2810 and/or the batch size determination module of FIG. 27A, and/or any other embodiment of the predictive model 2810 and/or the batch size determination module described herein.

A version of predictive model 2810.$i$ can be generated based on a set of prior batch sizes 2705.$i$-1-2705.$i$-N and a corresponding set of prior measured memory utilization 2738.$i$-1-2738.$i$-N. This predictive model 2810.$i$ can be characterized by mapping function $F_1$, which can be a linear function having a first slope as illustrated in FIG. 28E. A corresponding batch size 2705.$i$ can be selected based on this predictive model 2810.$i$ and based on memory availability 2832.$i$, where a batch of data 2755.$i$ having this selected batch size 2705.$i$ is identified and processed to generate converted data 2765.$i$ in a corresponding ith conversion process at time $t_1$.

A subsequent version of the predictive model 2810.$i$+1 can be generated based on a set of prior batch sizes 2705.$i$-2705.$i$-(N−1) and a corresponding set of prior measured memory utilization 2738.$i$-2738.$i$-(N−1). In particular, the most recent batch size 2705.$i$ and most recent measured memory utilization 2738.$i$ are determined based on performance of the prior conversion process at time $t_i$. Furthermore, the least recent prior batch size 2705.$i$-N and corresponding least recent measured memory utilization 2738.$i$-N of the input dataset 2815 utilized in generating predictive model 2810.$i$ are dropped from inclusion in generating predictive model 2810.$i$+1, for example, based on the value of N being a predetermined fixed maximum size of input dataset 2815.

This updated predictive model 2810.$i$+1 can be characterized by mapping function $F_{1+1}$, which can again be a linear function having a second slope. The second slope can be different from the first slope, for example, where a magnitude of this difference and/or whether the slope increased or decreased can be based on differences between the newly included pairing of the batch size 2705.$i$ and measured memory utilization 2738.$i$ and the newly dropped pairing of the batch size 2705.$i$-N and corresponding measured memory utilization 2738.$i$-N. In the example illustrated in FIG. 28E, the second slope is less than and/or otherwise less steep than the first slope, as illustrated in FIG. 28E. In other embodiments, a slope can be the same as and/or steeper than the slope of the prior predictive model.

A corresponding batch size 2705.$i$+1 can be selected based on this predictive model 2810.$i$+1 and based on memory availability 2832.$i$+1, where a batch of data 2755.$i$+1 having this selected batch size 2705.$i$+1 is identified and processed to generate converted data 2765.$i$ in a corresponding $i$+1th conversion process at time t1+1. For example, the batch size 2705.$i$+1 is greater than the batch size 2705.$i$ based on the decreasing of the slope in predictive model 2810.$i$+1 from that of 2810.$i$. As another example, the batch size 2705.$i$+1 is less than the batch size 2705.$i$ despite the decreasing of the slope in predictive model 2810.$i$+1 from that of 2810.$i$, based on an amount by which the memory availability 2832.$i$+1 decreased from memory availability. 2832.$i$.

FIG. 28F illustrates a timeline depicting the initialization of predictive model 2810 after a set of multiple initial conversion processes selected via a pre-model batch size selection function 2850. Some or all features and/or functionality initializing the predictive model 2810 as illustrated in FIG. 28F can implement the predictive model 2810 and/or the batch size determination module of FIG. 27A, and/or any other embodiment of the predictive model 2810 and/or the batch size determination module described herein.

As illustrated in FIG. 28F, a first set of multiple converted data 2765 are generated prior to generation of the predictive model 2810, for example, based on not enough points being present in the input dataset 2815.$i$ to enable generation of the predictive model 2810 and/or to enable identification of a corresponding trend. The batch sizes 2705 selected for the corresponding conversion processes can be selected via a different, pre-model batch size selection function 2850 due to the predictive model 2810 not yet being generated.

For example, as depicted in FIG. 28F the first three converted data 2765.1, 2765.2, and 2765.3 of the first three conversion processes are performed upon batches of data 2755.1, 2755.2, and 2755.3, respectively, having selected batch sizes 2705.1, 2705.2, and 2705.3, respectively. The first version of the predictive model 2810 can be generated as predictive model 2810.4 of FIG. 28F based on the measured memory utilization 2738.1, 2738.2, and 2738.3, and the corresponding set of batch sizes 2705.1, 2705.2, and 2705.3, for example, due to the predictive model being a linear regression model, and/or due to a minimum size of three being imposed for utilization of an input dataset 2815 to generate a predictive model 2810.

The pre-model batch size selection function 2850 can be operable to select different, conservative batch sizes for the first iterations of the conversion process prior to generation of the predictive model 2810. For example, the set of batch sizes 2705.1, 2705.2, and 2705.3 are selected as different batch sizes to ensure that a trend can be identified. Alternatively or in addition, the set of batch sizes 2705.1, 2705.2, and 2705.3 are selected as small batch sizes, such as batch sizes less than 10% of memory availability 2832, such as batch sizes between 3% and 5% of memory availability 2832, to be conservative in batch sizing as no trend has been established ensure that a failure condition is not induced. As a particular example, the pre-model batch size selection function 2850 is implemented as a random and/or pseudo-random function that selects the batch size, for example, within a fixed window of small batch sizes. For example, the pre-model batch size selection function 2850 selects each batch size 2705 as a random percentage of memory availability 2832 that is a randomly selected percentage between 3% and 5%, for example, in accordance with a uniform distribution. Another random and/or deterministic pre-model batch size selection function 2850 can be implemented in other embodiments to establish the input dataset 2815 and/or to ensure no failure conditions are induced prior to the predictive model being available.

A predictive model initialization module 2822 can generate the first version of the predictive model 2810 from the corresponding initial input dataset of measured memory utilization 2738.1, 2738.2, and 2738.3, and the corresponding set of batch sizes 2705.1, 2705.2, and 2705.3. The predictive model initialization module 2822 can be implemented in a same or similar fashion as the predictive model update module 2820.

In some embodiments, a plurality of different datasets can be stored in the database system 10. For example, the plurality of different datasets correspond to different database tables, records from different sources, records having different schemas and/or different datatypes, etc., are processed into different respective segments and/or otherwise correspond to distinct datasets. For example, a set of L datasets are generated from the L record streams of FIG. 25C.

In such embodiments, a given conversion process can be performed upon only data of a given dataset, for example, to cluster data from the same dataset from respective pages into segments for storage and use in query execution. Different schemas, datatypes, data value distributions that affect clustering, etc. of different datasets can induce differences in memory utilization during corresponding conversions into converted data 2765.

To account for these differences, different predictive models 2810 can be generated for different datasets stored in the database system 10. This can include collecting and utilizing different input datasets 2815 for each given dataset. For example, when L datasets are stored via the database system, a corresponding set of different predictive models 2810.1-2810.L are generated and updated over time. Conversion from data format A to data format B is performed for a given dataset based on a batch size selected via a corresponding predictive model 2810 of this set of different predictive models 2810.1-2810.L, which are each iteratively updated as illustrated in FIGS. 28C-28F as additional data of the given dataset undergoes subsequent conversion processes.

FIG. 28G illustrates a method for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28G. Some or all of the method of FIG. 28G can be performed by a record processing and storage system 2505. For example, some or all of the method of FIG. 28G can be performed by the page generator 2511, the page storage system 2506, the segment generator 2517, and/or the segment storage system 2508 of FIG. 25A. Some or all of the method of FIG. 28G can be performed by one or more stream loader modules 2510 of FIG. 25B, independently or in conjunction. Some or all of the method of FIG. 28G can be performed by the page conversion determination module 2610, the cluster key-based grouping module 2620, the columnar rotation module 2630, and/or the metadata generator module 2640 of FIG. 26A. Some or all of the method of FIG. 28G can be performed via the batch size determination module 2710, the data format conversion module 2720, and/or the conversion-based memory utilization measurement module 2740 of FIGS. 27A-27B. Some or all of the method of FIG. 28G can be performed via the batch size selection module 2830 and/or the predictive model update module 2820 of FIGS. 28A-28F. Some or all of the steps of FIG. 28G can optionally be performed by any other processing module of the database system 10.

Some or all of the steps of FIG. 28G can be performed to implement some or all of the functionality of the batch size determination module 2710, the data format conversion module 2720, and/or the conversion-based memory utilization measurement module 2740 of FIGS. 27A-28F. Some or all of the steps of FIG. 28G can be performed to implement some or all of the functionality of the record processing and storage system 2505 of FIG. 25A and/or FIG. 25B. Some or all of the steps of FIG. 28G can be performed to implement some or all of the functionality of the segment generator 2517 of FIG. 26A. Some or all steps of FIG. 26D can be performed by database system 10 in accordance with other embodiments of the database system 10 and/or nodes 37 discussed herein. Some or all of the steps of FIG. 28G can be performed in conjunction with performing some or all steps of FIG. 26D, FIG. 27D, and/or any other method described herein. Some or all of the steps of FIG. 28G can be performed automatically, without human intervention.

Step 2882 includes generating a predictive model mapping batch size to estimated memory utilization. In various embodiments, the predictive model is generated based on a plurality of prior batch sizes applied for performing a corresponding plurality of prior data format conversions. In various embodiments, the predictive model is generated further based on a plurality of prior actual memory utilization occurring in performing the corresponding plurality of prior data format conversions.

Step 2884 includes automatically selecting a next batch size for performance of a subsequent data format conversion based on the predictive model and a current memory availability. Step 2886 includes identifying a batch of data for performance of the subsequent data format conversion based on the batch of data having the next batch size. Step 2888 includes performing the subsequent data format conversion upon the batch of data. Step 2890 includes determining an actual amount of memory utilized in performing the subsequent data format conversion. Step 2892 includes updating the predictive model based on the next batch size and the actual amount of memory utilized.

In various embodiments, the predictive model is a linear regression model generated based on a plurality of prior points. In various embodiments, each of the plurality of prior points includes one of the plurality of prior batch sizes and a corresponding one of the plurality of prior actual memory utilization.

In various embodiments, performing the subsequent data format conversion includes generating a plurality of segments from a plurality of pages included in the batch of data. In various embodiments, the plurality of pages are selected a proper subset of a full set of pages awaiting conversion into segments based on the full set of pages awaiting conversion having a collective size exceeding the next batch size. In various embodiments, the plurality of pages correspond to all of a set of pages awaiting conversion into segments, where the method further includes determining to perform the conversion of the full set of pages in a page storage system into segments based on an accumulation of pages in the page storage system over time being determined to reach a size corresponding to the next batch size.

In various embodiments the next batch size indicates a number of bytes, where the plurality of pages is selected for inclusion in the batch of data based on collectively including an amount of data that is exactly equal to the number of bytes, that is substantially equal to the number of bytes, and/or that is different from the number of bytes by no more than a predetermined threshold amount. In various embodiments, the next batch size indicates a number of pages, where the plurality of pages is selected for inclusion in the batch of data based on including exactly the number of pages.

In various embodiments, generating plurality of segments includes: segregating a plurality of records included in the plurality of pages into a plurality of record groups in accordance with a cluster key of the plurality of records; generating a set of column-formatted record data for each of the plurality of record groups; generating segment metadata for each column-formatted record data; and/or generating a plurality of segment groups that includes the plurality of segments. In various embodiments, each segment group includes a set of segments generated from a corresponding set of column-formatted record data, and wherein each segment in a segment group includes one column-formatted record data from the corresponding set of column-formatted record data and further includes segment metadata generated for the one column-formatted record data.

In various embodiments, a first page of the plurality of pages includes a first record and a second record, and/or a second page of the plurality of pages includes a third record and a fourth record. In various embodiments, a first segment of plurality of segments includes the first record and the third record, and/or a second segment of the plurality of segments includes the second record and the fourth record.

In various embodiments, the method includes selecting each of the plurality of prior batch sizes. In various embodiments, the method further includes performing each of the corresponding plurality of prior data format conversions upon corresponding batches of data having a corresponding one of the plurality of prior batch sizes. In various embodiments, the method further includes determining each of the plurality of prior actual memory utilization based on performing each of the corresponding plurality of prior data format conversions.

In various embodiments, selecting the plurality of prior batch sizes includes, for each of a first subset of the corresponding plurality of prior data format conversions in a temporal ordering of the corresponding plurality of prior data format conversions, selecting the corresponding one of the plurality of prior batch sizes as a random batch size randomly selected from a predetermined window of batch sizes. In various embodiments, selecting the plurality of prior batch sizes includes, for each of a remaining subset of the corresponding plurality of prior data format conversions in the temporal ordering of the corresponding plurality of prior data format conversions, selecting the corresponding one of the plurality of prior batch sizes based on the current memory availability and a corresponding version of the predictive model.

In various embodiments, the predetermined window of batch sizes has a maximum batch size corresponding to an amount of data that is less than ten percent of total memory availability. In various embodiments, the first subset of the corresponding plurality of prior data format conversions includes only a first three data format conversions of the corresponding plurality of prior data format conversions.

In various embodiments, an initial version of the predictive model is generated based on random batch sizes of the first subset of the corresponding plurality of prior data format conversions, and/or further based on corresponding prior actual memory utilization occurring in performing the first subset of the corresponding plurality of prior data format conversions. In various embodiments, one of the plurality of prior batch sizes is selected for a first data format conversion in a temporal ordering of the remaining subset of the corresponding plurality of prior data format conversions based on applying the initial version of the predictive model. In various embodiments, a first updated version of the predictive model is generated based on the one of the plurality of prior batch sizes and a measured amount of memory utilized in performing the first data format conversion in the temporal ordering of the remaining subset of the corresponding plurality of prior data format conversions.

In various embodiments, other ones of the plurality of prior batch sizes are selected for each subsequent data format conversion in the temporal ordering of the remaining subset of the corresponding plurality of prior data format conversions based on applying a most recently updated version of the predictive model. In various embodiments, each subsequently updated version of the predictive model is generated based on each other one of the plurality of prior batch sizes and each corresponding measured amount of memory utilized in performing the each corresponding one of the remaining subset of the corresponding plurality of prior data format conversions. In various embodiments, a final subsequently updated version of the predictive model generated after performing all of the remaining subset of the corresponding plurality of prior data format conversions is utilized to automatically select the next batch size for performance of the subsequent data format conversion.

In various embodiments, the corresponding plurality of prior data format conversions includes more than a predetermined threshold number of data format conversions. In various embodiments, each subsequently updated version of the predictive model is generated to reflect only a most recent set of data format conversions from the corresponding plurality of prior data format conversions that includes no greater than the predetermined threshold number of data format conversions.

In various embodiments, the method includes generating model error data based on measuring at least one difference between at least one of the plurality of prior actual memory utilization and at least one corresponding estimated memory utilization mapped to the corresponding one of the plurality of prior batch sizes utilized in performing the corresponding one of the corresponding plurality of prior data format conversions.

In various embodiments, the method includes selecting a buffer based on the model error data, where the next batch size is further selected based on the buffer. In various embodiments, the buffer is selected as an increasing function of an amount of error indicated in the model error data. In various embodiments, the buffer is selected as an increasing function of distance from some or all prior batch sizes in the dataset.

In various embodiments, the actual amount of memory utilized in performing the subsequent data format conversion corresponds to use of a huge page memory, a heap memory, and/or at least one other type of memory. In various embodiments, the plurality of prior actual memory utilization corresponds to corresponds to use of the huge page memory, the heap memory, and/or the at least one other type of memory. In various embodiments, the current memory availability corresponds to memory availability of the huge page memory, the heap memory, and/or the at least one other type of memory.

In various embodiments, the method further includes after updating the predictive model: selecting another next batch size for performance of another subsequent data format conversion based on the updated predictive model and the current memory availability; identifying another batch of data for performance of the another subsequent data format conversion based on the another batch of data having the another next batch size; performing the another subsequent data format conversion upon the another batch of data; determining another actual amount of memory utilized in performing the another subsequent data format conversion; and/or further updating the predictive model based on the another next batch size and the another actual amount of memory utilized.

In various embodiments, the current memory availability utilized to select the another next batch size is the same as and/or unchanged from the current memory availability utilized to select the next batch size. In various embodiments, the current memory availability utilized to select the another next batch size is the different from and/or changed from the current memory availability utilized to select the next batch size as an updated current memory availability from the prior current memory availability utilized to select the next batch size. In various embodiments, the another next batch size is greater than the next batch size based on the updated current memory availability being greater than the prior current memory availability. In various embodiments, the another next batch size is less than the next batch size based on the updated current memory availability being less than the prior current memory availability.

In various embodiments, a slope of a linear function indicated by the updated predictive model changes from that of the predictive model, for example, based on the value of the actual amount of memory utilized determined in step 2890. In various embodiments, a magnitude of the difference between the another next batch size and the next batch size is an increasing function of a change in slope of the linear function in the updated predictive model from that of the predictive model.

In various embodiments, the another next batch size is greater than the next batch size based on a positive slope of the linear function decreasing. In various embodiments, the another next batch size is greater than the next batch size, despite the updated current memory availability being less than the prior current memory availability, based on a positive slope of the linear function decreasing. In various embodiments, the another next batch size is less than the next batch size, despite a positive slope of the linear function decreasing, based on a magnitude by which the updated current memory availability is less than the prior current memory availability.

In various embodiments, the another next batch size is less than the next batch size based on a positive slope of the linear function increasing. In various embodiments, the another next batch size is less than the next batch size, despite the updated current memory availability being greater than the prior current memory availability, based on a positive slope of the linear function increasing. In various embodiments, the another next batch size is greater than the next batch size, despite a positive slope of the linear function increasing, based on a magnitude by which the updated current memory availability is greater than the prior current memory availability.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a record processing and storage system includes at least one processor and a memory that stores operational instructions. The operational instructions, when executed by the at least one processor, can cause the record processing and storage system to: generate a predictive model mapping batch size to estimated memory utilization based on a plurality of prior batch sizes applied for performing a corresponding plurality of prior data format conversions, and further based on a plurality of prior actual memory utilization occurring in performing the corresponding plurality of prior data format conversions; automatically select a next batch size for performance of a subsequent data format conversion based on the predictive model and a current memory availability; identify a batch of data for performance of the subsequent data format conversion based on the batch of data having the next batch size; perform the subsequent data format conversion upon the batch of data; determine an actual amount of memory utilized in performing the subsequent data format conversion; and/or update the predictive model based on the next batch size and the actual amount of memory utilized.

FIGS. 29A-29G illustrate embodiments of a batch size determination module 2710 that selects batch sizes 2705 based on applying a buffer interval 2918. Some or all features and/or functionality of FIGS. 29A-29G can implement the record processing and storage system 2505 of FIG. 27C and/or the database system 10 of FIGS. 27A and/or 27B.

FIG. 29A illustrates an example of a selected batch size 2705-x selected based on the corresponding estimated memory utilization 2848-x mapped to this batch size 2705-x via mapping function F having a non-zero buffer 2915 with memory availability 2832. For example, the selection of batch size 2705-x based on a non-zero buffer 2915 applied to the mapping function F can be utilized to implement the batch size selection module 2830 of FIGS. 28A-28F and/or can be utilized to implement the batch size determination module 2710 of FIGS. 27A-27C. The mapping function F of FIG. 29A can be implemented as and/or based on a corresponding predictive model 2810 as discussed in conjunction with FIGS. 28A-28F.

Selecting a given batch size 2705-x as batch size 2705.i for a given conversion process such that corresponding estimated memory utilization 2848-x mapped to this batch size 2705-x has this non-zero buffer 2915 with memory availability 2832 can be useful in accounting for uncertainty in the corresponding model, as the estimated memory utilization 2848 mapped to a given batch size is not guaranteed to match the actual memory utilization that will ensure if the conversion process is performed upon a batch of data having this given batch size. The non-zero buffer 2915 can be applied to help ensure that possible deviation in the actual memory utilization from the estimated memory utilization due to error in the model's generation of predictions will not render the actual memory utilization exceeding the memory availability 2832 to prevent the inducing of failure conditions during the conversion process.

FIG. 29B illustrates an embodiment of a batch size selection module 2830 of batch size determination module that selects batch size 2705.i for a given ith conversion process based on a buffer interval 2918. Some or all features and/or functionality of the batch size selection module 2830 of FIG. 29B can implement the batch size selection module of 28A and/or any other embodiment of the batch size selection module 2830 described herein. Some or all features and/or functionality of the buffer interval 2918 of FIG. 29B can induce the buffer 2915 of the example of FIG. 29A.

The buffer interval 2918 can be applied to the mapping function F, and can be characterized via a buffer interval upper bound 2928 that is a function G of batch size 2705. This buffer interval upper bound 2928 can be greater than or equal to the estimated memory utilization 2848 for any given batch size, where G(batch size 2705) is greater than or equal to F(batch size 2705). The selected batch size 2705.i for a given ith conversion process can have a selected value as batch size 2705-x based on G(batch size 2705) being equal to the memory availability 2832.

For example, in the illustration of FIG. 29A, the batch size 2705-x is selected G(batch size 2705-x)=F(batch size 2705-x)+buffer 2915. This can be based on a constant buffer being applied, where G(batch size 2705)=F(batch size 2705)+2915. Alternatively, a non-constant buffer is applied, where the buffer 2915 applied for another batch size 2705-x2 is less than or greater than the buffer 2915 applied to batch size 2705-x.

FIG. 29C depicts an example buffer interval 2918.i applied for an ith conversion process. Some or all features and/or functionality of the buffer interval 2918 of FIG. 29C and/or the corresponding relationship between buffer interval 2918 and the selection of a given batch size 2705-x for a corresponding conversion process can implement the buffer interval 2918 of FIG. 29B and/or any selection of batch size 2705 via batch size determination module 2710 described herein.

In particular, as illustrated in FIG. 29C, a given batch size 2705-x can be selected based on the batch size 2705-x at the location of an intersection 2925 between memory availability 2832 and the buffer interval upper bound 2928. Changes in memory availability and/or buffer interval upperbound over time can thus induce changes in the batch size selection 2705-x.

As illustrated in FIG. 29C, the buffer interval 2918 can be applied as a non-constant buffer 2915 applied to the mapping function that is thus different for different batch sizes 2705. In other embodiments, the buffer interval 2918 is constant for any batch size x, for example, where the buffer interval upper bound is a linear function of batch size 2705 parallel with the linear mapping function F.

A buffer interval lower bound 2926 optionally mirrors the buffer interval upper bound 2928 with respect to the mapping function F to induce same buffer from any given batch size value above or below the corresponding estimated memory utilization for this given batch value. Alternatively, as illustrated in FIG. 29C, the buffer interval lower bound 2926 does not mirror the buffer interval upper bound 2928, where a different buffer from at least one batch size value is induced above and below the corresponding estimated memory utilization for this given batch value. While illustrated, the buffer interval lower bound 2926 is optionally not determined based on not being relevant in selecting batch size, where the buffer interval is characterized only by the buffer interval upper bound 2928.

In some embodiments, if the buffer interval upper bound 2928 exceeds the current memory availability 2832 at all positive values, the batch size selection module 2830 can default to again applying the pre-model batch size selection function 2850 utilized to initialize the model, for example, where randomly selected small percentage of available memory is selected as the batch size 2705.

FIG. 29D depicts an example of a different buffer interval 2918 generated for another conversion process, such as the subsequent i+1th conversion process following the ith conversion process of FIG. 29C. In particular, based on the predictive model 2810 being updated and/or the error and/or uncertainty associated with the predictive model 2810 being determined to change accordingly, a new buffer interval 2918.i+1 can be generated, for example, where the new upper bound 2928i+1. is a function $G_{i+1}$ of batch size 2705 that is different from the function $G_i$ of batch size 2705 characterizing the upper bound 2928.$i$ of FIG. 29C. This can induce a different buffer 2915.$x_{i+1}$ characterizing a different magnitude of difference between the memory availability 2832.$i$+1 and the estimated memory utilization 2848-$x_{i+1}$.

The buffer interval upper bound 2928.$i$+1 can change from buffer interval upper bound 2928.$i$ based on changes in: the mapping function F, and/or uncertainty and/or error of the mapping function F.

The mapping function $F_{i+1}$ can be the same as or different from mapping function $F_1$. The buffer interval upper bound 2928.$i$+1 can change from buffer interval upper bound 2928.$i$ based on the change in mapping function $F_{i+1}$ from mapping function $F_1$. The buffer interval upper bound 2928.$i$+1 can optionally change from buffer interval upper bound 2928.$i$ regardless of the change from mapping function $F_1$ to mapping function $F_{i+1}$, for example, induced by a corresponding change in uncertainty and/or error of mapping function $F_{i+1}$ from that of mapping function $F_i$.

The change in buffer interval upper bound 2928.$i$+1 from buffer interval upper bound 2928.$i$ can induce selection of a different selected batch size 2705-$x_{i+1}$ that is less than or greater than selected batch size 2705-$x_1$. This change can also be induced by a change in memory availability 2832.$i$. In particular, the location of intersection 2925 can change based on a change in buffer interval upper bound 2928, a change in memory availability 2832 or both. In some cases, a same batch size is selected based on a location of the intersection not changing.

The memory availability 2832.$i$+1 can be the same as or different from memory availability 2832.$i$. The magnitude of buffer 2915-$x_{i+1}$ optionally changes from that of buffer 2915-$x_i$ based on a change from memory availability 2832.$i$ to 2832.$i$+1. The magnitude of buffer 2915-$x_{i+1}$ optionally changes from that of buffer 2915-$x_i$ despite memory availability 2832 not changing due to changes in other factors. The value of selected batch size 2705-$x_{i+1}$ is optionally less than or greater than the value of selected batch size 2705-$x_{i+1}$ based on the change in memory availability inducing a different x-value of intersection point with the buffer interval upper bound 2928.$i$+1. The value of selected batch size 2705-$x_{i+1}$ is optionally less than or greater than the value of selected batch size 2705-$x_{i+1}$ despite memory availability not changing due to changes in other factors, such as the change in buffer interval upper bound 2928 inducing the change in the x-value of the intersection point 2925.

The magnitude of buffer 2915-$x_{i+1}$ can increase or decrease from the magnitude of buffer 2915-$x_{i+1}$ based on: a change in buffer interval upper bound 2928.$i$+1 from buffer interval upper bound 2928.$i$; a change in mapping function F; and/or a change in memory availability 2832. This magnitude can change even if the value of batch size 2705-$x_{i+1}$ is the same as that of batch size 2705-$x_{i+1}$1. In some cases, the magnitude of buffer 2915 does not change.

FIG. 29E illustrates an embodiment of a batch size determination module 2710 that selects batch size 2705.$i$ for a given ith conversion process based on having generated an updated buffer interval 2918.$i$ via a buffer interval update module 2920 based on the most recent predictive model 2810.$i$ and based on the input dataset 2815 utilized to generate this most recent predictive model 2810. Some or all features and/or functionality of the batch size determination module 2710 of FIG. 29E can implement the batch size determination module 2710 of 28C and/or 29B and/or any other embodiment of the batch size determination module 2710 described herein. Some or all features and/or functionality of the batch size determination module 2710 of FIG. 29E can implement the updating of buffer interval 2918 from buffer interval 2918.$i$ applied for an ith conversion process and a buffer interval 2918.$i$+1 applied for an i+1th conversion process conversion illustrated in FIGS. 29D and 29E.

The buffer interval 2918.$i$ for a given predictive model 2810.$i$ can be generated based on uncertainty and/or error in the predictive model 2810.$i$. For example, greater model uncertainty and/or error can render wider buffer intervals 2918 that can induce larger buffers 2915 and/or smaller selected batch sizes 2705 accordingly, and batch sizes 2705 are thus selected more conservatively to account for this greater model uncertainty and/or error. Meanwhile, smaller model uncertainty and/or error can render narrower buffer intervals 2918 that can induce smaller buffers 2915 and/or smaller selected batch sizes 2705 accordingly, and batch sizes 2705 are thus selected less conservatively due to the model having lower uncertainty and/or error. This can be ideal to account for changes in the system causing the model to become less accurate, rendering selection of lower batch sizes while the model recalibrates to prevent failure conditions.

This error and/or uncertainty can be quantified based on comparing one or more measured memory utilizations 2738 for given batch sizes in the input dataset 2815 to estimated memory utilizations 2848 mapped to these given batch sizes by the predictive model 2810. For example, greater deviations are indicative of greater model error and/or uncertainty, while smaller deviations are indicative of lower model error and/or uncertainty. These deviations can be characterized via a mean-squared error (MSE) computation applied to the given predictive model 2810 and given input dataset 2815 utilized to generate the predictive model 2810, or other characterization of error and/or uncertainty. This can be ideal to ensure the batch size is selected as large as possible when the model is performing well to improve efficiency in converting data and/or to induce more optimal clustering.

Alternatively or in addition, the buffer interval 2918.$i$ for a given predictive model 2810.$i$ can be generated based on distance from prior batch sizes represented in the input dataset 2815. In particular, the width of buffer interval 2918.$i$ can be an increasing function of this distance from prior batch sizes. For example, this distance from prior batch sizes can quantify uncertainty in the predictive model, as bigger differences in batch size may induce less predictable results based on not yet having been utilized and/or not being utilized often, while smaller differences in batch size may induce more predictable results based on being more similar to batch sizes previously utilized and/or having been utilized often. This can be ideal in automatically inducing greater caution via larger buffers the further the extrapolation from prior batch sizes.

This distance can be measured based on a distance from the average batch size of the input dataset 2815, a distance from the closest batch size in input dataset 2815, and/or a function of distance some or all batch sizes of input dataset 2815, for example, utilized in a weighted average weighted based on recency where more recently used batch sizes have respective distances weighted more heavily. As a particular example, this distance can be expressed as a first expression divided by a second expression, where the first expression is the square of a given batch size 2705 minus the empirical mean batch size of the input dataset 2815, and where the second expression is a summation over n values corresponding to a set of n batch sizes input dataset 2815, each value corresponding to the square of a given batch size 2705 in the input dataset 2815 minus this empirical mean batch size.

FIG. 29F illustrates an embodiment where a given buffer interval 2918.*i* is generated as the prediction interval 2938, or only the upper bound of the prediction interval, for the given predictive model 2810.*i*. The prediction interval can be generated based on prediction interval parameter data 2957, which can indicate a corresponding predetermined percentage 2955 and/or other parameters. The predetermined percentage 2955 can be fixed and/or can change over time. The predetermined percentage 2955 can be stored and/or accessed in memory accessible by the batch size determination module 2710, can be received, can be determined based on an instruction or command, can be configured via user input, and/or can be selected automatically.

The predetermined percentage 2955 can be sufficiently high as to ensure a corresponding large percentage of actual memory utilization measured for a given selected batch size is expected and/or guaranteed to fall below the buffer interval upper bound, and thus fall below the memory availability 2832 as the selected batch size is selected as the batch size where memory availability 2832 and buffer interval upper bound 2928 intersect as discussed in conjunction with FIGS. 29B-29D. For example, the predetermined percentage 2955 is selected as 90% and/or is greater than 90%. As another example, the predetermined percentage 2955 is selected as 95% and/or is greater than 95%. As another example, the predetermined percentage 2955 is selected as 99% and/or is greater than 99%.

Implementing the buffer interval as the prediction interval can be ideal in accounting for both error of the model as well as extrapolation distance in setting buffer size, inherently setting buffer sizes as an increasing function of model error and as an increasing function of extrapolation distance. Furthermore, the prediction interval as introduces favorable dynamics for the transition from the initial small random batch sizes to larger model-based batch size, where batch size increases over time with an appropriate buffer that accounts for this extrapolation. This can improve the technology of database systems by automatically encoding more caution in selection of buffer size to account for greater error in the model and/or greater extrapolation from prior batch sizes utilized to generate the model while enabling the batch size to increase over time. Thus, greater efficiency can be achieved via selection of larger and larger batch sizes, with appropriate corresponding caution imposed to ensure that failure conditions do not occur despite the selection of these larger batch sizes.

FIG. 29G illustrates an example prediction interval 2938 that is generated based on the mapping function F. For example, for the prediction interval 2938 is characterized for any given batch size 2705-*h* to be based on applying a buffer to the estimated memory utilization 2848-*h* mapped to this given batch size 2705-*h* via the mapping function F. This given buffer can be applied equivalently to generate respective buffer interval upper bound 2928 and buffer interval lower bound 2926. The magnitude of this buffer can be based on a product between a first expression, encoding the desired confidence based on the predetermined percentage 2955 and a second expression, which can be the square root of the product of the mean-squared error (MSE), or other metric for how well the model fits the data, with a summation of 1, 1/n, and a third expression. The value of n can be N or the number of values in the input dataset utilized to generate the given mapping function. The third expression can express how close the batch size 2705-*h* is to other batch sizes in the input dataset 2815, which can encode greater caution the farther that the given batch size extrapolates from prior batch sizes. This third expression can correspond to a fourth expression divided by a fifth expression. The fourth expression can indicate the square of the given batch size 2705-*h* minus the empirical mean batch size of the input dataset 2815. The fifth expression can be a summation over n values, each corresponding to the square of a given batch size 2705 in the input dataset 2815 minus this empirical mean batch size.

Implementing the prediction interval 2938 to provide buffer in selecting batch sizes can be favorable as it leaves some margin of error which incorporates multiple factors in a statistically sound way. In particular, the prediction interval 2938 reflects relevant information in determining this buffer such as: how many data points are included in the input dataset 2815, how closely the model fits the data, how far a given batch size is extrapolating from the points present in the data set, and/or the desired probability that the next point, corresponding the measured memory utilization 2848 for the next selected batch size in the next conversion process, lies within the buffer interval 2918.

In other embodiments, the buffer interval is generated as and/or based on a confidence interval or a tolerance interval generated for the mapping function F to characterize uncertainty and/or error of the mapping function F, and/or any other buffer applied to mapping function F.

FIG. 29H illustrates a method for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29H. Some or all of the method of FIG. 29H can be performed by a record processing and storage system 2505. For example, some or all of the method of FIG. 29H can be performed by the page generator 2511, the page storage system 2506, the segment generator 2517, and/or the segment storage system 2508 of FIG. 25A. Some or all of the method of FIG. 29H can be performed by one or more stream loader modules 2510 of FIG. 25B, independently or in conjunction. Some or all of the method of FIG. 29H can be performed by the page conversion determination module 2610, the cluster key-based grouping module 2620, the columnar rotation module 2630, and/or the metadata generator module 2640 of FIG. 26A Some or all of the method of FIG. 28G can be performed via the batch size determination module 2710, the data format conversion module 2720, and/or the conversion-based memory utilization measurement module 2740 of FIGS. 27A-27B. Some or all of the method of FIG. 29H can be performed via the batch size selection module 2830 and/or the buffer interval update module 2920 and of FIGS. 29A-29G. Some or all of the steps of FIG. 29H can optionally be performed by any other processing module of the database system 10.

Some or all of the steps of FIG. 29H can be performed to implement some or all of the functionality of the batch size determination module 2710, the data format conversion module 2720, and/or the conversion-based memory utilization measurement module 2740 of FIGS. 27A-29G. Some or all of the steps of FIG. 29H can be performed to implement some or all of the functionality of the conversion batch size determination module 2710 of FIG. 27A. Some or all of the steps of FIG. 29H can be performed to implement some or all of the functionality of the record processing and storage system 2505 of FIG. 25A and/or FIG. 25B. Some or all of the steps of FIG. 29H can be performed to implement some or all of the functionality of the segment generator 2517 of FIG. 26A. Some or all steps of FIG. 26D can be performed by database system 10 in accordance with other embodiments of the database system 10 and/or nodes 37 discussed herein. Some or all of the steps of FIG. 29H can be performed in conjunction with performing some or all steps of FIG. 26D, FIG. 27D, FIG. 28G, and/or any other method described herein. Some or all of the steps of FIG. 29H can be performed automatically, without human intervention.

Step 2982 includes automatically determining a buffer interval for a mapping function of batch size to estimated memory utilization. Step 2984 includes automatically selecting a first batch size for performance of a first data format conversion based a first intersection between an upper bound of the buffer interval and a current memory availability. Step 2986 includes performing the first data format conversion upon a first batch of data having the first batch size. Step 2988 includes automatically updating the buffer interval based on a difference between an actual amount of memory utilized in performing the first data format conversion and an estimated memory utilization mapped to the first batch size via the mapping function. Step 2990 includes automatically selecting a second batch size for performance of the second data format conversion based a second intersection between an upper bound of the updated buffer interval and the current memory availability. Step 2992 includes performing the second data format conversion upon a second batch of data having the second batch size.

In various embodiments, the mapping function is a predictive model. In various embodiments, the method further includes updating the predictive model based on the actual amount of memory utilized in performing the first data format conversion. In various embodiments, the updated buffer interval is updated for the updated predictive model. In various embodiments, the mapping function is a linear function of a linear regression model. In various embodiments, the buffer interval is a non-constant function applied to the mapping function. In various embodiments, the buffer interval is a linear function applied to the mapping function. In various embodiments, the buffer interval is a non-linear function applied to the mapping function.

In various embodiments, automatically determining the buffer interval is based on determining an error metric for the mapping function based on differences between estimated memory utilization mapped to previously selected batch sizes via the mapping function and actual memory utilization induced when converting prior batches of the corresponding previously selected batch sizes. In various embodiments, determining error metric for the mapping function includes generating a mean-squared error (MSE) for the estimated memory utilization mapped to previously selected batch sizes via the mapping function and actual memory utilization induced when converting prior batches of the corresponding previously selected batch sizes.

In various embodiments, the mapping function is generated based on a plurality of prior points. In various embodiments, each of the plurality of prior points includes one of a plurality of prior batch sizes and a corresponding one of a plurality of prior actual memory utilization for a plurality of previously performed data format conversions. In various embodiments, the buffer interval is generated as a prediction interval based on the plurality of prior points and the mapping function. In various embodiments, the buffer interval is generated as a confidence interval based on the plurality of prior points and the mapping function. In various embodiments, the buffer interval is generated as a tolerance interval based on the plurality of prior points and the mapping function.

In various embodiments, buffer interval is generated based on quantifying uncertainty. In various embodiments, the buffer interval is generated to include, for each of a plurality of batch sizes, a predetermined percentage of subsequently measured actual memory utilization for data format conversions performed upon corresponding batches of data having the each of the plurality of batch sizes. In various embodiments, the predetermined percentage is 90%, 95%, 99%, or another percentage, for example that is greater than or equal to 90%, that is greater than or equal to 95%, and/or that is greater than or equal to 99%.

In various embodiments, performing the first data format conversion includes generating a plurality of segments from a plurality of pages included in the first batch of data. In various embodiments, generating plurality of segments includes: segregating a plurality of records included in the plurality of pages into a plurality of record groups in accordance with a cluster key of the plurality of records; generating a set of column-formatted record data for each of the plurality of record groups; generating segment metadata for each column-formatted record data; and/or generating a plurality of segment groups that includes the plurality of segments. In various embodiments, each segment group includes a set of segments generated from a corresponding set of column-formatted record data. In various embodiments, each segment in a segment group includes one column-formatted record data from the corresponding set of column-formatted record data and further includes segment metadata generated for the one column-formatted record data.

In various embodiments, a first page of the plurality of pages includes a first record and a second record, and/or a second page of the plurality of pages includes a third record and a fourth record. In various embodiments, a first segment of plurality of segments includes the first record and the third record, and/or a second segment of the plurality of segments includes the second record and the fourth record.

In various embodiments, the actual amount of memory utilized in performing the first data format conversion corresponds to use of a huge page memory, a heap memory, and/or at least one other type of memory. In various embodiments, the plurality of prior actual memory utilization corresponds to corresponds to use of the huge page memory, the heap memory, and/or the at least one other type of memory. In various embodiments, the current memory availability corresponds to memory availability of the at least one of: the huge page memory, the heap memory, and/or the at least one other type of memory.

In various embodiments, a size of the buffer interval increases based on encountering a failure in performing the first data format conversion upon the first batch of data having the first batch size due to the actual amount of memory utilized exceeding the current memory availability.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a record processing and storage system includes at least one processor and a memory that stores operational instructions. The operational instructions, when executed by the at least one processor, can cause the record processing and storage system to: automatically determine a buffer interval for a mapping function of batch size to estimated memory utilization; automatically select a first batch size for performance of a first data format conversion based a first intersection between an upper bound of the buffer interval and a current memory availability; perform the first data format conversion upon a first batch of data having the first batch size; automatically update the buffer interval based on a difference between an actual amount of memory utilized in performing the first data format conversion and an estimated memory utilization mapped to the first batch size via the mapping function; automatically select a second batch size for performance of the second data format conversion based a second intersection between an upper bound of the updated buffer interval and the current memory availability; and/or perform the second data format conversion upon a second batch of data having the second batch size.

FIGS. 30A-30F illustrate embodiments of a batch size determination module 2710 that selects batch sizes 2705 based on applying multiple predictive models 2810 corresponding to multiple types of memory resources. Some or all features and/or functionality of FIGS. 30A-30F can implement the record processing and storage system 2505 of FIG. 27C and/or the database system 10 of FIGS. 27A and/or 27B.

FIG. 30A illustrates an embodiment of a batch size determination module 2710 that implements batch size selection module 2830 to select batch size 2705.$i$ for a given ith conversion process based on two predictive models 2810.A and 2810.B of a memory type-based model set 3012. Some or all features and/or functionality of the batch size selection module 2830 of the batch size determination module 2710 of FIG. 30A can be utilized to implement the batch size selection module 2830 of FIG. 28A, and/or any other embodiment of the batch size determination module 2710 described herein.

Predictive model 2810.A implements a first function F.A mapping batch sizes to estimated memory utilization 2848.A of memory type 3015.A. Predictive model 2810.B implements a second function F.A mapping batch sizes to estimated memory utilization 2848.B of memory type 3015.B. The memory availability 2832.A for memory type 3015.A and memory availability 2832.B for memory 3015.B can be received, measured, estimated, or otherwise determined, and can be the same or different over time for different iterations of the conversion process as discussed previously with respect to the memory availability 2832.

FIG. 30B illustrates an embodiment of a data format conversion module that implements two different memory types 3015.A and 3015.B to generate given converted data 2765.$i$ from a batch of data 2755.$i$. For example, portions of these two different memory types could and/or are guaranteed to be utilized when generating converted data 2765, and fully utilizing and/or attempting to utilizing more than the full amount of available memory resources 2735 of either memory type 3015 could render a failure condition as discussed previously. Thus to avoid a failure condition, the batch size is ideally selected such that as much memory resources of both memory types 3015 are consumed as possible, while guaranteeing that neither memory type 3015 is overloaded.

As a particular example, the memory type 3015.A is implemented as a heap memory type, where the memory resources 2735.A implement a heap memory utilized when generating the converted data 2765.$i$ from the batch of data 2755.$i$. Alternatively or in addition, as another particular example, the memory type 3015.B is implemented as a huge page memory type, where the where the memory resources 2735BA implement a huge page memory of one or more huge pages utilized when generating the converted data 2765.$i$ from the batch of data 2755.$i$. The memory types 3015.A and 3015.B can correspond to any two distinct memory types 3015, for example, each having their own distinct memory resources 2735.A and 2735.Bf for use when performing conversion processes.

The conversion-based memory utilization measurement module 2740 can generate a memory-type based memory utilization set 3014.$i$ for the given conversion process, indicating measured memory utilization data 2738.A.$i$ for memory type 3015.A and further indicating measured memory utilization data 2738.B.$i$ for memory type 3015.B. For example, measured memory utilization data 2738.A.$i$ is generated based on memory utilization data 2736.A.$i$ measuring utilization of memory resources 2735.A during the conversion process, where measured memory utilization data 2738.A.$i$ indicates a peak memory utilization of memory resources 2735.A during the conversion process. Similarly, measured memory utilization data 2738.B.$i$ can be generated based on memory utilization data 2736.B.$i$ measuring separate utilization of memory resources 2735.B during the conversion process, where measured memory utilization data 2738.B.$i$ indicates a peak memory utilization of memory resources 2735.B during the conversion process.

In some embodiments, the number of different memory types 3015 of memory resources 2735 utilized when performing conversion processes via the format A to format B conversion module 2730 includes more than two memory types 3015. In such embodiments, more than two corresponding predictive models 2810 and more than two corresponding memory availability 2832 can be utilized to select batch size 2705 via the batch size selection module 2830.

FIG. 30C illustrates an embodiment of a batch size selection module 2830 of a batch size determination module 2710 that selects batch size 2705 based on a memory type-based model set 3012 that includes a set of m predictive models 2810.1-2810.$m$, where m is greater than or equal to two. Some or all features and/or functionality of the batch size selection module 2830 of FIG. 30C can be utilized to implement the batch size selection module 2830 of FIG. 30A and/or any other embodiment of batch size selection module 2830 and/or batch size determination module 2710 described herein.

The batch size selection module 2830 can be operable to select the batch size 2705.$i$ for a given conversion process as a minimum batch size over a plurality of possible batch sizes 2705.A.$i$-2705.$m$.$i$ corresponding to the plurality of memory types. This can include implementing a minimum batch size selection module 3031 that outputs the selected batch size 2705.$i$ as minimum batch size over the given plurality of possible batch sizes 2705.A.$i$-2705.$m$.$i$.

For example, each of the possible batch sizes 2705.A.$i$-2705.$m$.$i$ corresponds to the maximum safe batch size determined for the corresponding memory type and/or otherwise corresponds to a batch size that is guaranteed and/or expected to not overload the memory resources 2735 of the corresponding memory type 3015. Thus, in selecting the minimum batch size of this set of batch sizes each selected to not overload the corresponding memory resource, this minimum batch size 2705 thus is thus guaranteed and/or expected to not overload any memory resources 2735 of any corresponding memory types 3015.

Identification of each of the possible batch sizes 2705.A.$i$-2705.$m$.$i$ can be achieved via a set of batch size selection modules 2830.A-2830.$m$ that identify the corresponding batch sizes 2705.$k$.$i$ for a given memory type 3015.$k$ of the set of memory types 3015.A-3015.$m$ based on memory availability 2832.*k* of the given memory type 3015.*k* and based on the predictive model 2810.*k* for the given memory type 3015*k*. For example, some or all batch sizes 2705.*k*.i for some or all given memory types 3015.*k* are selected via some or all functionality of the batch size selection module 2830 discussed in conjunction with some or all of FIGS. 28A-29H.

In particular, each of the possible batch sizes 2705.A.i-2705.*m*.i can be selected as a batch size mapped to an estimated memory utilization 2848 via the corresponding predictive model 2810 of the set of predictive models 2810.A-2810.*m* that is less than or equal to the corresponding memory availability 2832 of the set of memory availabilities 2832.A-2832.*m*, for example where the selection of batch size illustrated in FIGS. 28A and 28B corresponds to selection of one possible batch size 2705.*k*.i via the predictive model 2810.*k* and the memory availability 2832.*k* of the corresponding memory type 3015. The ultimately selected batch size for the conversion process is either this batch size 2705.*k*.i if this batch size is the minimum over all possible batch sizes identified for all memory types, or is another possible batch size 2705 selected for another memory type 3015 that is less than this batch size 2705.*k*.i, based on this other possible batch size being the minimum over all possible batch sizes for all memory types.

FIG. 30D illustrates an embodiment of a predictive model update module 2820 of a batch size determination module 2710 that updates each of a set of predictive models 2810.A.i-2810.*m*.i based on a corresponding input dataset 2815 of a set of input datasets 2815.A.i-2815.*m*.i. Some or all features and/or functionality of the predictive model update module 2820 of FIG. 30F can implement the predictive model update module 2820 of FIG. 28C and/or any other embodiment of the predictive model update module 2820 and/or the batch size determination module 2710 described herein.

Each input datasets 2815 of the set of input datasets 2815.A.i-2815.*m*.i can include a set of N pairings of measured memory utilization 2738 of the corresponding memory type 3015 to batch sizes 2705 of a set of N prior conversion processes, which is used to train or otherwise generate the corresponding predictive model 2810 for the corresponding memory type 3015. For example, the measured memory utilization 2738 of a given input datasets 2815 for a given memory type 3015 is generated by and/or received from the conversion-based memory utilization measurement model 2740 of FIG. 30B based on memory utilization data 2736 of memory resources 2735 of the corresponding memory type 3015.

The number of pairings N can be the same or different for some or all different input datasets 2815 of the set of input datasets 2815.A.i-2815.*m*.i. The number of pairings N for a some or all different input datasets 2815.A.i-2815.*m*.i can be fixed to maintain only the most recent N pairings for use in generating the corresponding predictive model 2810.

Some or all predictive models 2810.*k*.i for some or all given memory types 3015.*k* can be generated from a corresponding input dataset 2815.*k*.i via some or all functionality of the predictive model update module 2820 discussed in conjunction with some or all of FIGS. 28A-29H. In particular, some or all predictive models 2810.A.i-2810.*m*.i can be generated by performing a linear regression or other training function upon the corresponding input dataset 2815.

For example, the predictive model 2810.*i* of FIGS. 28C and/or 28D can correspond to one of the set of predictive models 2810.A.i-2810.*m*.i for a corresponding memory type 3015, where some or all other ones of the set of predictive models 2810.A.i-2810.*m*.i for other memory types 3015 are generated in a same or similar fashion. The updating of a predictive model 2810 overtime as illustrated in FIG. 28F can correspond to updating of one of the set of predictive models 2810.A.i-2810.*m*.i for a corresponding memory type 3015, where some or all other ones of the set of predictive models 2810.A.i-2810.*m*.i for other memory types 3015 are updated in a same or similar fashion as predictive models 2810.A.i+1-2810.*m*.i+1. The initializing of a predictive model 2810 via multiple conversion processes utilizing batch sizes selected via a pre-model batch size selection function 2850 of FIG. 28G can correspond to initializing of one of the set of predictive models 2810.A-2810.*m* for a corresponding memory type 3015, where some or all other ones of the set of predictive models 2810.A-2810.*m* for other memory types 3015 are initialized in a same or similar fashion.

FIG. 30E illustrates an embodiment of a batch size selection module 2830 of a batch size determination module 2710 that selects batch size 2705 based on a memory type-based buffer interval set 3013 that includes a set of m buffer intervals 2918.1-2918.*m*, where m is greater than or equal to two. Some or all features and/or functionality of the batch size selection module 2830 of FIG. 30E can be utilized to implement the batch size selection module 2830 of FIGS. 30A and/or 30C, and/or any other embodiment of batch size selection module 2830 and/or batch size determination module 2710 described herein.

The batch size selection module 2830 can be operable to select the batch size 2705.*i* for a given conversion process as a minimum batch size over a plurality of possible batch sizes 2705.A.i-2705.*m*.i corresponding to the plurality of memory types, for example via the minimum batch size selection module 3031, as discussed in conjunction with FIG. 30C.

Identification of each of the possible batch sizes 2705.A.i-2705.*m*.i can be achieved via a set of batch size selection modules 2830.A-2830.*m* that identify the corresponding batch sizes 2705.*k*.i for a given memory type 3015.*k* of the set of memory types 3015.A-3015.*m* based on memory availability 2832.*k* of the given memory type 3015.*k* and based on the buffer interval 2918.*k* for the given memory type 3015*k*. For example, some or all batch sizes 2705.*k*.i for some or all given memory types 3015.*k* are selected via some or all functionality of the batch size selection module 2830 discussed in conjunction with some or all of FIGS. 29A-29H.

In particular, each of the possible batch sizes 2705.A.i-2705.*m*.i can be selected as a batch size at an intersection between the buffer interval upper bound 2928 of the given buffer interval 2918 of the corresponding memory type 3015 and the memory availability 2832 of the corresponding memory type, for example where the selection of batch size illustrated in FIGS. 29B and/or 29C corresponds to selection of one possible batch size 2705.*k*.i via the buffer interval 2918.*k* and the memory availability 2832.*k* of the corresponding memory type 3015. The ultimately selected batch size for the conversion process is either this batch size 2705.*k*.i if this batch size is the minimum over all possible batch sizes identified for all memory types, or is another possible batch size 2705 selected for another memory type 3015 that is less than this batch size 2705.*k*.i, based on this other possible batch size being the minimum over all possible batch sizes for all memory types.

Different buffer intervals 2918.1-2918.*m* can be implemented based on applying the same or different measures of uncertainty and/or error to the corresponding predictive model 2810 for the given memory type 3015. As a particular example, some or all buffer intervals 2918.1-2918.*m* can optionally be implemented as prediction intervals 2938 for the corresponding predictive model 2810 for the corresponding memory type 3015, for example, where the prediction interval of FIG. 29G corresponds to selection of one possible batch size 2705.*k*.i via the prediction interval 2938.*k* and the memory availability 2832.*k* of the corresponding memory type 3015. Different prediction intervals 2938 applied to different predictive models 2810 for memory types 3015 can be implemented via the same or different predetermined percentage 2955.

FIG. 30F illustrates an embodiment of a buffer interval update module 2920 of a batch size determination module 2710 that updates each of a set of buffer intervals 2918.A.i-2918.*m*.i based on a corresponding input dataset 2815 of a set of input datasets 2815.A.i-2815.*m*.i. Some or all features and/or functionality of the buffer interval update module 2920 of FIG. 30F can implement the buffer model update module 2820 of FIGS. 29E and/or 29F and/or any other embodiment of the buffer interval model update module 2920 and/or the batch size determination module 2710 described herein.

A set of predictive models 2810.Ai-2810.*m*.i can be generated via the predictive update module 2820 based on the set of corresponding set of input datasets 2815.A.i-2815.*m*.i as discussed in conjunction with FIG. 30D. Some or all buffer intervals 2918.*k*.i for some or all given memory types 3015.*k* can be generated from a corresponding input dataset 2815.*k*.i and corresponding predictive model 2810.*k*.i via some or all functionality of the buffer interval update module 2920 discussed in conjunction with some or all of FIGS. 29A-29H. In particular, some or all buffer intervals 2918.A.i-2918.*m*.i can be generated by characterizing error and/or uncertainty of the corresponding predictive model 2810 based on how well the corresponding input dataset 2815 fits the corresponding predictive model 2810.

For example, the buffer interval 2918.*i* of FIGS. 29E and/or 29F can correspond to one of the set of buffer intervals 2918.A.i-2918.*m*.i for a corresponding memory type 3015, where some or all other ones of the set of buffer intervals 2918.A.i-2918.*m*.i for other memory types 3015 are generated in a same or similar fashion. The updating of a buffer interval 2918 over time as illustrated in FIGS. 29C and 29D F can correspond to updating of one of the set of buffer intervals 2918.A.i-2918.*m*.i for a corresponding memory type 3015, where some or all other ones of the set of buffer intervals 2918.A.i-2918.*m*.i for other memory types 3015 are updated in a same or similar fashion as set of buffer intervals 2918.A.i-2918.*m*.i.

As discussed previously, different datasets stored in the database system further have their own predictive models 2810 and/or corresponding buffer intervals 2918 generated and updated over time to account for differences in different schemas, datatypes, data value distribution inducing different amount of memory consumption during clustering, etc. In some embodiments, some or all different datasets, such as a set of L datasets, can further each have their own set of multiple predictive models 2810.A-2810.*m* and/or corresponding set of multiple buffer intervals 2918.A-2918.*m* for the set of m memory types 3015.1-3015.*m* generated and updated over time. Same or different sets of memory resources 2735 corresponding to same or different sets of m memory types of the same or different number m can be utilized in conversion processes for different datasets converted and stored in the database system, where same or different numbers of 2810.A-2810.*m* and/or corresponding set of multiple buffer intervals 2918.A-2918.*m* corresponding to same or different memory types 3015 are optionally generated for different datasets.

FIGS. 30G-30H illustrates an example embodiment of a set of six consecutive batch size selections for a corresponding set of six consecutive conversion processes over times $t_1$-$t_6$ that utilize memory resources 2735 of two memory types 3015.A and 3015.B implemented as a huge page memory and heap memory, respectively, of a corresponding format A to format B conversion module that is operable to generate each converted data 2735 as a set of segments generated from a corresponding set of pages 2515 of a corresponding batch of data 2755. Some or all features and/or functionality of the selection of some or all batch sizes and corresponding conversion processes illustrated in FIGS. 30F-30G can implement any embodiment of the batch size determination module 2710 and/or data format conversion module 2720 of FIGS. 27A and 27B, the and/or record processing and storage system 2505 of FIG. 27C, and/or any embodiment of the batch size determination module 2710, data format conversion module 2720, record processing and storage system 2505, and/or database system 10 described herein.

As illustrated in the example of FIGS. 30G and 30H, for a first conversion process at time $t_1$, batch size 2705.1 is selected as 2.8 GiB. This can be based on applying a pre-model batch size selection function 2850, for example, where a small, randomly selected percentage is applied to memory availability 2832.A.1 of the huge page memory and/or memory availability 2832.B.1 of the heap memory. For example, batch size 2705.1 is selected based on selecting a minimum batch size between two possible batch sizes based on the memory availability 2832.A.1 and the memory availability 2832.B.1, respectively. Converted data 2765.1 can be generated based on performing a first conversion process upon a corresponding batch of data 2755.1 having this batch size 2705.1. In performing this first conversion process, measured memory utilization 2738.A.1 of huge page memory is determined to be 7.8 GiB and measured memory utilization 2738.B.1 of heap memory is determined to be 7.4 GiB.

As further illustrated in the example of FIGS. 30G and 30H, for a second conversion process at time $t_2$, batch size 2705.2 is selected as 1.7 GiB. This can be based on applying the pre-model batch size selection function 2850, for example, where a small, randomly selected percentage is applied to memory availability 2832.A.2 of the huge page memory and/or memory availability 2832.B.2 of the heap memory, and/or where batch size 2705.2 is selected to be different from batch size 2705.1. For example, batch size 2705.2 is selected based on selecting a minimum batch size between two possible batch sizes identified based on the memory availability 2832.A.2 and the memory availability 2832.B.2, respectively. Converted data 2765.2 can be generated based on performing a conversion process upon a corresponding batch of data 2755.2 having this batch size 2705.2. In performing this second conversion process, measured memory utilization 2738.A.2 of huge page memory is determined to be 8.1 GiB and measured memory utilization 2738.B.2 of heap memory is determined to be 7.2 GiB.

As further illustrated in the example of FIGS. 30G and 30H, for a third conversion process at time $t_3$, batch size 2705.3 is selected as 2.8 GiB. This can be based on applying the pre-model batch size selection function 2850, for example, where a small, randomly selected percentage is applied to memory availability 2832.A3 of the huge page memory and/or memory availability 2832.B.3 of the heap memory. For example, batch size 2705.3 is selected based on selecting a minimum batch size between two possible batch sizes identified based on the memory availability 2832.A.3 and the memory availability 2832.B.3, respectively. Converted data 2765.3 can be generated based on performing a conversion process upon a corresponding batch of data 2755.3 having this batch size 2705.3. In performing this second conversion process, measured memory utilization 2738.A.3 of huge page memory is determined to be 8.6 GiB and measured memory utilization 2738.B.2 of heap memory is determined to be 7.3 GiB.

As further illustrated in the example of FIGS. 30G and 30H, for a fourth conversion process at time $t_4$, predictive model 2810.A.4 and 2810.B.4 are determined, for example, as mapping functions generated by applying a linear regression or other regression and/or training function to the set of batch sizes 2705.1-2705.3 and corresponding measured memory utilization 2738.A.1-2738.A.3 to generate predictive model 2810.A.4, and/or by applying a linear regression or other regression and/or training function to the set of batch sizes 2705.1-2705.3 and corresponding measured memory utilization 2738.B.1-2738.B.3 to generate predictive model 2810.B.4.

Corresponding buffer interval upper bounds 2928.A.4 and 2928.B.4 are also determined for these predictive models 2810.A.4 and 2810.B.4. For example, buffer interval upper bounds 2928.A.4 and 2928.B.4 are implemented as the upper bounds of corresponding prediction intervals 2938, where a first prediction interval applied to the predictive models 2810.A.4 is generated based on the predictive models 2810.A.4 and based on the set of batch sizes 2705.1-2705.3 and corresponding measured memory utilization 2738.A.1-2738.A.3 utilized to generate predictive model 2810.A.4, and/or where a second prediction interval applied to the predictive models 2810.B.4 is generated based on the predictive models 2810.B.4 and based on the set of batch sizes 2705.1-2705.3 and corresponding measured memory utilization 2738.B.1-2738.B.3 utilized to generate predictive model 2810.B.4.

Based on the predictive model 2810.A.4 and 2810.B.4 and/or based on the buffer interval upper bounds 2928.A.4 and 2928.B.4, batch size 2705.4 for the fourth conversion process at time $t_4$, is selected as 9.8 GiB. For example, 9.8 GiB is selected based on being the batch size at the intersection between predictive model 2810.A.4 and buffer interval upper bounds 2928.A.4, and based on this batch size being smaller than that of the batch size at the intersection between predictive model 2810.B.4 and buffer interval upper bounds 2928.B.4. Converted data 2765.4 can be generated based on performing a conversion process upon a corresponding batch of data 2755.4 having this batch size 2705.4. In performing this fourth conversion process, measured memory utilization 2738.A.4 of huge page memory is determined to be 14.5 GiB and measured memory utilization 2738.B.4 of heap memory is determined to be 7.3 GiB.

As further illustrated in the example of FIGS. 30G and 30H, for a fifth conversion process at time $t_5$, predictive models 2810.A.5 and 2810.B.5 are generated to update the prior predictive models 2810.A.4 and 2810.B.4, for example, as mapping functions generated by applying a linear regression or other regression and/or training function to the set of batch sizes 2705.1-2705.4 and corresponding measured memory utilization 2738.A.1-2738.A.4 to generate predictive model 2810.A.5, and/or by applying a linear regression or other regression and/or training function to the set of batch sizes 2705.1-2705.4 and corresponding measured memory utilization 2738.B.1-2738.B.4 to generate predictive model 2810.B.5.

Corresponding buffer interval upper bounds 2928.A.5 and 2928.B.5 are also determined for these predictive models 2810.A.5 and 2810.B.5 to update the prior buffer interval upper bounds 2928.A.4 and 2928.B.4. For example, buffer interval upper bounds 2928.A.5 and 2928.B.5 are implemented as the upper bounds of corresponding prediction intervals 2938, where a first prediction interval applied to the predictive models 2810.A.5 is generated based on the predictive models 2810.A.5 and based on the set of batch sizes 2705.1-2705.4 and corresponding measured memory utilization 2738.A.1-2738.A.4 utilized to generate predictive model 2810.A.5, and/or where a second prediction interval applied to the predictive models 2810.B.5 is generated based on the predictive models 2810.B.5 and based on the set of batch sizes 2705.1-2705.4 and corresponding measured memory utilization 2738.B.1-2738.B.4 utilized to generate predictive model 2810.B.5.

Based on the predictive model 2810.A.5 and 2810.B.5 and/or based on the buffer interval upper bounds 2928.A.5 and 2928.B.5, batch size 2705.5 for the fifth conversion process at time $t_5$, is selected as 100.4 GiB. For example, 100.4 GiB is selected based on being the batch size at the intersection between predictive model 2810.A.5 and buffer interval upper bounds 2928.A.5, and based on this batch size being smaller than that of the batch size at the intersection between predictive model 2810.B.5 and buffer interval upper bounds 2928.B.5. Converted data 2765.5 can be generated based on performing a conversion process upon a corresponding batch of data 2755.5 having this batch size 2705.5. In performing this fifth conversion process, measured memory utilization 2738.A.5 of huge page memory is determined to be 109.2 GiB and measured memory utilization 2738.B.4 of heap memory is determined to be 10.9 GiB.

As further illustrated in the example of FIGS. 30G and 30H, for a sixth conversion process at time $t_6$, predictive models 2810.A.6 and 2810.B.6 are generated to update the prior predictive models 2810.A.5 and 2810.B.5, for example, as mapping functions generated by applying a linear regression or other regression and/or training function to the set of batch sizes 2705.1-2705.5 and corresponding measured memory utilization 2738.A.1-2738.A.5 to generate predictive model 2810.A.6, and/or by applying a linear regression or other regression and/or training function to the set of batch sizes 2705.1-2705.5 and corresponding measured memory utilization 2738.B.1-2738.B.5 to generate predictive model 2810.B.6.

Corresponding buffer interval upper bounds 2928.A.6 and 2928.B.6 are also determined for these predictive models 2810.A.6 and 2810.B.6 to update the prior buffer interval upper bounds 2928.A.5 and 2928.B.5. For example, buffer interval upper bounds 2928.A.6 and 2928.B.6 are implemented as the upper bounds of corresponding prediction intervals 2938, where a first prediction interval applied to the predictive models 2810.A.6 is generated based on the predictive models 2810.A.6 and based on the set of batch sizes 2705.1-2705.5 and corresponding measured memory utilization 2738.A.1-2738.A.5 utilized to generate predictive model 2810.A.6, and/or where a second prediction interval applied to the predictive models 2810.B.5 is generated based on the predictive models 2810.B.6 and based on the set of batch sizes 2705.1-2705.5 and corresponding measured memory utilization 2738.B.1-2738.B.5 utilized to generate predictive model 2810.B.6.

Based on the predictive model 2810.A.6 and 2810.B.6 and/or based on the buffer interval upper bounds 2928.A.6 and 2928.B.6, batch size 2705.6 for the sixth conversion process at time $t_6$, is selected as 189.1 GiB. For example, 189.1 GiB is selected based on being the batch size at the intersection between predictive model 2810.A.6 and buffer interval upper bounds 2928.A.6, and based on this batch size being smaller than that of the batch size at the intersection between predictive model 2810.B.6 and buffer interval upper bounds 2928.B.6. Converted data 2765.6 can be generated based on performing a conversion process upon a corresponding batch of data 2755.6 having this batch size 2705.6.

While FIGS. 30G-30H only illustrate the first six conversion processes, many subsequent conversion processes, such as dozens, hundreds, and/or thousands of subsequent conversion processes, can be performed via similar functionality of batch size selection and/or similar functionality in updating predictive models 2810.A and 2810.B and/or corresponding buffer interval upper bounds 2928.A and 2928.B over time.

This example illustrates how the functionality of the batch size determination module 2710 can guides the system through a controlled exploration of progressively larger batch sizes. In particular, as illustrated in this example, batch size increases over time as the model is updated over time based on more prior information being applied, and as the corresponding buffer interval is tighter with the model over time based on the model's performance improving and/or corresponding uncertainty and/or error decreasing, for example, due to the size of the input dataset increasing and/or the measured memory utilization in subsequent conversions being closer to the model's prediction for the corresponding batch size.

In some embodiments, for a later conversion after this first six set of conversions, the measured memory usage of one or both memory types varies greatly from the model's prediction for the corresponding batch size. For example, for this later conversion, the model selected a batch size that rendered unexpected measured memory usage that significantly higher or lower than the estimated memory utilization 2848 mapped to the given batch size, for example, due to unexpected changes not anticipated by the model, such as unanticipated change in state of one or more computing devices, nodes, and/or processing core resources of the data format conversion module. This variation in memory usage may result in an error, or may still fall within the bounds of what the current memory availability of the given memory type can handle.

In either case, the drastic variation from the model's prediction can increase the uncertainty and/or error determined for the model, where the model's buffer interval widens accordingly, and/or where the model itself also updates more noticeably based on the new corresponding datapoint of the input dataset being more offset from the prior model. Thus, in the event that the chosen batch size uses more memory than predicted, both the prediction of the model at that point and the overall error of the model will increase, raising the upper bound of the prediction interval and inducing selection of a smaller size next time. In particular, this widening of the buffer interval and/or shift in the model itself can induce a corresponding backoff in batch size selected for one or more subsequent conversion processes, for example, due to a corresponding increase in slope of the buffer interval upper bound.

These more conservative selections of smaller batch sizes help ensure that failure conditions do not occur in these subsequent conversion processes to account for the introduction of the unexpected changes in memory utilization. As the model performance again improves over time, where error and/or uncertainty in the model decreases, for example, based on the model appropriately updating to account for this state change having induced the prior unexpected measured memory usage, the buffer interval can again tighten over time accordingly to again render selection of larger batch sizes, for example, due to a to a corresponding decrease in slope of the buffer interval upper bound.

In this example, all possible pairings of prior batch sizes 2705 to prior measured memory utilization 2738 is utilized to generate each subsequent predictive model 2810 and corresponding buffer interval 2918 for both huge page memory and heap memory, for example, based on the maximum size N of input datasets 2815.A and 2815.B being greater than or equal to 6. In later iterations of the generation of predictive model 2810 and corresponding buffer interval 2918, least recent pairings can be dropped from usage in corresponding input datasets 2815.A and 2815.B once their size reaches the maximum size N.

In this example, the first iteration of predictive model 2810 and corresponding buffer interval 2918 are generated for huge page memory and heap memory once three prior conversions are performed and corresponding pairings for input datasets 2815.A and 2815.B are collected. In other embodiments, a larger or smaller number of prior conversions are performed to render a larger or smaller number of pairings for input datasets 2815.A and 2815.B in generating the first predictive model 2810 and corresponding buffer interval 2918.

In this example, only two predictive models and corresponding buffer intervals are updated and utilized based on use of two types of memory. In other embodiments, more than two types of memory are consumed during conversion processes, and more than two predictive models and corresponding buffer intervals are updated and utilized based on use of this more than two types of memory. In other embodiments, a set of one or more memory types includes other types of memory instead of or in addition to the heap memory and/or the huge page memory that are consumed during conversion processes, where predictive models and corresponding buffer intervals are generated for these other types of memory based on measured use of these other types of memory in prior conversion processes.

In some embodiments, if a given conversion process results in a detected failure condition, the batch size selection module 2830 can default to again applying the pre-model batch size selection function 2850 utilized to initialize the model, for example, where randomly selected small percentage of available memory is selected as the batch size 2705. In some cases, the model can be reinitialized due to the failure condition occurring via the set of three, or other number, of uses of small batch sizes selected via pre-model batch size selection function 2850 to reinitialize the model, where all prior pairings of input dataset collected in conversions prior to this failure are optionally no longer utilized in generating some or all subsequent prediction models 2810.

FIG. 30I illustrates a method for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30I. Some or all of the method of FIG. 30I can be performed by a record processing and storage system 2505. For example, some or all of the method of FIG. 30I can be performed by the page generator 2511, the page storage system 2506, the segment generator 2517, and/or the segment storage system 2508 of FIG. 25A. Some or all of the method of FIG. 30I can be performed by one or more stream loader modules 2510 of FIG. 25B, independently or in conjunction. Some or all of the method of FIG. 30I can be performed by the page conversion determination module 2610, the cluster key-based grouping module 2620, the columnar rotation module 2630, and/or the metadata generator module 2640 of FIG. 26A. Some or all of the method of FIG. 30I can be performed via the batch size determination module 2710, the data format conversion module 2720, and/or the conversion-based memory utilization measurement module 2740 of FIGS. 27A-27B. Some or all of the method of FIG. 30I can be performed via utilization of one or more memory resources 2735 of one or more memory types. Some or all of the method of FIG. 30I can be performed via batch size selection modules 2830.1-2830.$m$, the minimum batch size selection module 3031, the predictive model update module 2820, and/or the buffer interval update module 2920 of FIGS. 30A-30H. Some or all of the steps of FIG. 30I can optionally be performed by any other processing module of the database system 10.

Some or all of the steps of FIG. 30I can be performed to implement some or all of the functionality of the batch size determination module 2710, the data format conversion module 2720, and/or the conversion-based memory utilization measurement module 2740 of FIGS. 27A-30H. Some or all of the steps of FIG. 30I can be performed to implement some or all of the functionality of the conversion batch size determination module 2710 of FIG. 27A. Some or all of the steps of FIG. 30I can be performed to implement some or all of the functionality of the record processing and storage system 2505 of FIG. 25A and/or FIG. 25B. Some or all of the steps of FIG. 30I can be performed to implement some or all of the functionality of the segment generator 2517 of FIG. 26A. Some or all steps of FIG. 26D can be performed by database system 10 in accordance with other embodiments of the database system 10 and/or nodes 37 discussed herein. Some or all of the steps of FIG. 30I can be performed in conjunction with performing some or all steps of FIG. 26D, FIG. 27D, FIG. 28G, FIG. 29H, and/or any other method described herein. Some or all of the steps of FIG. 30I can be performed automatically, without human intervention.

Step 3082 includes generating a first mapping function of batch size to estimated memory utilization of a first memory type. Step 3084 includes generating a second mapping function of batch size to estimated memory utilization of a second memory type. Step 3086 includes automatically selecting a first batch size for performance of a first data format conversion. Step 3088 includes performing the first data format conversion upon a first batch of data having the first batch size.

In various embodiments, automatically selecting the first batch size for performance of a first data format conversion in step 3086 can be based on the first mapping function and the second mapping function generated in steps 3082 and 3084, respectively. In various embodiments, performing step 3086 can include performing steps 3088, 3090, and/or 3092. Step 3088 includes determining a first maximum batch size based on the first mapping function and current memory availability of the first memory type. Step 3090 includes determining a second maximum batch size based on the second mapping function and current memory availability of the second memory type. Step 3092 includes selecting the first batch size as the minimum of the first maximum batch size and the second maximum batch size.

In various embodiments, the method further includes determining an actual amount of memory utilization of the first memory type in performing the first data format conversion. In various embodiments, the method further includes updating the first mapping function based on the actual amount of memory utilization of the first memory type and the first batch size. In various embodiments, the method further includes determining an actual amount of memory utilization of the second memory type in performing the second data format conversion. In various embodiments, the method further includes updating the second mapping function based on the actual amount of memory utilization of the second memory type and the first batch size.

In various embodiments, the method further includes automatically selecting a second batch size for performance of a second data format conversion after updating the first mapping function and the second mapping function. Automatically selecting the second batch size for performance of the second data format conversion can be based on: determining another first maximum batch size based on the updated first mapping function and current memory availability of the first memory type; determining another second maximum batch size based on the updated second mapping function and current memory availability of the second memory type; and/or selecting the second batch size as the minimum of the another first maximum batch size and the another second maximum batch size. In various embodiments, the method further includes performing the second data format conversion upon a second batch of data having the second batch size.

In various embodiments, the method further includes automatically determining a first buffer interval for the first mapping function. In various embodiments, the method further includes automatically determining a second buffer interval for the second mapping function. In various embodiments, the first maximum batch size is determined based on a first intersection between an upper bound of the first buffer interval and the current memory availability of the first memory type. In various embodiments, the second maximum batch size is determined based on a second intersection between an upper bound of the second buffer interval and the current memory availability of the second memory type.

In various embodiments, the method further includes automatically updating the first buffer interval based on a difference between an actual amount of utilization of the second memory type in performing the first data format conversion and an estimated memory utilization mapped to the first batch size via the first mapping function. In various embodiments, the method further includes automatically updating the second buffer interval based on a difference between an actual amount of utilization of the second memory type in performing the first data format conversion and an estimated memory utilization mapped to the first batch size via the second mapping function.

In various embodiments, the first mapping function is a first predictive model, and/or the second mapping function is a second predictive model. In various embodiments, the first predictive model and/or the second predictive model are linear regression models.

In various embodiments, performing the first data format conversion includes generating a plurality of segments from a plurality of pages included in the first batch of data. In various embodiments, generating plurality of segments includes: segregating a plurality of records included in the plurality of pages into a plurality of record groups in accordance with a cluster key of the plurality of records; generating a set of column-formatted record data for each of the plurality of record groups; generating segment metadata for each column-formatted record data; and/or generating a plurality of segment groups that includes the plurality of segments. In various embodiments, each segment group includes a set of segments generated from a corresponding set of column-formatted record data. In various embodiments, each segment in a segment group includes one column-formatted record data from the corresponding set of column-formatted record data and further includes segment metadata generated for the one column-formatted record data.

In various embodiments, a first page of the plurality of pages includes a first record and a second record, and/or a second page of the plurality of pages includes a third record and a fourth record. In various embodiments, a first segment of plurality of segments includes the first record and the third record, and/or a second segment of the plurality of segments includes the second record and the fourth record.

In various embodiments, the first memory type is different from the second memory type. In various embodiments, the first memory type is implemented via a first set of memory devices and the second memory type is implemented via a second set of memory devices that are distinct from the first set of memory devices. In various embodiments, the first memory type is implemented via a first set of memory locations and the second memory type is implemented via a second set of memory locations that are distinct from the first set of memory locations. In various embodiments, the first memory type corresponds to a huge page memory, and the second memory type corresponds to a heap memory.

In various embodiments, the method further includes generating each of a set of additional mapping functions of batch size to estimated memory utilization of a corresponding memory type of a set of one or more additional memory types distinct from the first memory type and the second memory type. In various embodiments, automatically selecting the first batch size for performance of a first data format conversion is further based on determining each of a set of one or more additional maximum batch sizes based on a corresponding one of the set of additional mapping functions and based on a current memory availability of a corresponding one of the set of one or more additional memory types. In various embodiments, automatically selecting the first batch size for performance of a first data format conversion is further based on selecting the first batch size as the minimum of a plurality of three or more maximum batch sizes that includes the first maximum batch size, the second maximum batch size, and each of the set of one or more additional maximum batch sizes.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a record processing and storage system includes at least one processor and a memory that stores operational instructions. The operational instructions, when executed by the at least one processor, can cause the record processing and storage system to: generate a first mapping function of batch size to estimated memory utilization of a first memory type; generate a second mapping function of a batch size to estimated memory utilization of a second memory type; automatically select a first batch size for performance of a first data format conversion; and/or perform the first data format conversion upon a first batch of data having the first batch size. The operational instructions, when executed by the at least one processor, can further cause the record processing and storage system to automatically select a first batch size for performance of the first data format conversion based on: determining a first maximum batch size based on the first mapping function and current memory availability of the first memory type; determining a second maximum batch size based on the second mapping function and current memory availability of the second memory type; and/or selecting the first batch size as the minimum of the first maximum batch size and the second maximum batch size.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
obtaining, by a set of loader nodes of a plurality of loader nodes of a parallelized data input sub-system of a database system, a dataset for storage within the database system;
determining, by the set of loader nodes, a memory usage type for the dataset;
obtaining, by the set of loader nodes, an adaptive batch size prediction model in accordance with the memory usage type, wherein the adaptive batch size prediction model includes a set of data points and a buffer interval surrounding the set of data points, wherein a data point of the set of data points includes a batch size x-component and a memory usage y-component, and wherein the memory usage y-component is an estimated amount of memory of the set of loader nodes required to convert data at a particular batch size from a first data format to a second data format;

plotting, by the set of loader nodes, a current amount of memory availability of the set of loader nodes on the adaptive batch size prediction model;

when the adaptive batch size prediction model is at a desired maturity level, identifying, by the set of loader nodes, an intersection between an upper bound of the buffer interval and the current amount of memory availability of the set of loader nodes to determine an initial batch size;

converting, by the set of loader nodes, a first batch of data of the dataset having the initial batch size from the first data format to the second data format;

determining, by the set of loader nodes, an actual amount of memory utilized in converting the first batch of data; and updating, by the set of loader nodes, the adaptive batch size prediction model based on a difference between the actual amount of memory utilized and the current amount of memory availability associated with the initial batch size to produce an updated adaptive batch size prediction model.

2. The method of claim 1, wherein the adaptive batch size prediction model has the desired maturity level when the set of data points includes a desired number of data points.

3. The method of claim 1, wherein when the adaptive batch size prediction model is not at the desired maturity level: randomly selecting, by the set of loader nodes, the initial batch size from a default list of allowed batch sizes, wherein the allowed batch sizes correspond to small percentages of available memory of the set of loader nodes.

4. The method of claim 1 further comprises:
determining, by the set of loader nodes, that the upper bound of the buffer interval exceeds the current amount of memory availability of the set of loader nodes; and
randomly selecting, by the set of loader nodes, the initial batch size from a default list of allowed batch sizes, wherein the allowed batch sizes correspond to small percentages of available memory of the set of loader nodes.

5. A parallelized data input sub-system of a database system, the parallelized data input sub-system comprises:
a plurality of loader nodes, wherein a loader node of the plurality of loader nodes includes a plurality of processing core resources, wherein a processing core resource of the plurality of processing core resources includes: a processing module, memory, and a memory interface operably coupling the memory and the processing module, and wherein a set of loader nodes of the plurality of loader nodes is operable to:
obtain a dataset for storage within the database system;
determine a memory usage type for the dataset;
obtain an adaptive batch size prediction model in accordance with the memory usage type, wherein the adaptive batch size prediction model includes a set of data points and a buffer interval surrounding the set of data points, wherein a data point of the set of data points includes a batch size x-component and a memory usage y-component, and wherein the memory usage y-component is an estimated amount of memory of the set of loader nodes required to convert data at a particular batch size from a first data format to a second data format;

plot a current amount of memory availability of the set of loader nodes on the adaptive batch size prediction model;

when the adaptive batch size prediction model is at a desired maturity level, identify an intersection between an upper bound of the buffer interval and the current amount of memory availability of the set of loader nodes to determine an initial batch size;

convert a first batch of data of the dataset having the initial batch size from the first data format to the second data format;

determine an actual amount of memory utilized in converting the first batch of data; and update the adaptive batch size prediction model based on a difference between the actual amount of memory utilized and the current amount of memory availability associated with the initial batch size to produce an updated adaptive batch size prediction model.

6. The parallelized data input sub-system of claim 5, wherein the adaptive batch size prediction model has the desired maturity level when the set of data points includes a desired number of data points.

7. The parallelized data input sub-system of claim 5, wherein when the adaptive batch size prediction model is not at the desired maturity level, the set of loader nodes are operable to:
randomly select the initial batch size from a default list of allowed batch sizes, wherein the allowed batch sizes correspond to small percentages of available memory of the set of loader nodes.

8. The parallelized data input sub-system of claim 5, wherein the set of loader nodes is further operable to:
determine that the upper bound of the buffer interval exceeds the current amount of memory availability of the set of loader nodes; and
randomly select the initial batch size from a default list of allowed batch sizes, wherein the allowed batch sizes correspond to small percentages of available memory of the set of loader nodes.

9. A non-transitory computer readable storage medium comprises:
a first memory section that stores operational instructions that, when executed by a set of loader nodes of a plurality of loader nodes of a parallelized data input sub-system of a database system, causes the set of loader nodes to:
obtain a dataset for storage within the database system;
determine a memory usage type for the dataset;
obtain an adaptive batch size prediction model in accordance with the memory usage type, wherein the adaptive batch size prediction model includes a set of data points and a buffer interval surrounding the set of data points, wherein a data point of the set of data points includes a batch size x-component and a memory usage y-component, and wherein the memory usage y-component is an estimated amount of memory of the set of loader nodes required to convert data at a particular batch size from a first data format to a second data format;

plot a current amount of memory availability of the set of loader nodes on the adaptive batch size prediction model;

when the adaptive batch size prediction model is at a desired maturity level, identify an intersection between an upper bound of the buffer interval and the current amount of memory availability of the set of loader nodes to determine an initial batch size;

convert a first batch of data of the dataset having the initial batch size from the first data format to the second data format;

determine an actual amount of memory utilized in converting the first batch of data; and update the adaptive batch size prediction model based on a difference between the actual amount of memory utilized and the current amount of memory availability associated with the initial batch size to produce an updated adaptive batch size prediction model.

10. The non-transitory computer readable storage medium of claim 9, wherein the adaptive batch size prediction model has the desired maturity level when the set of data points includes a desired number of data points.

11. The non-transitory computer readable storage medium of claim 9, wherein the first memory section further stores operational instructions that, when executed by the set of loader nodes, causes the set of loader nodes to:

when the adaptive batch size prediction model is not at the desired maturity level:
randomly select the initial batch size from a default list of allowed batch sizes, wherein the allowed batch sizes correspond to small percentages of available memory of the set of loader nodes.

12. The non-transitory computer readable storage medium of claim 9, wherein the first memory section further stores operational instructions that, when executed by the set of loader nodes, causes the set of loader nodes to:

determine that the upper bound of the buffer interval exceeds the current amount of memory availability of the set of loader nodes; and randomly select the initial batch size from a default list of allowed batch sizes, wherein the allowed batch sizes correspond to small percentages of available memory of the set of loader nodes.

13. The non-transitory computer readable storage medium of claim 9, wherein the first memory section further stores operational instructions that, when executed by the set of loader nodes, causes the set of loader nodes to update the adaptive batch size prediction model by:

adding a new data point to the set of data points to produce a new set of data points, wherein the new data point corresponds to the initial batch size and the actual amount of memory utilized in converting the first batch of data; and calculating a new buffer interval by applying a function to the new set of data points, wherein the function is based on an error metric, a confidence percentage, and distance between the new data point and other data points of the set of data points, and wherein the new set of data points and the new buffer interval correspond to the updated adaptive batch size prediction model.

14. The non-transitory computer readable storage medium of claim 13, wherein the first memory section further stores operational instructions that, when executed by the set of loader nodes, causes the set of loader nodes to:

when the adaptive batch size prediction model is at the desired maturity level:
remove an oldest data point from the new set of data points.

15. The non-transitory computer readable storage medium of claim 9, wherein the first memory section further stores operational instructions that, when executed by the set of loader nodes, causes the set of loader nodes to:

while obtaining the dataset, obtain a second dataset for storage within the database;

determine a second memory usage type for the second dataset;

obtain a second adaptive batch size prediction model associated with the second memory usage type;

plot the current amount of memory availability of the set of loader nodes on the second adaptive batch size prediction model;

when the second adaptive batch size prediction model is at a desired maturity level, identify an intersection between an upper bound of a buffer interval of the second adaptive batch size prediction model and the current amount of memory availability of the set of loader nodes to determine a second initial batch size;

select a lesser of the initial batch size and the second initial batch size as an allowed batch size;

convert the first batch of data of the dataset having the allowed batch size from the first data format to the second data format;

convert a first batch of data of the second dataset having the allowed batch size from the first data format to the second data format;

determine an actual amount of memory utilized in converting the first batch of data of the dataset to produce a first actual memory utilization value;

determine an actual amount of memory utilized in converting the first batch of data of the second dataset to produce a second actual memory utilization value;

update the adaptive batch size prediction model based on a difference between the first actual memory utilization value and the current amount of memory availability associated with the allowed batch size; and update the second adaptive batch size prediction model based on a difference between the second actual memory utilization value and the current amount of memory availability associated with the allowed batch size.

16. The non-transitory computer readable storage medium of claim 13, wherein the first memory section further stores operational instructions that, when executed by the set of loader nodes, causes the set of loader nodes to:

plot a new current amount of memory availability of the set of loader nodes on the updated adaptive batch size prediction model;

when the updated adaptive batch size prediction model is at the desired maturity level, identify an intersection between an upper bound of the new buffer interval of the updated adaptive batch size prediction model and the new current amount of memory availability of the set of loader nodes to determine a next batch size;

convert a next batch of data of the dataset having the next batch size from the first data format to the second data format;

determine an actual amount of memory utilized in converting the next batch of data; and update the updated adaptive batch size prediction model based on a difference between the actual amount of memory utilized and the current amount of memory availability associated with the next batch size to produce a next updated adaptive batch size prediction model.

17. The parallelized data input sub-system of claim 5, wherein the set of loader nodes are operable to update the adaptive batch size prediction model by:

adding a new data point to the set of data points to produce a new set of data points, wherein the new data point corresponds to the initial batch size and the actual amount of memory utilized in converting the first batch of data; and calculating a new buffer interval by applying a function to the new set of data points, wherein the function is based on an error metric, a confidence percentage, and distance between the new data point and other data points of the set of data points, and wherein the new set of data points and the new buffer interval correspond to the updated adaptive batch size prediction model.

18. The parallelized data input sub-system of claim 17, wherein the set of loader nodes are operable to:
when the adaptive batch size prediction model is at the desired maturity level:
remove an oldest data point from the set of data points to produce the new set of data points.

19. The parallelized data input sub-system of claim 5, wherein the set of loader nodes are operable to:
while obtaining the dataset, obtain a second dataset for storage within the database;
determine a second memory usage type for the second dataset;
obtain a second adaptive batch size prediction model associated with the second memory usage type;
plot the current amount of memory availability of the set of loader nodes on the second adaptive batch size prediction model;
when the second adaptive batch size prediction model is at a desired maturity level, identify an intersection between an upper bound of a buffer interval of the second adaptive batch size prediction model and the current amount of memory availability of the set of loader nodes to determine a second initial batch size;
select a lesser of the initial batch size and the second initial batch size as an allowed batch size;
convert the first batch of data of the dataset having the allowed batch size from the first data format to the second data format;
convert a first batch of data of the second dataset having the allowed batch size from the first data format to the second data format;
determine an actual amount of memory utilized in converting the first batch of data of the dataset to produce a first actual memory utilization value;
determine an actual amount of memory utilized in converting the first batch of data of the second dataset to produce a second actual memory utilization value;
update the adaptive batch size prediction model based on a difference between the first actual memory utilization value and the current amount of memory availability associated with the allowed batch size; and
update the second adaptive batch size prediction model based on a difference between the second actual memory utilization value and the current amount of memory availability associated with the allowed batch size.

20. The parallelized data input sub-system of claim 17, wherein the set of loader nodes are operable to:
plot a new current amount of memory availability of the set of loader nodes on the updated adaptive batch size prediction model;
when the updated adaptive batch size prediction model is at the desired maturity level, identify an intersection between an upper bound of the new buffer interval of the updated adaptive batch size prediction model and the new current amount of memory availability of the set of loader nodes to determine a next batch size;
convert a next batch of data of the dataset having the next batch size from the first data format to the second data format;
determine an actual amount of memory utilized in converting the next batch of data; and
update the updated adaptive batch size prediction model based on a difference between the actual amount of memory utilized and the current amount of memory availability associated with the next batch size to produce a next updated adaptive batch size prediction model.

* * * * *